US008843997B1

(12) United States Patent
Hare

(10) Patent No.: US 8,843,997 B1
(45) Date of Patent: Sep. 23, 2014

(54) RESILIENT TRUST NETWORK SERVICES

(75) Inventor: Jonathan Paul Hare, San Francisco, CA (US)

(73) Assignee: Resilient Network Systems, Inc., San Francisco, CA (US)

(*) Notice: Subject to any disclaimer, the term of this patent is extended or adjusted under 35 U.S.C. 154(b) by 472 days.

(21) Appl. No.: 12/854,825

(22) Filed: Aug. 11, 2010

Related U.S. Application Data

(63) Continuation of application No. 12/652,034, filed on Jan. 4, 2010, now abandoned.

(60) Provisional application No. 61/292,155, filed on Jan. 4, 2010, provisional application No. 61/204,169, filed on Jan. 2, 2009.

(51) Int. Cl.
*H04L 29/06* (2006.01)

(52) U.S. Cl.
USPC ........ 726/3; 726/2; 726/10; 726/27; 713/168; 709/200; 709/201; 709/202; 709/225; 709/226; 709/229

(58) Field of Classification Search
USPC ............................................................ 726/3
See application file for complete search history.

(56) References Cited

U.S. PATENT DOCUMENTS

| | | | | |
|---|---|---|---|---|
| 5,922,074 | A * | 7/1999 | Richard et al. | 726/21 |
| 6,408,336 | B1 * | 6/2002 | Schneider et al. | 709/229 |
| 7,386,513 | B2 * | 6/2008 | Lao et al. | 705/51 |
| 7,475,239 | B2 * | 1/2009 | Fulkerson et al. | 713/151 |
| 7,562,304 | B2 * | 7/2009 | Dixon et al. | 715/738 |
| 7,721,322 | B2 * | 5/2010 | Sastry et al. | 726/1 |
| 8,713,636 | B2 * | 4/2014 | Dimitrakos et al. | 726/3 |
| 2002/0067818 | A1 * | 6/2002 | Barathan et al. | 379/219 |
| 2002/0073308 | A1 * | 6/2002 | Benantar | 713/155 |
| 2003/0125976 | A1 * | 7/2003 | Nguyen et al. | 705/1 |
| 2003/0182421 | A1 * | 9/2003 | Faybishenko et al. | 709/224 |
| 2004/0039906 | A1 * | 2/2004 | Oka et al. | 713/156 |
| 2005/0086197 | A1 * | 4/2005 | Boubez et al. | 707/1 |
| 2006/0021017 | A1 * | 1/2006 | Hinton et al. | 726/10 |
| 2006/0031510 | A1 * | 2/2006 | Beck et al. | 709/226 |
| 2006/0165040 | A1 * | 7/2006 | Rathod et al. | 370/335 |
| 2007/0118878 | A1 * | 5/2007 | Sastry et al. | 726/3 |
| 2007/0124812 | A1 * | 5/2007 | Weeks et al. | 726/10 |
| 2007/0198432 | A1 * | 8/2007 | Pitroda et al. | 705/64 |
| 2007/0234417 | A1 * | 10/2007 | Blakley, III et al. | 726/12 |
| 2008/0028443 | A1 * | 1/2008 | Adelman et al. | 726/4 |
| 2008/0098478 | A1 * | 4/2008 | Vaidya et al. | 726/24 |

(Continued)

OTHER PUBLICATIONS

F5 Networks, Inc., "The Impact of Web Services on the Network", F5 Networks, Inc., Jan. 2006, entire document, http://www.f5.com/pdf/white-papers/webservices-wp.pdf.*

(Continued)

*Primary Examiner* — Luu Pham
*Assistant Examiner* — Ronald Baum
(74) *Attorney, Agent, or Firm* — Staniford Tomita LLP

(57) ABSTRACT

A Resilient Trust Network (RTN) is a set of servers that provide: an application integration platform for developing and publishing services and user interface for services, building derived services, subscribing to services, and embedding services into host applications, and building composite applications composed from multiple diverse services. The RST can also provide a platform for defining security requirements and accessing shared trust services that implement those requirements for services regardless of where or how those services are used.

24 Claims, 17 Drawing Sheets

(56) References Cited

U.S. PATENT DOCUMENTS

| | | | |
|---|---|---|---|
| 2008/0141033 A1* | 6/2008 | Ginter et al. | 713/175 |
| 2009/0151007 A1* | 6/2009 | Koster et al. | 726/30 |
| 2009/0172776 A1* | 7/2009 | Makagon et al. | 726/2 |
| 2009/0204964 A1* | 8/2009 | Foley et al. | 718/1 |
| 2010/0169430 A1* | 7/2010 | Ristock et al. | 709/206 |

OTHER PUBLICATIONS

Roth, J., "Configuring J2EE Application Servers for Use with the SAS® 9 BI Platform", SAS Institute Inc., Apr. 2005, entire document, http://www2.sas.com/proceedings/sugi30/217-30.pdf.*

* cited by examiner

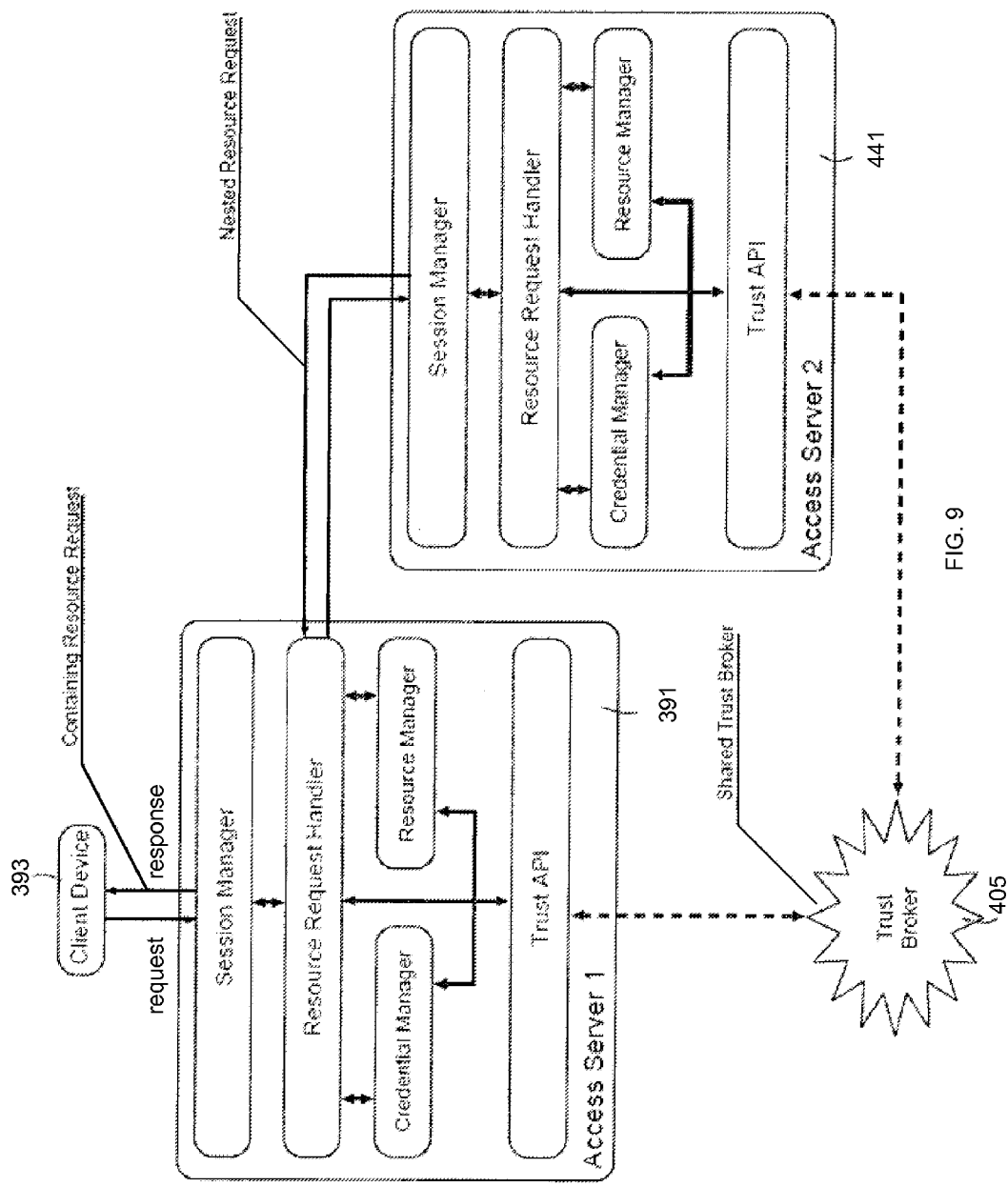

RESILIENT TRUST NETWORK SERVICES

1 CROSS REFERENCE TO RELATED APPLICATIONS

This application is a continuation of U.S. patent application Ser. No. 12/652,034 filed Jan. 4, 2010 which claims priority to U.S. Provisional Application No. 61/204,169, "Syndicated Trust Network Services" filed Jan. 2, 2009 and U.S. Provisional Application No. 61/292,155, "Syndicated Trust Network Services" filed Jan. 4, 2010. The entire contents of these US Patent Applications are hereby incorporated by reference.

2 BACKGROUND OF THE INVENTION

Application Security is a serious problem which significantly inhibits the ability to interface enterprise systems. Controlling users has spawned entire software industries. Some of the problems engendered include:

With reference to FIG. 1, a diagram of a conventional trust architecture is illustrated. The employees operate computers that use web browsers 101 to obtain information. The company can have a protected resource server 105 that is accessible to employees. However to prevent unauthorized access, a policy enforcement point 103 is placed between the web browser 101 and the protected resource server 105. The policy enforcement point 103 can be controlled by a policy decision point 107 that determines requirements for allowing access to the protected resource server 105.

Provisioning Users. In a large organization, the user population is constantly changing as employees come and go and change roles within the organization. It becomes a full time job simply to administer these users.

Multi Factor Authentication. Username and password authentication has been discovered to be easily subject to compromise. Consequently, many vendors offer additional authentication techniques to make it more difficult to penetrate systems containing proprietary information.

Single sign on. In an organization having multiple systems, each users finds themselves with multiple user names, one for each system he needs to access. Users find this inconvenient and frequently forget their assigned user names. Single-sign provides a solution. Single sign is also referred to as federated security. In a federated security model, a separate authentication system called an "Identity Provider" is introduced. An identity provider defines a user name for each user and offers an authentication procedure by which a person with knowledge of a user name can prove their identity (often this is nothing more than by entering a private password). Many enterprise systems can rely on one identity provider to define user identities. For the user, the same username can grant access to many systems. While this approach solves the problems of users forgetting their usernames, but it has inherent flaws.

Federated security multiplies the severity of security breaches enormously. In a non-federated world, stealing a username/password allows the thief access to one system. In a federated world, the same theft gives the thief access to many systems.

User authentication occurs once in a login process. Yet security requirements are driven by the specific data/functionality that the user intends to access. A system often contains a mix of sensitive and non-sensitive data and at login time it is not known which specific data the user wishes to access. Thus the authorization procedure used at login is too severe for some user activities and too lax for others. A more truly secure system should authorize users only after they have requested a specific resource when the true security requirement is known.

Different systems often have different security requirements. A federated approach forces every system into a one-size fits all approach. If authorization is enforced at login time by the host system, then the owners of the second system have a dilemma: either they accept the security mechanisms of the host system, or they demand that they are changed to meet their own requirements. They have no way to impose security requirements that only apply when data or functionality sourced from the second system are accessed.

The cost of implementing security and the liability for breaches is concentrated in the organizations that control the applications. As a consequence, application owners may be either unwilling to invest enough to protect others' security and privacy, unwilling to make information available due to liability concerns, or both.

Individuals (both users and the people who are the subjects of records within enterprise systems) are forced to trust applications and the organizations that control them, whether they want to or not. There is no way to monitor how security and privacy is protected that doesn't depend upon the trustworthiness of the application owners.

The result is a world of fragmented data and failure-prone security which creates a crisis of trust. Users become unwilling to share information or use applications. Applications and organizations are often unwilling to share information with one another. This friction undermines the flow of information and the ability to offer intelligent or personalized services. Large-scale exchange of privacy-sensitive information between unaffiliated organizations becomes difficult and expensive. This has widespread consequences in most industries—but negative consequences are especially prevalent in healthcare, an industry that relies upon the flow of privacy-sensitive information.

Virtual Applications. The world wide web acts as a platform for the development of virtual documents. E.g., a user may create a web site that appears as though it were a single document to the user, yet it is composed of many individual pieces sourced transparently from many different locations. This concept allows for reuse of information and dynamic assembly of interesting new web sites from existing pieces.

Service-oriented application (SOA) architectures have tried to accomplish something similar, albeit more limited. for applications. In a service-oriented architecture, application functionality can be published as a service, and then consumed by another application which uses that functionality and may present it to users. SOA services are published as an application programmer's interface (API). An API is a set of functions that can be invoked by another application. Therefore in an SOA architecture, it is the responsibility of the consumer of a service to develop a user interface through which an end user can experience and consume a service. In an SOA architecture, a collection of services register with a directory, and an application programmer may then develop an application by picking services to use from the directory and then authoring code to integrate them and develop user interface for them.

Portal/portlet architectures are another step towards developing virtual applications. In a portal application, small applications called portlets are published as web applications. Unlike an SOA service, a portlet publishes a user interface rather than Application programmer's interface (API). POrtlets can be integrated into larger units of functionality within a portal.

Both portlet and SOA architectures are attempts at developing applications that can easily be assembled from predefined pieces. However, both are limited. In both cases, the decisions of which services or which portlets to embed are defined in advance by the application programmer developing the portal.

The worldwide web provides a platform for loose integration between applications by providing general mechanisms for publishing information (web servers), finding information (search engines), describing content (markup languages, AJAX Javascript, etc.) and viewing content (web browsers). However, the web provides little help with application security and the challenge is larger and more serious on the internet where some users will be actively malicious. How can the publisher of a piece of information, assert its security control requirements regardless of where that information is eventually used? Without such assurances, owners of confidential information are unwilling to publish it widely, and even if they do publish it with a web-based application, they are not willing to share it within the context of external applications they do not control. Without this sharing, many opportunities for synergy are lost and confidential information is duplicated in many places unnecessarily.

The Resilient Trust Network addresses the problems of application integration and user security on a distributed network such the worldwide web to allow publishing privacy sensitive information on an insecure network such as the internet. Similar to the worldwide web mechanisms already referenced, the Resilient Trust Network provides new functions in areas where the web has been weak as follows:

Discovery and syndication of trust services, definition and publishing of trust requirements, provision of user interface for viewing information (Resilient Access Server).

Resolution of trust requirements for each source of information or policy, provision of anonymity for all trust related operations, (Resilient Trust Server).

The addition of these servers to the conventional worldwide web mechanisms allows the Resilient Trust Network to provide a trust environment integrated with the current web so that security and integration for large-scale application systems can be provided in a unique and productive manner not available through the conventional means described above.

In an embodiment, a Resilient Trust Network (RTN) is a set of servers that provide: an application integration platform for developing and publishing services and user interface for services, building derived services, subscribing to services, and embedding services into host applications, and building composite applications composed from multiple diverse services. The RTN can also provide a platform for defining security requirements and accessing shared trust services that implement those requirements for services regardless of where or how those services are used.

The RTN allows an application programmer to create and publish services that provide access to resources. A service makes available either data or application functionality in a form that can be embedded into other applications called host applications. For example, in the medical application domain, a service might provide patient prescription histories which could then be embedded into a hospital's EMR where a treating physician can view them. The specification discloses the use of the RTN in a medical application domain. However, in other embodiments, the RTN can be used in any other technology or information field.

Services are defined using an access server. An access server is a customizable software component that can be linked to any backend system to handle the details of preparing that functionality for publication as a service. An access server can perform various functions including: publishing a public interface for a service, mapping calls made to the public interface into the private interface of a back end system, defining and serving a user interface for the service, defining and serving a data-stream for the service (for example, an XML or JSON document). In some embodiments the access server can transform data provided by the backend system in a proprietary format into a data format usable by external applications. This format conversion allows data to be easily shared by different applications. The access server can also formulate a credential request to the trust server to validate the user prior to releasing data. This allows the RTN to provide any security measures required by an application or service. The access server can also subscribe to other services and transforming the data structure or user interface (UI) of subscribed services for presentation within the UI of a host application. Services may be merged and composed. For example, a service may source data from two other services A and B, transform that data or define a new user interface for this data, and then publish it as a new service C ready to be embedded into host applications. This allows the host application to integrate various UIs from different services to a single host application UI.

The inventive system can be configured with a high level of security. An application developer can implement security for a service by invoking Trust services. A service invoking a trust service is referred to as a relying party. Trust services will enforce security requirements automatically regardless of the host application where the relying party has been embedded. This facility enables an application developer to publish confidential information securely since he can guarantee enforcement of security policies as if he controlled the host application.

The access server also allows application programmers to embed services into host applications. A host application is any application that subscribes to one or more services. The network provides a directory of published services and their interfaces. Using an access server, a host application may subscribe to any number of services found in the directory, configure an interface to invoke the subscribed service and customize the results returned by the service. Many services already publish a user interface, but an application host is free to modify that interface or develop another using its access server.

One host application may embed any number of services. Services may be embedded at design time by a programmer or may be embedded conditionally. When services are embedded conditionally, the choice of the service displayed to the user is made after information some information has been gathered from the user at run time. For example, a system displaying medical records might allow the user to select a patient, and then only bind in a specific source of patient data after finding a source that contains data about the given patient.

The host application can modify the user interface of services it uses or subscribes to. Thus, the RTN provides a flexible platform for developing host applications via composition using published services. Since each service come bundled with application security, the host application need not modify its own security mechanisms to cater to the requirements of the service(s) consumed.

In an embodiment, the RTN provides a protocol for invoking, interacting with and embedding trust services. A trust service is any application that serves to authenticate user identity, personal attributes or user privileges used prior to allowing access to protected resources or any application that documents completed user interactions with protected resources. Examples of trust services include an OpenID identity provider, a phone authentication service, a records retention service, and an audit log that records user interactions with protected data resources. The RTN provides access to many trust services and enables a relying party to combine them in arbitrary ways.

Relying parties interact with trust services through a trust server which is responsible for orchestrating and optimizing interactions with trust services using a trust protocol. In an embodiment, a relying party sends a credential request to the trust server which describes the set of credentials that will be required to obtain the credential. The Trust server in turn messages the required trust services, passing them only that part of the credential request they are required to process. Trust services process the credential requests. In some cases, the processing may involve interacting with the user. If the required information is provide the trust service will issue a credential to indicate approval. For most credential requests, multiple trust services are required. As the required information is obtained, the trust server caches the responses until all required credentials have been gathered. The trust server issues final authorization to allow the user interaction to proceed after all of the required credentials have been obtained. The trust server can also include a trust history that stores previously earned credentials in one or more sessions so that the number of authentications required of the user is minimized.

The RTN provides a development environment for authoring trust services and can be used in a wide variety of applications and industries. Trust services frequently are linked to a back end system. Trust credentials served by a trust service are published to a directory to make them usable by services and hosts. The RTN trust service development platform also supports creation of policy trust services, and compound and syndicated trust services.

A policy service can be a trust service that defines a reusable credential request that can be shared across organization. For example, a governmental authority might operate a policy service to define a set of access policies as a credential request that complies with state law. Application services could then simply subscribe to the policy service rather than creating their own complex credential request and have assurance their security will comply with state law.

A compound trust service can combine individual trust services into a more powerful whole. For example, in an embodiment, a compound trust service might combine a Lightweight Directory Access Protocol (LDAP) database acting as an identity provider with a phone authentication service. When the user submits a user name recognized by the LDAP database, the trust service would query the LDAP database for the user phone number. The phone number could then be forwarded to a phone authentication service which would call the user and compare the answering person's voice to a stored voice print. The compound trust service would only grant a credential to the user after the voiceprint match was confirmed.

A trust syndicate can be a single trust service that acts as a common front end to multiple back end trust services. When the syndicated service is invoked, it delegates action to one or more of its members, depending on the content of the request it receives. The trust syndicate enables a higher degree of reliability and reusability in trust. It enables anonymous trust verification. In an embodiment, the relying party invoking a trust syndicate may not ever know the actual trust service verifying the identity of the user. Some entities may only be willing to offer their trust services in an anonymous fashion. Because the inventive system is extremely flexible, it can provide fungibility between multiple potentially dissimilar trust services.

In an exemplary embodiment, the following process steps describe the system's typical interactions. A User can first invokes a host application via a web browser. The host application provides a user interface allowing a user to request access to a protected resource served by a service. A protected resource is often, but not always, a unit of data. It can be anything from an XML document, a binary file, a collection of database records; an individual attribute or a fragment of HTML. The service can retrieve the protected resource from its back-end data server and makes a credential request to the trust server including a Credential expression. The credential expression can include a specification of which trust services and policies must be satisfied in order for authorization of the credential to be granted to the requestor. The Trust Server forwards appropriate credential expressions to the needed trust services. The trust services can each perform a validation, potentially via some user interaction. If the validation is correct, the trust services reply to the trust server with credentials. When all required credentials are present, the Trust Server returns approval to release the protected resource to the trust service. The trust service can then provide the protected resource to the host application. The host application serves the protected resource to the user's web browser. The inventive system is extremely flexible and can be utilized in various industries and applications.

3 BRIEF DESCRIPTION OF THE DRAWINGS

FIG. 9 illustrates two collaborating access servers;

4 DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention. In an embodiment, a Resilient Trust Network is a set of servers that provide: (1) Trust Server, (2) Access Server, (3) Trust Services, (4) Service Directory, and (5) Search.

5 THE TRUST SERVER

The Trust Server coordinates the activity of trust services on behalf of relying parties. The Trust Server provides a protocol through which trust server functionality can be accessed. The Trust Server can also function as an intermediate server that protects the privacy sensitive content embedded within trust requests. The Trust Server can also provide a shared trust history used to minimize the number of repetitive validations executed by a user as he examines privacy sensitive resources.

In an embodiment, the Trust Server can consist of the following components: a secured network infrastructure, a Trust Broker, a Trust History database, a Zero-Knowledge Service Module and a Trust Proxy.

The Trust network is secured using digital certificates. In an embodiment, a trust network operator acts as a certificate authority, issuing digital certificates to organizations approved to participate within the Trust network. Upon receiving a certificate, an organization can issue its certificates to the machines that it operates.

Figure 1:
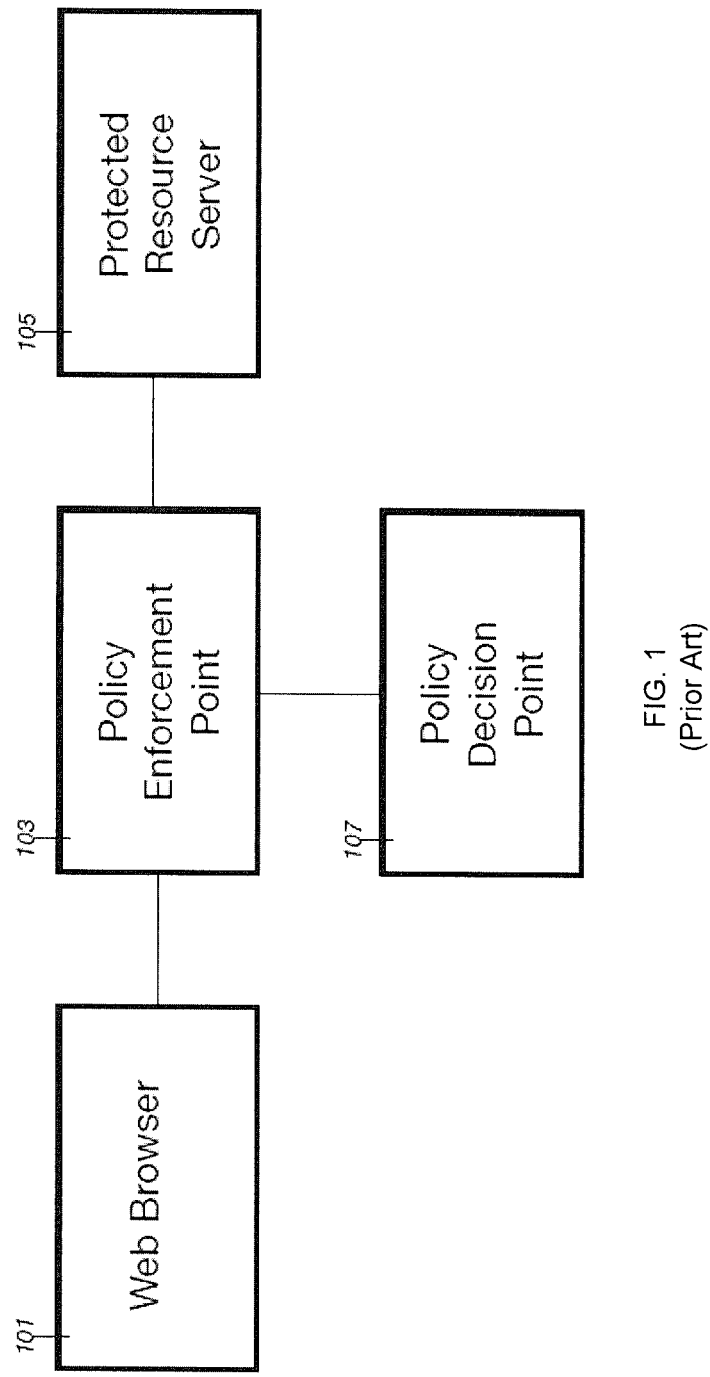
FIG. 1 illustrates a block diagram of a conventional trust architecture.
Figure 2:
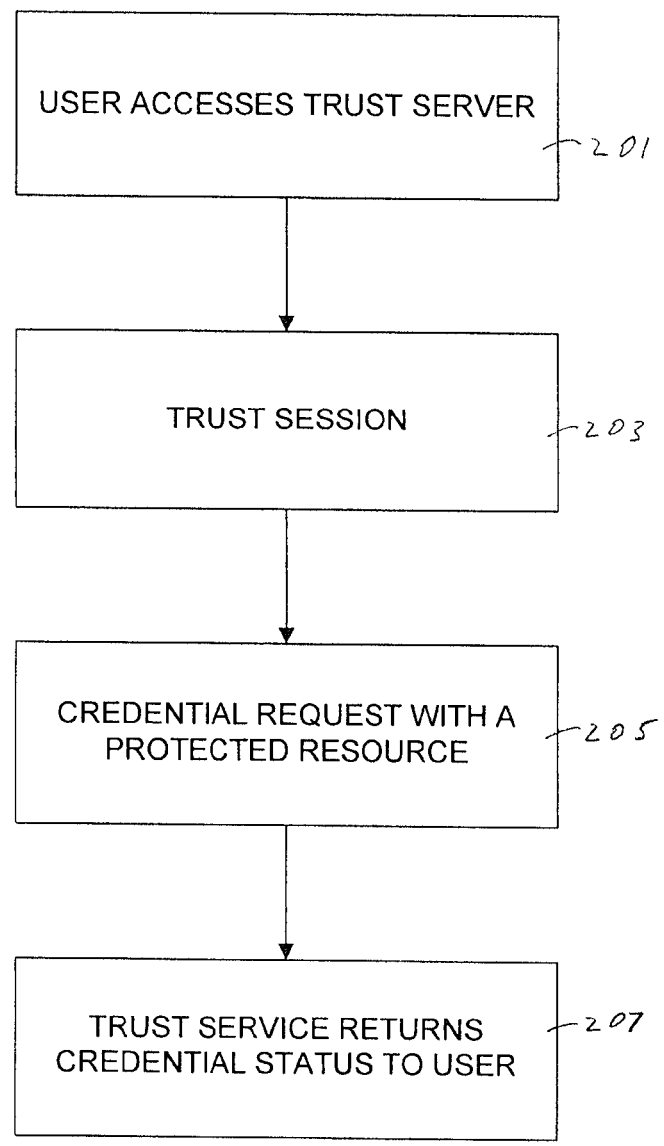
FIG. 2 illustrates a credential request flow chart.

The Trust Network provides two interaction protocols: A Relying Party Protocol used to invoke trust service functionality and a Trust Service Protocol used to serve trust service functionality. With reference to FIG. 2, a flow chart of the trust protocol is illustrated. A user initiates a trust session with the trust server 101. This generally occurs implicitly when the user requests access to a protected resource. A Trust session defines a context for interaction with trust services 103. Within a Trust Session, a user can make a credential request 105. A credential request is a request to authorize an interaction with a protected resource. The request specifies the trust services needed to be validated and documents the interaction. Every credential request has a status 107. The status can have one of five possible values: 1) Granted, 2) Pending, 3) Pending with UI, 4) Error and 5) Denied. A session can be terminated when the relying party that initiated the session terminates the session. A User may have multiple trust sessions open on his behalf simultaneously and may also have multiple requests within a session. Requests can be execute asynchronously.

The Relying Party protocol contains methods for: Starting a trust session (passing a User ID), Closing a trust session (passing a Session ID), Creating a new credential expression (passing a Session ID), Cancelling a credential request (Passing a Credential ID) and Checking the Credential Request Status (Passing a Credential ID). The protocol for the trust service is similar to the Relying Party protocol. In an embodiment, the only difference is that since a trust service does not act as a user agent and it has no need to start and end trust sessions.

A credential request consists of a credential expression. The credential expression describes which trust services are needed and how to route a message to those services. The credential expression also contains the attribute values that are needed. In an embodiment, a credential expression is a Boolean expression made up of one or more credential elements, logical operators and parentheses. For example, CredentialExpression=(CredentialElement1 AND CredentialElement2) OR CredentialElement3. Each credential element contains credential attributes which determine: how the trust network routes the credential request, which services are invoked and whether the credential element must have been earned in the current session to satisfy the requirement. A credential expression may also include Logical Operators such as AND, OR, NOT, AtLeastOneOf, etc. The Logical Operators can be required to determine the evaluation of credential expression from credential elements, delimits credential elements, etc. In some cases parentheses ( ) are required to define grouping and order of evaluation in evaluating Boolean expression. The Credential Expressions can be expressed in various formats, including a delimited text string, an XML document, or a JSON structure.

The expression parser recognizes a variety of reserved words (and equivalent shorthand 2 or 3 character acronyms) and delimiters that it uses to extract individual credential attributes for each credential element. Certain credential attributes that are not explicitly specified in the credential expression may be resolved at runtime by either the trust broker or trust service. Unspecified credential attribute values may be determined by configuration options specified by the administrators of the Trust Service or Service Connectors, or will be set to default values based on the context. Examples of Reserved Words (Acronyms) are described below.

TrustCredential (TC): A string specifying the name of the credential—i.e. LIPIX.doctor. LIPIX is an acronym for Long Island Patient Information Exchange. In this example, the Trust Credential is asking for verification that the person of interest is a LIPIX doctor. The TC may be required in credential expression.

TrustBrokerPath(TBP): URI or resource specifying path to TrustBroker—i.e. [http://qa.resilient-trust.net:4000] The TBP may be optional in credential expression. There may only be one TrustBrokerPath per credential expression—it appears in separate clause delimited by braces "{ }". By convention, the TrustBrokerPath appears before the Boolean credential expression.

The TrustDomainPath (TDP) may be concatenated with additional parameters to specify trust policies (i.e. /TCP— indicating that all elements must execute on trusted computing platforms). If the TDP is not specified in credential expression, defaults to same path as the calling service (i.e. escrow container or user verification service).

DataStorePath(DSP): URI or resource specifying path to a Data Store service which stores DataObjectTagSets and CredentialRequestTagSets—i.e.[http://Google.com/AppsEngine/TrustNetwork/DataStore] The DSP is optional in credential expression. There may be zero or more DataStorePaths specified per credential expression—it appears in separate clause delimited by braces "{ }". The DataStorePath may be concatenated with additional parameters to specify which TagSet classifications are stored in a given Data Store. Individual Tags or Tag Sets can be annotated with arbitrary classification properties, which can be used to control routing of Tags to different Data Stores. Tag Sets are stored with a DataStoreGID as primary key. If the DSP is not specified in credential expression, defaults to same path as the calling service (i.e. escrow container or user verification service).

MachineGIDAlias (MGA): an opaque token visible to an external information service, which can be mapped to the opaque MachineGID used by the TrustBroker to log Trust History entries. It may be either a GUID (which can only be resolved by the specific Trust Broker that created it), or a path to a zero-knowledge token service concatenated with a GUID (which can be resolved by any TrustBroker by delegating to the designated zero-knowledge token service. A MachineGIDAlias is used by an Information Service that needs to make repeated Credential Requests to the same machine. A single MachineGID may have arbitrarily many different MachineGIDAliases, so that different information services may coordinate their interactions with a shared user or machine context without their having access to a common reference.

SessionGIDAlias (SGA): an opaque token visible to an external information service which can be mapped to the opaque SessionGID used by the TrustBroker to log Trust History entries. It may be either a GUID (which can only be resolved by the specific Trust Broker that created it), or a path to a zero-knowledge token service concatenated with a GUID (which can be resolved by any TrustBroker by delegating to the designated zero-knowledge token service. A Session-GIDAlias is used by an Information Service that needs to make repeated Credential Requests to the same user session. A single SessionGID may have arbitrarily many different SessionGIDAliases, so that different information services may coordinate their interactions with a shared user or machine context without their having access to a common reference. A SessionGIDAlias can be used by an information service or client application to bridge the "lifespan" of multiple browser sessions into a single trust network user session. It can also be used to implement user session management for applications that do not use a browser session.

TrustDomain(TD): URI specifying path to a Trust Domain Service—i.e. [http://qa.resilient-trust.net/] The TD is optional in credential expression. If the TrustDomain in a separate clause delimited by braces "{ }", it is applied to all of the elements of the credential expression. Otherwise, the TrustDomain is applied to a single credential expression element. A Trust Domain Service maintains administrative mapping tables between a named TrustDomain and fully fully-specified paths for the set of Trust Brokers, Trust Service Proxies, and Service Connectors that are trusted by that Trust-Domain. The Trust Domain Service may also maintain trust, reputation and performance metrics to support policy-based selection of which paths are optimal for a particular transaction. These metrics may be set by administrators, and/or by subscribing to trust ranking services. The TrustDomainPath may be concatenated with additional parameters to specify trust policies (i.e. /TCP—indicating that all elements must execute on trusted computing platforms). The Trust Domain Service can resolve a partially specified credential expression element (minimally a TrustCredential name) into a fully-specified trust path of services (Trust Brokers, Trust Service Proxies and Service Connectors, Zero-knowledge token services).

TrustServicePath (TSP): URI or resource specifying path to TrustServiceProxy—i.e. [http://qa.resilient-trust.net] The TSP is optional in credential expression. If not specified in credential expression, defaults to same path as the trust broker.

ServiceConnector (SC): string specifying Service Connector control—i.e. [Group VerificationServiceConnector.asmx, LDAP_ServiceConnector]. The SC is optional in credential expression. If not specified in credential expression, may be resolved based upon administrative configuration settings in TrustService which map various TrustCredential names to specific service connector handlers. If not specified in credential expression or TrustServiceProxy configuration settings, defaults to "ServiceConnector.asmx".

ServiceConnectorPath (SCP): URI specifying path to Service Connector—i.e. [http://qa.resilient-trust.net:4000/Resilient.GVServiceConnector]. The SCP can be optional in credential expression. If not specified in credential expression, may be resolved based upon administrative configuration settings in TrustServiceProxy which maps various TrustCredential names to specific paths. If not specified in the credential expression or TrustServiceProxy configuration settings, defaults to same path as TrustServiceProxy.

Frequency (FRQ): string specifying when a credential element must be earned in order to be satisfied. The allowable values (and equivalent acronyms) for Frequency are "CurrentSession" (CS), "SameUserID" (SU), "CommonUserID" (CU), "SameMachine" (SM), or a pointer to a service that makes a context-dependent decision as to whether the grant needs to be renewed. The FRQ is optional in credential expression. If not specified in credential expression, defaults to "CurrentSession".

Parameters (PAR): string specifying either a list of parameters associated with the credential element, or a reference to specified resource that contains the parameters. The PAR is optional in credential expression Example: Parameters [phone=415.265.3250, VerType=Voice]. If not specified in credential expression, defaults to Null.

The credential expressions can have various delimiters for text strings. Braces { } are optional and may surround and delimit individual credential elements—i.e. {TC[LIPIX.doctor] TSP[http://qa.resililent-trust.net:4000]} Square Brackets [ ] are also optional and may surround values when specifying individual credential attributes—i.e. TrustCredential[LIPIX.doctor]. Equals "=" is optional and assigns value to credential attribute or parameter. (Equivalent to using Square Brackets for specifying values.) i.e. TrustCredential=LIPIX.doctor. Pipe (|) is optional and delimits individual credential elements in a list in a compound logical operator—i.e. AtLeastOneOf({LIPIX.doctor}|{AMA.doctor})

The credential expressions can also have list delimiters such as: Space " ", Comma ",", Pipe "|": required—delimits elements of a list of credential attributes, parameters, or trust credentials.

The credential expression parser is case insensitive for reserved words and logical operators. The credential attributes for any credential element can be concatenated in any order without changing their interpretation. If a credential expression includes a text string that does not include a reserved word, it will be interpreted as a Trust Credential. For example, "Credential Expression=LIPIX.doctor AND AMA.physician" can be equivalent to "TC=Lipix.doctor AND TC=AMA.physician"

A Trust service often has a requirement to interact with the user. For example, to display fields where the user enters a username and password. The Trust Protocol supports a call-back interface so that the relying party may serve interface on behalf of the trust service to the user. User Interface is transmitted as an HTML form.

5.1 Trust History

The Trust History is a shared database recording credentials earned by users within their trust sessions. As new credential requests are received, the trust history is checked to see if the user already has earned the credentials referenced in these requests. If so, the user need not repeat the authentication process over again. The trust history also stores authentication status, session timeout and user sign out event details. The Trust history is only ever accessed by the trust broker and is only ever used during the credential request process. The Trust History supports the following queries:

TrustHistory.GetSession( )

Allows the TrustBroker to determine if a current trust session exists meeting specified criteria.

TrustHistory.GetCoordinates( )

This query allows the TrustBroker to query the Trust History for log entries related to an authentication attribute used to achieve credential grants—i.e. all trust history log entries in user sessions related to a user with a given email address, to a specific machine, to a specific session, or that involved a specific credential grant.

TrustHistory.GetCredentials( )

Allows the TrustBroker to query the Trust History for credential log entries which meet specific criteria—i.e. all trust history log entries associated with user sessions that involved some combination of: (1) a user with a given User ID, either verified in the same session or on the same machine in a previous session (2) a specific machine (3) a specific user session (4) one or more specific credential grants, either in the same session or on the same machine in a previous session TrustHistory.PostLogEntry( )

This method is used to log Credential Grants when: (1) Any credential is granted or renewed, A derived credential is logged, A new MachineID is created, A new UserSessionID is created, A user event indicates activity, extending an activity-based user session, or the user signs out

5.1.1 Derived Credentials

Since credentials can be composed from other credentials, the trust history supports the concept of a derived credential. A derived credential occurs when Credential A is composed from credential B and C. When B and C have been earned, then Credential grant A can be entered into the trust history as a "derived credential". For example, Suppose one a service A contains a database of users and their phone numbers. To earn its credential, the user must authenticate at his phone number using a service B to execute that authentication. Now suppose that a credential B at that phone number has been recorded in the user's trust history. Because the requirements to earn credential A have been satisfied, the credential A can be considered to have been earned even if Service A was never invoked. This is an example of a derived credential.

5.2 Trust Broker

The Trust Broker coordinates the activity of trust services. When a credential request is received, it becomes the root node of a Credential Graph managed by the Trust Broker. The Credential Graph is a data structure used to manage the execution of complex credential expressions. The credential graph consists of nodes and arcs. Each node, has a number of attributes used to guide the user towards earning a grant of the root Credential Request. The objective is to minimize the user interaction required to resolve the Credential Request.

5.2.1 Credential Graph

Figure 3:
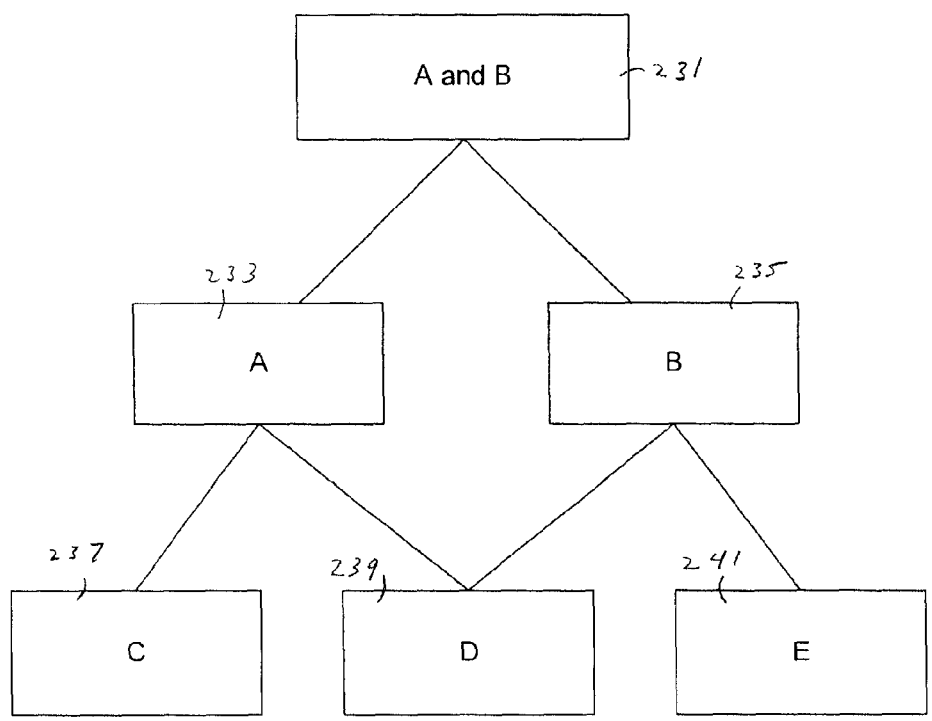
FIG. 3 illustrates a hypothetical credential graph.

With reference to FIG. 3, a diagram shows the structure of a hypothetical credential graph. Each letter 233, 235, 237, 239 and 241 represents one required credential. The root expression 231 contains two credentials that are required to authorize access to some resource: A and B.

The trust broker workers iteratively, evaluating one node at a time, starting from the top of the tree. When a credential expression in a node is joined by a logical operator, the Trust Broker evaluates the expression "A and B" 231 parsing it and generating two individual nodes for A 233 and B 235.

When a node does not contain a logical operator, the trust broker checks the trust history to see if that credential has already been earned. If it has not been earned, the trust broker invokes that trust service. A trust service will respond in one of two ways. It may invoke an external application to resolve the credential (in the case of a leaf node) or it may return a new credential expression containing additional credential elements to be added to the tree.

For example, when the trust broker evaluates node A 233, it will invoke Trust Service A. A will return a new credential expression "C and D." The Trust broker will "grow the graph" by appending nodes C 237 and D 239 to the graph with arcs connecting them to A 233.

When Node C 237 is invoked, The Trust broker again checks the Trust history to see if its credential is already present. If not Trust Service C is invoked. Trust Service C has no children. When it is invoked, it will invoke an external application that may interact with the user to determine whether the C credential can be granted. Trust service C will either return a credential grant or a denial. If it returns a denial, then the entire credential expression is denied. If it returns a grant, then Node D 239 can be evaluated. When Nodes C 237 and D 239 have returned credential grants, then Node A 233 which was composed from C 237 and D 239 becomes granted.

The Trust Broker orchestrates the evaluation of the Credential Graph by coordinating the interactions between the user, the Trust History Service, and external Trust Services. This iterative process continues until the root credential expression evaluates to TRUE or FALSE or the user abandons it.

Once the root credential expression evaluates to TRUE, the Trust Broker will post a credential to the relying party indicating that the Credential Request has been granted at which point the relying party can proceed with its original interaction with its user.

5.2.2 Structure of a Credential Graph Node

Credential Tree Node Attributes
Credential Boolean Expression (Elements: authority, credential, frequency)
Expression Boolean Expression
Predicate NULL, TRUE, FALSE
Expression NULL, TRUE, FALSE The Credential Boolean Expression attribute contains a Boolean expression made up of Credential Elements (i.e. Kaiser.ClinicalStaff.EverySession) and logical operators ("and", "or", "at least one of", brackets, etc.). Each Credential Element incorporates three attributes (1) a path to the Authority responsible for issuing the credential, (2) a locally unique name of the Credential, (3) the Frequency that a user must be granted the credential for purposes of the Credential Request.

The Satisfied attribute identifies whether the credential(s) associated with a node have been satisfied. It can have a value of NULL, TRUE or FALSE. NULL indicates the Node or its children have not yet been fully evaluated. TRUE means the Credential Expression has evaluated to TRUE. FALSE means the Credential Expression can not evaluate to TRUE because the current user is not eligible for some credential within the graph.

The Eligible attribute is true when the trust service associated with a node recognizes the user identifier submitted (i.e. email address, user name, etc.). For example, a Kaiser directory might have a Clinical Staff member Bob Smith, including an email address of Robert.J.Smith@kp.org. If a Kaiser user entered this email address, the eligible attribute for this node of the graph would be set to true, although the user has not yet earned the credential. If Authentication required the user to answer Dr. Smith's work phone number and Dr. Smith was unable to answer the work phone because he was working form home, he would not be able to earn the credential.

The Trust Broker may determine eligibility by invoking the RequestCredential( ) method on the Trust Service, by invoking the VerifyEligibility( ) method on the Trust Service Proxy or by Querying a Locator Service to discover all trust credentials associated with the current user identifiers that recognize this user.

"Eligible" may have one of three values (1) NULL means user eligibility has not yet been checked. (2) TRUE means that the user is eligible for a combination of constituent credential elements which, if earned, would allow the user to satisfy the Credential Expression. (3) FALSE means that the Credential Expression cannot evaluate to TRUE because some required Credential Element(s) have determined that the user is not eligible for the credential.

The Previously Granted attribute indicates whether the current user has previously been granted trust credentials that would satisfy the Credential Expression. It is determined by querying the Trust History Service and has the same options as the Frequency attribute in Credential Elements—Unknown, Same UserID, Common UserID, and the Same Machine.

Previously Granted does not necessarily mean that the user is still eligible for a renewed grant since the user may have since lost eligibility for one of the trust credentials relied upon in earning the previous grant, or the user may have falsely claimed to have a UserID which they are not entitled to. The Previously Granted attribute is used as an input in the heuristic algorithm for identifying an efficient path to satisfying the root Credential Expression, using the inference that if a user has earned a credential in the past, they are more likely to be able to earn it in the current session.

5.2.3 Growing and Pruning the Credential Graph

The Trust Broker evaluates the Credential Graph by successively "growing" and "pruning" it. The Trust Broker grows the graph by dividing each credential expression into its constituent (authority.credential.frequency) Credential Elements, creating a new node for each element.

The Credential Graph can be grown or pruned in several ways. For Credential Graph Nodes whose Credential Expression is made up of more than one Credential Element, the Trust Broker adds child nodes, one for each element of the parent's credential expression. The Predicate Expression of the original node will be populated with an equivalent Boolean Expression with references to the new child nodes in place of the original Credential Elements. The Satisfied, Eligible and Previously Granted attributes for the original node will be determined by the evaluation of this Predicate Expression using the values of the corresponding attributes in the child nodes. For example, if the Previously Granted attribute of all child nodes evaluate to "SameMachine", then the parent node's attribute will be updated to "SameMachine".

The Credential Graph nodes can be pruned by the Trust Broker by querying the Trust History Service to determine if the credential requirement has already been satisfied by previously earned credential grants. If the credential element is found and the Frequency requirement is satisfied then the node is pruned by changing its Satisfied attribute to "TRUE".

The Trust Broker can also grow or prune the Credential Graph by invoking the RequestCredential( ) method on the Trust Service Proxy for the specified (authority.credential) element. The Trust Service Proxy may either prune the graph with a PostCredentialGrant( ) or grow it with a PostCredentialExpression( ).

If the response is PostCredentialGrant( ), the credential grant is logged to the Trust History and the node is pruned by changing its Satisfied attribute to "TRUE". The Credential Graph is then re-evaluated to determine if this change propagates up to satisfy the root credential expression. Similarly, a node that has a parent using the conditional operators (i.e. "or", "at least one of", etc.) may be pruned if the parent node is satisfied.

For example, the {Kaiser.ClinicalStaff} credential element for Brandon Smith might resolve into a Credential Expression:

{TrustCredential=Authentify.PhoneConfirmation Frequency=CurrentSession Parameter[PhoneNumber=510.312.3250]}
AND
{TrustCredential=Resilient.EmailConfirmation Frequency=SameMachine Parameter [UserID=Brandon.Smith@kp.org]}

This credential expression is inserted into the Predicate Expression attribute of the node that was being evaluated, and new nodes are added to the Credential Graph for each of its Credential Elements.

The process of iteratively growing and pruning the graph continues until the root credential expression has been satisfied, or the user gives up trying to access the requested information.

The Trust Broker may request a credential by invoking RequestCredential( ) method and passing a Credential Expression and a CredentialRequestTagSet. If the credential request can be granted directly, the trust service will invoke the Trust Broker's PostCredentialGrant( )method, including as a parameter the same CredentialRequestGID that was passed with original RequestCredential( ) invocation. The Trust Broker will update the corresponding Credential Graph node with Satisfied=TRUE, update the Trust History log to record the credential grant, and then re-evaluate the Credential Graph.

Alternatively, the Trust Service might respond with a PostCredentialExpression( ) which passes a new Credential Expression. The Trust Broker will update the "Predicate Expression" attribute of the Credential Graph node with this new credential expression, and will add new nodes to the Credential Graph.

5.3 Distributed Execution

The Trust Network has a peer-to-peer architecture where the evaluation of a single Trust Credential Expression can be distributed across multiple trust servers. A single Trust Broker serves as the coordination hub for each expression, but the expression may be parsed, evaluated and routed across various trust servers. Which specific Trust Broker coordinates the evaluation of each expression is determined by the relying party that originally issued it; either by specifying the path to the trust broker in the expression itself, via a default path set as an administrative configuration option by the access server, or via being resolved by a Trust Domain Service.

Once the Trust Broker parses the credential expression, it routes individual trust credentials to an appropriate TrustServicePath, ServiceConnectorPath and ultimately an External Service for evaluation. Different elements of one credential expression may be routed to different paths, based upon the content of the trust credential expression itself, or resolved based on configuration settings controlled by the administrators of the services that were specified.

Figure 4:
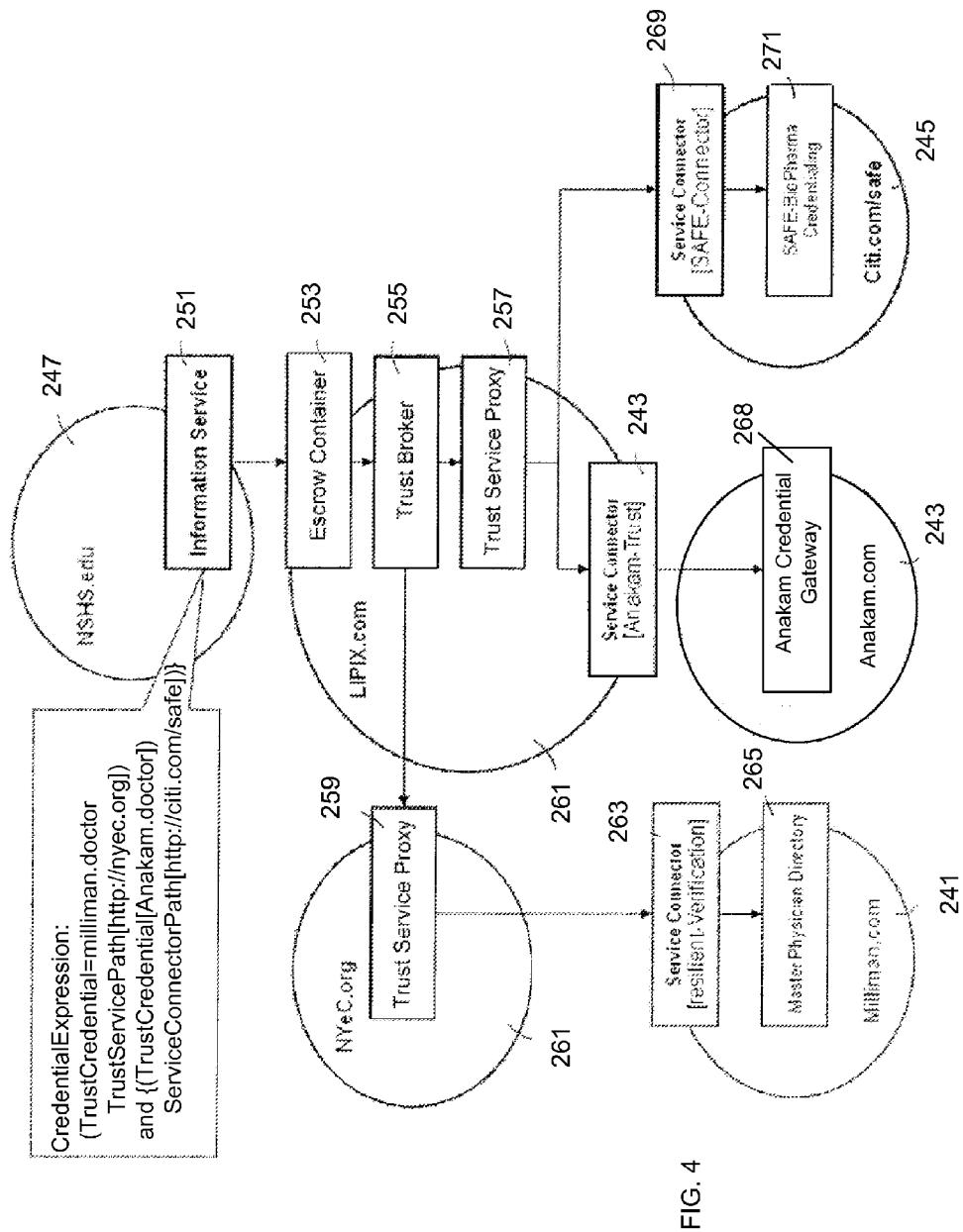
FIG. 4 is a flow chart illustrating a credential expression mapping.

With reference to FIG. 4, a flow chart illustrating a credential expression mapped to a distribution scheme. The paths of evaluation for each trust credential can be determined in various ways (1) Explicitly specified in the original credential expression, (2) Resolved by a Trust Domain Service explicitly specified in the credential expression, (3) Resolved by administrative configuration settings in each trust component that maps a Trust Credential name to specific Trust Broker, Trust Service Proxy, or Service Connector paths, (4) Routed to the default path for each trust component. The default is to route to services on the same domain path.

FIG. 4 illustrates a credential expression that includes three trust credentials (Milliman.doctor 241, Anakam.doctor 243, SAFE.doctor 245) that is passed from a relying party hosted at NSHS.edu (North Shore Hospital) 247 to trust server hosted at LIPIX.com (Long Island Patient Information Exchange) 249 in an escrow container 352. This credential expression is ultimately routed across five nodes of the trust network.

Figure 5:
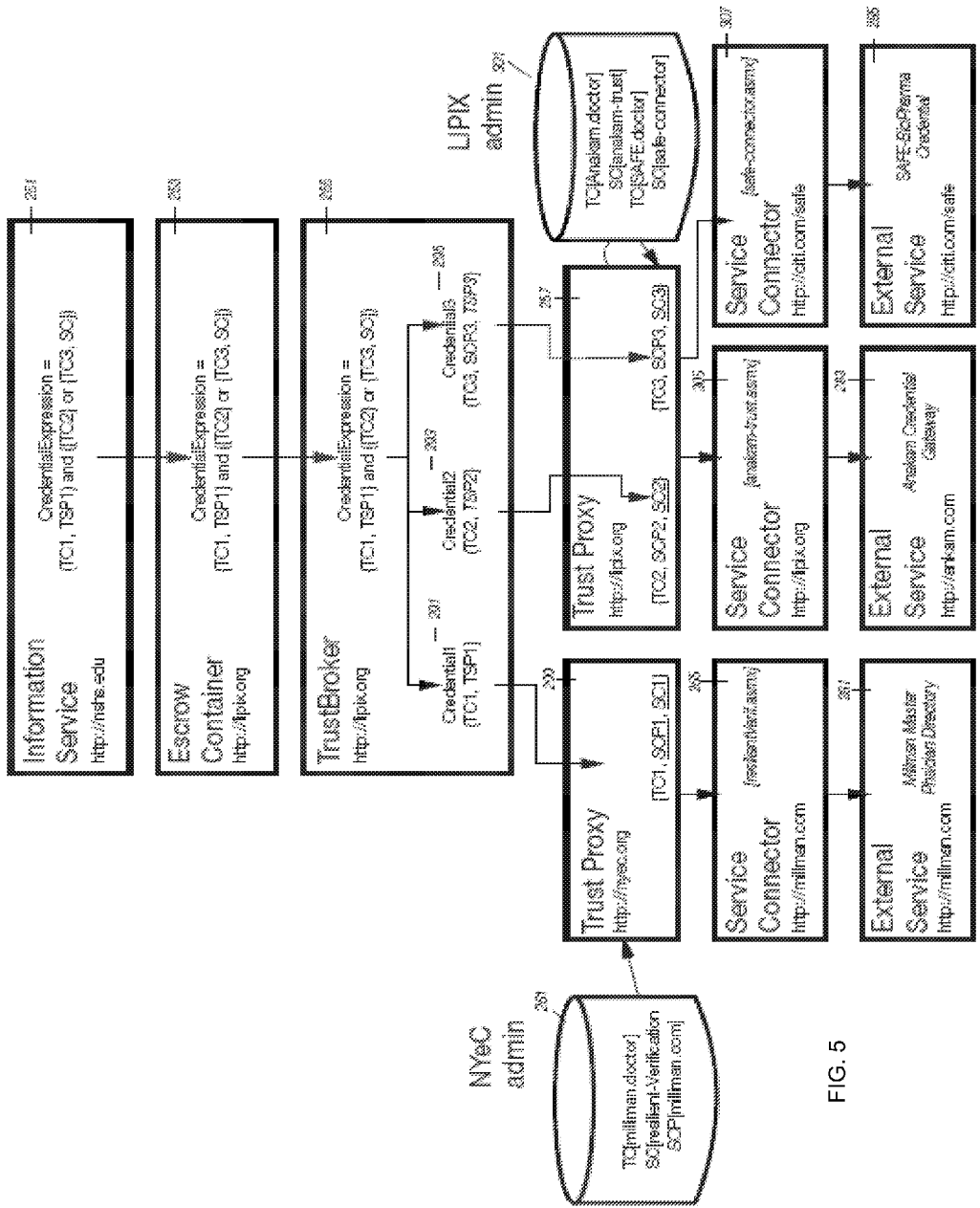
FIG. 5 is a flow chart illustrating resolution of Credential Expression.

FIG. 5 illustrates how each of the three credential expression elements 291, 293, 295 are routed and resolved to reach their ultimate destination. First, the Information Service 251 at North Shore Hospital 247 passed a partially specified credential expression via a RequestCredential( ) method to Trust server hosted at LIPIX. Since the original credential expression doesn't specify a TrustBrokerPath, the trust server passes the credential expression to its local Trust Broker 255.

FIG. 5 illustrates the resolution of Credential Expression to fully specified credential elements. The credential expression is transmitted from the information service 251 to an escrow container 253 and then to the trust broker 255. At the Trust Broker 255, the requested Trust Credentials 291, 293, 295 are routed to different paths. In this example, the credential expression 297 has an explicit clause to route the Milliman.doctor credential to a TrustServiceProxy 299 at NYeC.org (NY eHealth Collaborative.) Neither Anakam.doctor or SAFE.doctor have a TrustServicePath clause, so they are routed by default to a TrustServiceProxy 257 also hosted at LIPIX.

The trust authority administrators 261 at NYeC.org have configured their TrustServiceProxy 299 with an administrative mapping that routes TrustCredential=Milliman.doctor to a ServiceConnector="resilient-Verification.asmx" 265 and ServiceConnectorPath="http://www.milliman.com". Since the original credential expression didn't explicitly specify the ServiceConnector or ServiceConnectorPath for Milliman.doctor, these administrative mappings are used to resolve the RequestCredential( ) routing to an external service 281, http://www.milliman.com/resilient-Verification.asmx.

The trust authority administrators at Lipix 301 have configured their TrustServiceProxy 257 to map TrustCredential=Anakam.doctor to ServiceConnector="Anakam-trust.asmx" 305, and TrustCredential=SAFE.doctor is mapped to ServiceConnector="SAFE-connector.asmx".

Again, since the ServiceConnector wasn't specified explicitly in the original credential expression, the TrustServiceProxy 257 uses its administrative directory to resolve the ServiceConnector settings. The original credential expression did explicitly specify that ServiceConnectorPath=http://citi.com/safe for TrustCredential=SAFE.doctor, so its RequestCredential( ) invocation is routed to service connector 307 http://citi.com/safe/SAFE-connector.asmx.

Since there is no explicit or administrative mapping for the ServiceConnectorPath of the Anakam.doctor credential, the RequestCredential( ) method is routed to the default path (i.e. the same domain) with the service connector 305 resolved by the LIPIX admin directory—http://lipix.org/anakam-trustasmx.

Each ServiceConnector 265, 305, 307 is able to bind to the software infrastructure specified by their respective trust authorities, so the fulfillment of trust credential requests may be routed to external services 283, 285, 285 that are at different domains than the trust service.

5.4 Trust Domain Service

A Trust Domain Service is loosely analogous to Domain Naming Service (DNS) and a reputation system. Each Trust Domain has a root Trust Domain Server which manages a set of Trust Profiles. Each Trust Profile maintains a database of policies and tables that define trust credential routing maps, white-lists, black-lists and various trust-rank, performance, licensing, and other reputation attributes and metrics for individual Trust Brokers, Trust Service Proxies, Service Connectors, other Trust Domains, etc.

The white-lists, black-lists, attributes and metrics and policy specifications may be defined and maintained directly by each root TrustDomain, and/or by reference to other Trust Domain Profiles or third-party trust ranking or reputation services. Individual Trust Domain Profiles may include links to global Trust Network Profiles, indicating that they conform to standard policy patterns. Profiles may also have reputations confirmed by independent authorities.

A TrustDomain can be specified within a credential expression with a clause {TrustDomain=TrustDomainURL}, where the TrustDomainURL includes a concatenation of the root Trust Domain Service path, the Trust Profile to be applied, and one or more EvaluationCriteria (delimited with '&') by which the Trust Profile is to be evaluated against the Trust Credential Expression. The Trust Domain clause may either apply to the entire credential expression (if it is in a separate clause), or it can apply to an individual credential expression element (if it is enclosed within a TrustCredential clause). If a domain clause applies to entire Credential Expression: TrustDomain=http://kp.org/ClinicalRecords&wl} {TC=AMA.doctor} AND {TC=Kaiser.Doctor}. And if a domain clause applies to only an individual element: {TC=AMA.doctor} AND {TC=Kasier.doctor, TrustDomain=http://kp.org/ClinicalRecords&wl}.

Every Trust Server includes a local Trust Domain Service which maintains a cache of Trust Domain Profile criteria that it has satisfied while evaluating previous credential expressions, and may also maintain replicated copies of Trust Profile entries from other Trust Domain Services. Locally cached records may be verified based upon digital signatures, SAML certifications, or hashed log entries in a tamper-proof stored exchanged with other Trust Servers via cryptographic challenge-response protocols (which are much lighter weight to issue and verify than digital signatures).

Cached entries will have limited life-spans, and will need to be refreshed or synchronized periodically to verify that profiles haven't changed. Refreshing the cache will happen naturally as a byproduct of usage, but can also be actively managed by administrators, peer-to-peer propagation algorithms or trust syndication services that cooperate to improve availability and reduce latency.

When a TrustDomain clause is evaluated by a Trust Server, it will initially check the cache of its local Trust Domain Service to see if there is a current cache record that satisfies the criteria, and if not it will redirect the request either to the root Trust Domain Service for that Trust Domain, or (to reduce latency or distribute loading) to some other Trust Server that maintains replicated copies for the Trust Profile.

Trust Domain Services communicate via peer-to-peer protocols, and any one can concurrently serve as a root server for one or more Trust Domains, and as a replication peer for other Trust Domains. For very high volume Trust Domains, multiple Trust Domain Servers can simultaneously serve as root servers, using various approaches to synchronize and propagate changes.

A Trust Domain Service can perform two functions. First, it can validate that various elements of the Trust Credential expressions satisfy the policy criteria of specified Trust Domain Profiles, and redirect routing as necessary to ensure compliance. For example, it might validate each service against the profiles white or blacklists, check that they satisfy some set of criteria—i.e. a Service Connector must have a trust rank from a particular authority, that the TrustBroker executes on a Trust Computing Platform, and that a white-listed zero-knowledge token service hosted in a different domain be used in generating audit records and locator service entries.

Second, a Trust Domain Service can resolve a partially specified Trust Credential Expression element (minimally a TrustCredential name) into a fully-specified Trust Credential Expression, including paths for Trust Brokers, Trust Service Proxies and Service Connectors, Locator Services, and Zero-knowledge token services. Among other things this allows safe "late-binding" of trust services in order to improve performance and availability without compromising security.

5.5 Trust Service Proxy

The Trust Service proxy is a proxy server used during interactions with the trust server when zero knowledge tokens are required within credential expressions. It's role is to pre-process a credential expression by invoking the zero knowledge token server to obtain zero knowledge tokens and then substitute them into the credential expression before forwarding the expression to the trust broker for evaluation.

Trust Service Proxy can be configured so that it will not pass a combination of attributes to a single Trust Service that could be used to associate the identity of the subject with the contents of the protected resource being accessed, or when the protected data accessed concerns a person, to associate the identity of the subject with the identity of the user.

5.6 "Zero-Knowledge" Algorithms

The Trust Network incorporates a variety of "zero-knowledge" design patterns to protect security and privacy.

These algorithms support the ability to syndicate trust capabilities (authentication, verification, policies, audit, etc.) across many different, independent Trust Service providers while preventing any participant from learning sensitive information they could use maliciously. This ability depends on a variety of mechanisms such as zero-knowledge token services that generate one-time-pad opaque tokens, one-way cryptographic hashes, encrypted tokens, cryptographic challenge-response protocols, digitally-signed code, Trusted Computing Platforms, encrypted storage, and Trust Domain Services. Collectively, these algorithms make it possible to partition knowledge and control over security and privacy across a network. No individual node or organization can breach the security, and any potential points of vulnerability (i.e. indentify proofing) can be mitigated by syndicating them across many neutral and independent service providers.

An external application that requests authorization will learn only whether or not authorization has been granted. It will not learn the identity of the specific Trust Services granting credentials beyond those specified in the original request. The Access server never shares the protected resource with other services of the Trust Network, only the attributes to evaluate the credentials are passed. These attributes are less sensitive than the protected resource itself. For example, the attributes might include an "Includes HIV Status" tag, but not whether or not the patient is actually HIV positive, or the values of lab results that could be used to infer HIV status.

Individual Trust Services and their associated Service Connectors will only learn the specific credential they are being asked to evaluate, and the tags necessary to support that evaluation. They will not learn why the credential was requested or which other Trust Services are involved in satisfying the overall authorization request. Individual Trust Services will have limited visibility into the overall authorization request tag set, separating individually identifying information about the user that is requesting access, the subject of the Data Object (i.e. the patient), and tags describing the contents of the record (i.e. whether it contains psychotropic drug information).

For example, a phone confirmation service will only learn the phone number it is supposed to call, but not the identity of the user it is authenticating, or what information that user is attempting to access. Similarly, a healthcare policy service might see tags describing the contents of the Data Object (i.e. "contains HIV status") in order to determine what verification and authentication credentials a user must have in order to access it, but would not know the identity of the user or the patient.

Verification Services can safely reveal sensitive information to a Trust Broker about their authentication criteria for verifying a user without revealing their verification criteria to any other parties. Only a user who can satisfy the verification criteria (i.e. answer the correct phone, etc.) will be able to verify their eligibility for that credential.

For example, employer verification service might specify that a user can earn an "employee" credential by answering their work phone number and proving knowledge of the password for their corporate email address. A malicious user or Relying party would not be able to determine who the company's employees were from the Trust Network unless those employees specifically cooperated. A verification service can also control which other authorities are able to directly request their credential, and can specify any criteria they like about when their credential can be used—for example requiring that an audit service be used whenever an employee asserts their employee credentials.

The Trust History service will learn what credentials a user has been granted in various sessions, but will not learn about the contents of the Data Objects they were trying to access, or the subject of those records. It will also not know the context of which individual credentials are related to a specific authorization request.

The Trust Broker is the coordinator and therefore must know the full context of each authorization request. The Trust Broker handles each authorization request individually and in a single user session, so it has no need for a persistent storage, and it provides no mechanism for an administrator to observe its activities. Also, the Trust Broker is the same for all users and uses, and its executable code can be digitally signed and executed on a Trusted Computing Platform to eliminate any risk of breach, even by its own administrator. Finally, an Access server can use a Zero-knowledge token service to convert all message traffic to the Trust Broker into opaque tokens, so that the Trust Broker (which is the only component which understands the context of the authorization request) will not understand the actual meaning of the credentials or tags it is processing.

Taken together, this means that a Relying party relying upon the Trust Network to authorize access to information would not need to trust any particular service or provider. Trust emerges from the collaborations among different services across the network, and is verifiably enforced by the protocols and algorithms encoded into the core services of the network.

5.6.1 Zero-Knowledge Messaging and Service Orchestration

The first zero-knowledge design pattern is relying upon globally unique, one-request-only opaque tokens to route and validate all request-response interactions between individual services. Each request is assigned a Globally Unique ID (GUID) which serves as a shared-secret reference known only to the two services. The GUID itself has no inherent meaning—it is simply a pseudo-random and unique string whose meaning was established when one service made an individual request of another.

Figure 6:
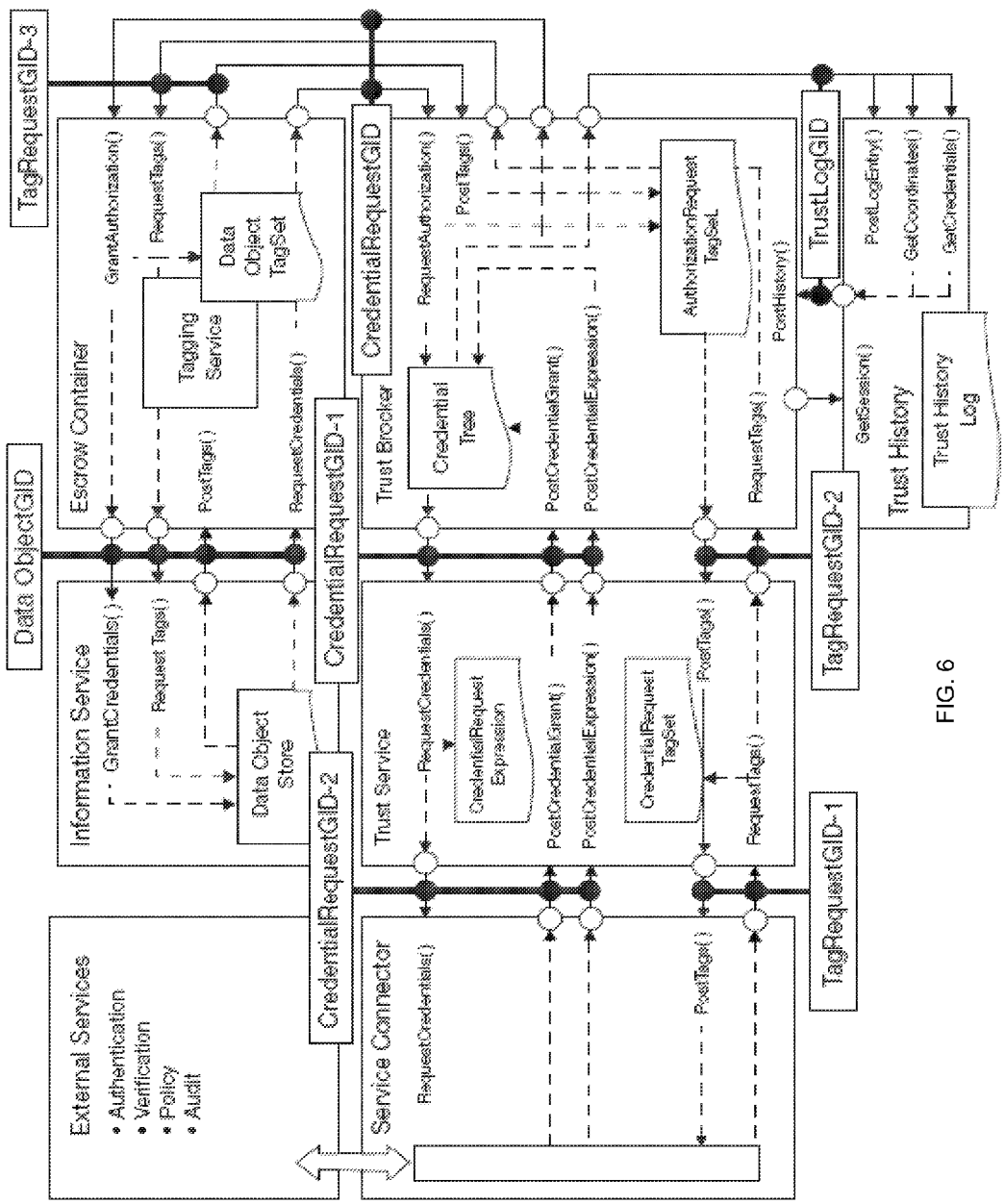
FIG. 6 illustrates the set of different opaque tokens.

The opaque tokens are used as the basis for abstract, dynamically generated, self-organizing address spaces of the requesting and responding services. FIG. 6 illustrates the set of different opaque tokens generated to form connections between adjacent services involved in evaluating a root credential request from a relying party.

There are also a set of distinct DisplayGIDs generated to coordinate collaborations each service and their corresponding display controls. Each DisplayGID is an opaque token that is associated with only one CredentialRequestGID, and only the two services involved in issuing and handling each RequestDisplay( ) will know how to map a DisplayGID into its corresponding CredentialRequestGID. Only the Display- GID is passed to user-facing display controls (which execute on the browser and therefore are inherently more prone to attack), preserving the CredentialRequestGID as a shared secret.

Having a common root address makes it possible to bind the address spaces for each pair of interacting services in order to pass messages and maintain a distributed multi-layer cache for tags related to each request. The CredentialRequestGIDs serve as the primary keys for a virtual object database that emerges for each request. The components have a standardized and consistent namespace across services for any credential request regardless of the specific trust services involved.

The opaque tokens are also used to unambiguously and anonymously validate messages between services. For example, if an Access server has its GrantCredentials( ) method invoked by an anonymous service with a reference to a specific CredentialRequestGID it received from an earlier RequestCredential( ), it can safely assume that it is an authentic response from whichever Trust Broker handled the request.

Each Credential Request results in a virtual private network with addresses based on opaque tokens. The private network is partitioned into isolated sub-network address spaces for every request (i.e. CredentialRequest, TagRequest, DisplayRequest), and each service only has visibility into its own state and a reference to its' immediately adjacent services. Each service has a strictly limited view, yet data is able to flow smoothly and securely end-to-end across a self-organizing network.

Each pair of interacting services will interact via their own distinct opaque tokens. For example, an Relying party will pass an opaque token DataObjectGID when it invokes the RequestsCredential( ) method on an Escrow Service for a specific Data Object. All subsequent interactions from the Escrow Service to the Relying party (GrantCredential, RequestTags, RequestDisplay) reference DataObjectGID as a shared secret to bind address spaces and validate messages.

The Access server receives a different opaque token CredentialRequestGID when it invokes the RequestCredential( ) method on a Trust Broker for that Data Object. All subsequent interactions from the Trust Broker to the Access server (GrantCredential, RequestTags) reference CredentialRequestGID as a shared secret to bind address spaces and validate messages. Only the Access server knows that the CredentialRequestGID refers to the DataObjectGID known by the Relying party.

Similar patterns apply to TrustLogGID, CredentialRequestGID-1, CredentialRequestGID-2, TagRequestGID-1, TagRequestGID-2, TagRequestGID-3, DataStoreGID, among others. In each case, the GUID is shared secret used to bind address spaces and validate messages between adjacent services. Each service in turn is able to map one GUID to the next in the chain (i.e. TrustBroker can map CredentialRequestGID to CredentialRequestGID-1) in order to propagate the message.

A separate set of DisplayGIDs are generated as shared secrets to bind address spaces and validate messages between Trust Network services and their corresponding Display controls. In this case, DisplayGIDs are routed via the adjacent service that implements the RequestDisplay( ) method, so a single DisplayGID will be known four distinct components. For example, if a ServiceConnector passes a DisplayGID to a TrustProxyService, it will in turn be passed in turn to the TrustServiceDisplay, ServiceConnectorDisplay, and then back to the ServiceConnector in order to validate messages to GetDisplayState.

5.6.2 Zero-Knowledge Token Service

A second zero-knowledge design pattern involves using a Zero-knowledge token service as an intermediary between services. This anonymizes the flow of requests and responses by converting xRequestGIDs, credential expression elements, tags and PostBackPath URIs for services into one-time-pad opaque tokens.

Specifically, the zero-knowledge token service assigns an opaque token (i.e. a GUID) to any data structure (which can be an attribute, array, file or address) and can resolve that token back into the original data structure on demand. Each element of a complex data structure can be assigned a locally unique relative ID, creating a globally unique and opaque reference for that element of form DataStructureGID.ElementID. This serves as a logically equivalent but semantically opaque reference that can be used interchangeably with the original data element.

A Zero-knowledge token service can be located and controlled independently of the Access server or other service that invokes it. For example, a healthcare provider's information service might specify a neutral Zero-knowledge token service that is subject to independent patient control whenever a Data Object includes individually identifiable patient information. Multiple Zero-knowledge token services can be applied to a single Credential Request, so that multiple parties could independently block access to information.

The Zero-knowledge token service can be used in five ways (among others) to add additional protection against malicious, compromised or un-trusted service providers:

allows services to invoke each other anonymously via a Zero-Knowledge proxy service, allowing them to perform their individual services while remaining ignorant of the IP address or internet domain of service providers they are collaborating with.

eliminates shared secrets (i.e. CredentialRequestGIDs) between adjacent services (i.e. Access server and Trust Broker), so that even if multiple services are compromised and collude, they will have no common reference with which to piece information together to understand the context of their individual activities, unless they were also able to compromise the Zero-knowledge token service.

The zero-knowledge token service allows the Trust Broker, Trust History, Locator Services and other Trust Services (i.e. Audit services) to operate on fully or partially anonymized credential expressions and tag sets made up of opaque tokens that are not understood by either the Access server or any Trust Services.

The zero-knowledge token service provides mechanism for partitioning TagSets, so that Trust Domain Profiles can enforce policies that prevent different classifications of Tags (i.e. user identity attributes and subject identity attributes) from being revealed to the same Service Connector. (This can also be implemented by selectively encrypting tags with different keys, or selectively hashing tags with different cryptographic salts.)

The zero-knowledge token service supports (in conjunction with cryptographic hashing techniques) the creation of zero-knowledge Locator, DataStore and Query Services based upon indices and databases made up of opaque tokens, cryptographic hashes, and classification meta-data that cannot be used to identify individual people or trust authorities.

Interfaces to the zero-knowledge proxy service are natively embedded in the Access server, Trust Broker, Trust Service Proxy, Trust Domain, Zero-knowledge Search Proxy, DataStore and Trust History services; making the translation back and forth from the original credentials and tags into opaque tokens both transparent and automatic.

5.6.3 Zero-Knowledge Credential Expression Evaluation

Since the Trust Broker's algorithms for evaluating the Credential Graph are based exclusively on logical operations on Boolean expressions, the results of its processing are not impacted by operating on a combination of one-time-pad opaque tokens (generated by Zero-knowledge token services) and cryptographic hashes instead of the original semantically meaningful credential expressions and tags.

Service Connectors on the other hand must have access to the unmodified tags, since they interact with External Services and generally incorporate logic that depends upon the semantic content of tags which would be disrupted by using opaque tokens or cryptographic hashes.

For example, a phone confirmation service must know the actual phone number it is supposed to call, whereas the Trust Broker only needs to be able to confirm whether or not there is a match between a phone number that a verification service requires and a number that an authentication service has verified the user has answered.

Zero-knowledge one-time-pad opaque tokens and cryptographic hashes each offer distinct properties that, when properly combined, satisfy the conflicting requirements of allowing selective visibility by various trust services into credentials and tags without revealing any meaningful information to the Trust Broker:

Operating on one-time-pad opaque tokens (which can be resolved back into the original clear token by the zero-knowledge token service) allows the Trust Broker to coordinate interactions with a Trust History Service, Locator Services, and various Trust Services to verify that credential expressions have been satisfied without learning anything about what individual tokens mean. The zero-knowledge token services remain in absolute control over which services and authorities can resolve the original token values and it can be made provably impossible for the Trust Broker to learn anything about the information (i.e. trust credentials or tags) it is processing.

A cryptographic hash function is a transformation that takes an input and returns a fixed-size string, which is called the hash value. Such a hash value is effectively unique to the clear-text input string (and hence often referred to as a digital fingerprint), and cannot be reversed into the original cleartext except through a brute-force attack which (for a robust hash function) is computationally infeasible.

Cryptographic hashes can be used to optimize pruning of the Credential Graph where the equivalent trust credentials are added to the same graph from different sources, and therefore have different zero-knowledge token service opaque tokens that resolve to the same values.

For example, if two different identity verification credentials (i.e. Kaiser.doctor and AMA.doctor) independently resolve into requiring Authentify.PhoneConfirmation at 415.265.3250, a zero-knowledge token service will assign each of these requests for the same authentication credential a different opaque token. If the Trust Broker relied upon these opaque tokens alone, it would be unable to determine that they both referred to an equivalent authentication requirement, and therefore would call the user twice.

To avoid this, each trust service could apply a cryptographic hash of an input string derived from various attributes of the CredentialRequest in order to create a unique digital fingerprint. The Trust Broker's credential graph pruning algorithm could compare these digital fingerprints to detect when different trust services are requesting an equivalent credential, without knowing anything about what the actual requested credential is. To ensure that the original string submitted to the cryptographic hash function cannot be recovered from the resulting hash code, it must incorporate elements that will vary across requests and are sufficiently long and variable as to be invulnerable to dictionary attacks. Including attributes such as the PostBackPath, the UserID, the Trust Credential Name and Parameters (i.e. Phone number) will yield an input string that is invulnerable to dictionary attacks.

Specifying a Trust Domain Profile that requires use of opaque/hashed values in all communications with the Trust Broker would make it provably impossible for the Trust Broker or the service provider that hosted it to learn or reveal anything whatsoever about the trust network transaction it processed without the support of the zero-knowledge token service(s) by the Relying party.

5.6.4 Trust-Validation and Trust Domain Services

Any trust network service (i.e. Trust Brokers, Trust Services, Trust History Services, Locator Services, Access servers, Zero-knowledge token services and Data Storage Services, etc.) can incorporate trust-validation features that selectively determine which services they trust in specific contexts. The criteria for trust validation can be built into each service, can be defined directly by its administrators, or be based on Trust Domain policy profiles or other third party services.

A service can either refuse to interact with un-validated services, or only interact with them using encrypted or hashed data or via zero-knowledge tokens. There are a variety of mechanisms available for implementing trust-validation features. In an embodiment, a service requestor may be required to authenticate itself to the service provider using standard infrastructure, verifying that it is specifically authorized or can satisfy specified Trust Domain policies.

A service requestor may be required to encrypt sensitive information that must pass through an un-validated service with a public key for which only authorized recipients have the corresponding private key. Thus, only services that receive the encrypted content (which may be routed through various intermediary services that aren't allowed to have visibility into or know of original source or destination of the content) and can access the private key (or a trusted decryption service) can access the clear-text content.

A service requestor may be required to produce a valid digital signature or SAML cert; or validate itself via cryptographic challenge response protocols (i.e. Message Authentication Codes) to prove that it is an authorized recipient that satisfies specific Trust Domain policies.

A service requestor may be required to apply a one-way hash function on a shared reference (i.e. a DataStorageGID or a zero-knowledge token) using one or more shared secret cryptographic salts available only to authorized requestors and to the service provider. The cryptographic salts could be distributed via Trust Domain Services (either preemptively or on demand) to authorized recipients that satisfy trust profile policy criteria. The service provider would verify a match of a salted cryptographic hash value, proving that the requestor had both received the shared token and had access to all of the necessary cryptographic salts. Individual salts could correspond to different trust attributes from different Trust Domain Services specified by different stakeholders, allowing efficient cross-certification of the requesting service by independent authorities.

While use of zero-knowledge and cryptographic hash services will incur additional computation and network overhead, they can be used selectively when large datasets of privacy sensitive information that are vulnerable to off-line attack are involved, to compensate for trust services operating on un-trusted computing platforms, or to handle cases where services are required to interact with unfamiliar and un-trusted authorities.

5.6.5 Trust Partitioning

The zero-knowledge token service can be configured so that the Trust Broker (which is the only service which has access to the full context of each overall Authorization Request) operates on intrinsically meaningless opaque tokens, while the Service Connectors only have visibility into the limited set of tags and credential names relevant to a single Credential Request.

A Trust Domain Service and/or Privacy Firewall can be used in conjunction with the zero-knowledge token service to rigorously control which Service Connectors and other Trust Network services are able to access what types of non-opaque tags or credentials. For example, individual tags or collections of tags can be classified based on their content, with meta-tags specifying whether they include identity attributes of the user requesting access (i.e. email address, name, medical license number), identity attributes of the subject of the requested records (i.e. name, address, date of birth, phone number, roles, social security number, etc.), attribute values or metadata that might be used to infer identity of the subject via pattern matching (i.e. dates/times of office visits, diagnoses, salaries, etc.), attribute values or metadata that cannot be used to infer identity of the subject, or metadata describing the schema or contents of records that cannot be used to infer identity.

A zero-knowledge token service can be used as an independent policy enforcement point for Trust Domain policies, only translating the opaque tokens into the original tags if the requesting service is cleared by the various policy criteria bound to the Credential Request.

The user activity log information maintained by the Trust History service can be protected against brute-force attacks by malicious administrators via a number of techniques. First, authentication coordinates, trust credentials, MachineGUIDs, SessionGUIDs and other attributes in the Trust History log entries can be cryptographically hashed to obscure their meaning without compromising the ability to search log entries to "prune" credential graphs.

Log entries including identifying attributes (i.e. authentication coordinates such as phone number or email address) would normally be vulnerable to dictionary attacks can be protected by using the MachineGUID or other attributes which can be acquired from the client machine can be used as a cryptographic salt.

Key services that could be used to breach security if they are compromised can be verified by running them on Trust Computing Platforms, using Direct Anonymous Assertion to remotely validate themselves to other trust services.

Special-purpose zero-knowledge token services can be deployed that are hard-coded to only interact with specific digitally signed services at known addresses, and that incorporate fixed policies that cannot be altered or tampered without breaking their digital signature.

The Trust Network maintains a reputation and certification system for any participating services, components and people. Each participant can selectively expose trust credentials to demonstrate evidence of their trustworthiness according to various authorities. The reputation system for services and components and their authorities is enabled by the same network of authentication, verification, audit services used to authorize access for human users.

Reputations can be asserted anonymously, yet subjected to mutually agreed-upon neutral audit and dispute resolution services to protect against malicious or fraudulent behavior. Audit, messaging and analytics services can all be configured to operate on cryptographic hashes and opaque tokens generated by neutral zero-knowledge token services, enabling end-to-end policy enforcement across the Trust Network without trusting any individual administrator or system with visibility into information that could be used to compromise policies.

For example, a zero-knowledge medical information access control audit service could be configured so that audit records are stored at a neutral service. Each audit record would include "in-the-clear" meta-data and cryptographic hashes describing the context of the access, and one-time-pad opaque tokens that can be resolved via a zero-knowledge token service to the identity of the clinician and the patient, and the context of what information was accessed, how the clinician was authenticated, the form of consent relied upon, etc.

The context metadata might include indicators supporting the doctor's attestation that she has patient consent; such as whether there is a prior claims history, whether the patient was referred to the doctor by another doctor or scheduling service, and whether the patient booked the appointment online or verified their consent from a known electronic identity.

The audit service might have a policy of allowing any patient whose identity can be verified to some minimum standard to see the log entries of which clinicians had accessed their records and what the source of their attestation of consent.

The audit service could also have a policy of sending a notification to the patient every time a clinician attests to patient consent without independent evidence of a patient-doctor relationship. They would send the opaque token representing the patient identity to a neutral messaging service, which would be authorized to resolve the identity of the patient and how to contact them, but not have access to the specific identity of the clinician or the context. The patient would be given the option of verifying their identity to ensure privacy, and then would be able to see who had claimed consent to view their records, and either confirm or contest the attestation. If the patient contests the claims, it could trigger a dispute resolution process that would selectively reveal the audit history to an arbitrator.

Recourse for bad behavior could be against an anonymous user's reputation, or against an identified individual after due process according to the terms specified by the audit and dispute resolution services.

The reputation system can be used to selectively restrict access to information flowing among services of the Trust Network in the process of evaluating authorization or credential requests, and also to establish the trustworthiness of trust credentials that are generated.

The Access server, Trust Broker, Trust Service Proxy, Trust History, Trust Domain, Zero-knowledge Search Proxy, and Zero-Knowledge Token services are all standard infrastructure whose functionality is identical for all users and uses, and therefore can be digitally signed and registered as trusted via the reputation system. If these components execute on a Trusted Computing Platform, it will be possible to remotely detect any tampering and exclude that service from the Trust Network. These services have built-in controls for how they share information, and do not have any administrative "backdoors" that a malicious administrator could use to access or infer information.

5.6.6 Zero-Knowledge Locator Services

A zero-knowledge search service can be created which allows fast indexed searches and analytics across many disparate trust services, without the search provider learning anything about the contents of the records or even which trust services have entries about specific users or sources of information.

Figure 7:
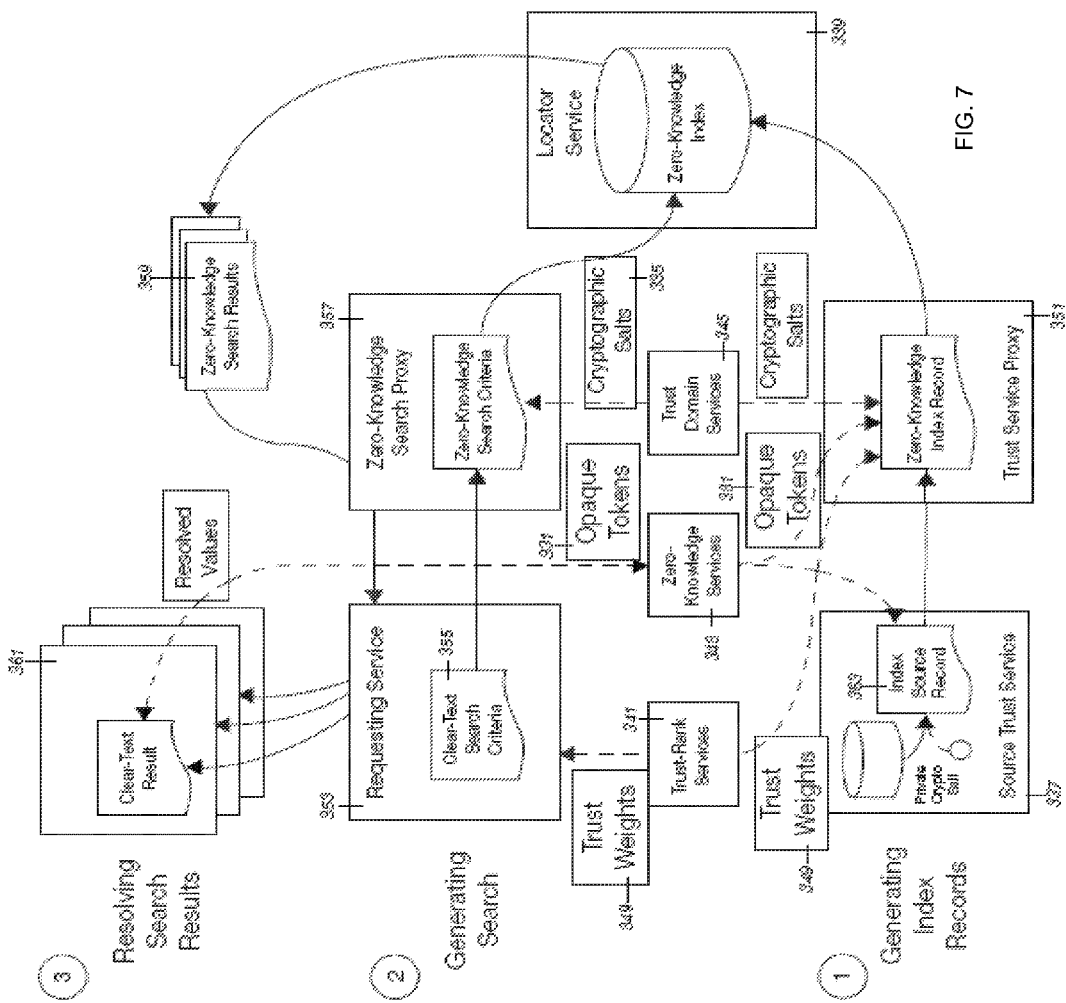
FIG. 7 illustrates zero-knowledge indices.

With reference to FIG. 7, zero-knowledge indices consist of one-time-pad opaque tokens 331, cryptographic hashes 335, and metadata that cannot uniquely identify the subjects of the search results. For example, a zero-knowledge identity locator service index entry can include some combination of the following:

Search Criteria Hash Codes: Salted one-way cryptographic hashes of search criteria—i.e. identity attributes, credential classification metadata, etc. One-way hashes support rapid indexed search of records from disparate sources, but cannot be reversed into clear-text. A single identity locator index entry may have more than one search criteria hash code, with some being primary keys that corresponds to a unique set of identity attributes, with the remainder being credential classification keys that are not unique to an individual but can be used to filter search results. The clear text search criteria elements can be unstructured text, a concatenation of attribute/value pairs (as in XML) or triples (as in Resource Descriptor Framework/semantic web).

Index Record Token: A globally unique opaque token 331 that resolves via a zero-knowledge token service to the source trust service and a unique reference for each index source record. This is used to allow the source trust service 337 to notify locator services 339 when individual index records should be deleted, either because they are no longer valid or the trust service's administrators want to the index entry removed from the locator service 339. They can also be used to notify trust services 345, trust ranking services 341, or replicated copies of a locator service indices when particular index records are stale. The Index Record GUID can also be used to in keyed-hash Message Authentication Codes to validate Trust-Rank metrics and the overall Index Record.

Trust-Rank Metrics: Clear-text non-identifying trust-rank/analytic metadata describing or classifying the contents of the record being indexed within a specified taxonomy. For example, a verification service might include metadata to specify that it had performed in-person proofing on a given person, and a Trust Ranking service 341 might issue metadata indicating whether the proofing process used by that service had been audited and certified to various levels. This metadata allows multiple index entries to be analyzed to derive trust ranks or other metrics, but cannot be used to derive the identity of either the user or the trust credentials.

Authentication Criteria Hash Codes: Salted one-way cryptographic hashes of the various combinations of authentication coordinates (i.e. phone number, email address, fax number, or distinguished name for an identity in a directory service) or authentication credentials that can be used to earn the trust credential. These cannot be resolved back to the clear-text authentication coordinates or credentials, but can be used to determine when different trust credential entries can be earned via the same authentication criteria. This can be used to by algorithms to find the most convenient set of trust credentials to earn a specified trust-rank threshold.

Duplicate Detection Hash Code: Salted one-way cryptographic hash of unique identifier for each trust credential for a given person. This can be used to detect duplicate index entries (so as to avoid double-counting entries for trust ranking algorithms), but cannot be used to identify the user or the trust credential. The unique identifier can be a concatenated string of any attributes or paths that are globally unique to the source entry—the length of the source string is unimportant because the hash function will reduce it to a standard length hash code.

Credential Result Token: Zero-knowledge token for trust credential user is eligible for, resolves via one or more zero-knowledge token services to fully specified credential expression element.

Credential Result Authentication Predicate Tokens: Zero-knowledge tokens for authentication criteria (either authentication coordinates or credentials) necessary to earn the trust credential, resolves to fully specified credential expression. These can be used for "anonymous identity", where a user authenticates that they are eligible for a trust rank credential (i.e. is a California Resident) using only the trust ranking service 341 as an authority, without referencing the underlying trust services. In addition to being guaranteeing privacy, it can also used to reduce latency in authenticating a user by optimistically mapping to the authentication credentials necessary to earn a trust rank without resolving and evaluating the underlying credential result tokens.

Anonymous Metering Tokens: Zero-knowledge tokens that resolve to anonymous metering or licensing services. It is used to track when index records are accessed and which services contributed, but cannot be used to determine anything about their contents.

Message Authentication Codes: Keyed-hash codes that provide a light-weight mechanism to detect tampering and verify the authenticity of locator service index records. For example, a Trust-Rank service might return a keyed-hash of the Index Record Token and the Trust Rank metrics it assigned to the underlying Trust Service.

The process of generating, searching, and resolving results of zero-knowledge indices can be partitioned across the source trust services being indexed, a zero-knowledge locator service proxy, the locator service itself, and a variety of different zero-knowledge and trust domain services.

5.6.6.1 Generating Zero-Knowledge Index Records

The indexing process begins with the Service Connector for each Trust Service preparing clear-text index source records. It invokes a zero-knowledge token service to generate the Index Record Token and uses a private cryptographic salt to generate the Duplicate Detection Hash code, which is used to identify duplicate index records that resolve to the same Trust Service entry.

Next, the Service Connector invokes a Trust Service Proxy via a GenerateIndexRecord( ) method, passing the Index Source Record. The TrustServiceProxy will invoke a variety of services in order to generate a Zero-Knowledge Index Record that corresponds to the Index Source Record, as follows:

One or more zero-knowledge token services will be invoked to generate the Credential Result Token, Credential Result Authentication Predicate Tokens, and Anonymous Metering Tokens. Multiple zero-knowledge token services controlled by different authorities (including individuals) may be "nested" for each token, so that resolving them will require authorization from multiple services hosted in different facilities and implementing different security practices and infrastructure.

One or more Trust Domain Services 345 will be invoked to acquire one or more cryptographic salts 335 that will be used to generate the Search Criteria Hash Code and Authentication Criteria Hash Code. Multiple cryptographic salts controlled by different stakeholders can be used in a single cryptographic hashing function. The salts 335 can be used as access control keys, since access to the same set of salts is necessary to compose a search query that will match the search criteria hash codes.

A Trust-Rank Service can be invoked to retrieve the Trust Rank weights assigned to the trust service specified in the Credential Result attribute of the index entry. The Trust-Rank Service 341 will also return a Message Authentication Code which is a keyed-hash of the Trust-Rank weights returned and the Index Record Token. This can be used to verify that the trust rank weights 349 included in the zero-knowledge index record are authentic and were not tampered with.

Finally, the TrustServiceProxy 351 posts copies of each Zero-Knowledge Index Record to one or more Locator Services 339, each of which aggregates index records from different trust or application services. The Locator Service 339 updates a series of search indices for each record, and may replicate the indices across various servers to reduce latency and increase availability.

The ServiceConnector 337, TrustServiceProxy 351 and Locator Services 339 will maintain administrative configuration policies that define which Trust-Rank 341, Zero-knowledge 343 and Trust Domain 345 Services, and Metering Services are used to construct Locator Service Indices, and what policies they will enforce.

5.6.6.2 Generating a Zero-Knowledge Search Query

In order to query a zero-knowledge locator service 339, the query criteria (i.e. user identity attributes, trust credential classification metadata) must be hashed using the same hash function and cryptographic salts that were used to generate the zero-knowledge index records.

The requesting service 353 will compose a clear-text search query 355 and pass it to a Zero-Knowledge Search Proxy 357, specifying which locator services should be searched. The Search Proxy 357 will retrieve the necessary cryptographic salts 335 from the Trust Domain Services 345 specified by each Locator Service 339, and then apply the hash function to the clear-text search query with those salts 335 to translate them into a zero-knowledge search query.

Next, the Search Proxy will submit the zero-knowledge search query to the specified locator service 339. The Locator Service 339 will return the zero-knowledge search results 359 either to the Search Proxy 357 or to the Requesting Service 361.

Note that the Locator Service 339 will not have any visibility into the clear-text search criteria 355 or the meaning of the Index Records 363 returned. Further, if the search results are routed through the Search Proxy 357, the Locator Service 339 will not know the identity of the Requesting Service 353. Thus, there is no need to "trust" the host of the Locator Service 339—they can learn nothing from the index records they host.

The Zero-knowledge Search Proxy is standard infrastructure which can be digitally signed and hosted on neutral infrastructure or a Trusted Computing Platform to protect against tampering and to ensure that no untrustworthy software can access the cryptographic salts necessary to compose search queries. It can (and generally will) be hosted by an authority independent of the Locator Service, and has no persistent storage and provides no administrative visibility into search criteria submitted or search results returned.

An authorized requesting service will be able to learn from the zero-knowledge search results alone (without resolving the Credential Result Tokens into clear-text) whether a specified user is eligible for specified types of credentials, as well as the Trust Ranking they can achieve if they satisfy the authentication criteria for those credentials. Thus, the ability to submit a search is restricted to authorized services—typically Trust Ranking or Policy Services.

Access to the cryptographic salts is controlled by policy criteria in the Trust Domain Profiles specified by the source Trust Services. These policy criteria might delegate control over querying privileges to one or more parties each of which can independently block access. This might include the subject of the records (i.e. the patient), the source Information or Trust Service that is being indexed, and any other stakeholders who have the authority and inclination to control whom may search specific entries (i.e. a RHIO or HIE organization functioning as a neutral policy authority).

Trust Domain Services provide a neutral general purpose mechanism to distribute control over search privileges over fragmented stakeholders, enabling privilege management and anonymous metering, so that Information or Trust Services can implement metered revenue models without knowing anything about who their users are or what records or services they have consumed.

5.6.6.3 Resolving Zero-Knowledge Search Results

Once the Requesting Service receives zero-knowledge search results, it can parse their clear-text Trust Rank metrics and determine which index entries to resolve into clear-text credentials, or route those entries to responding services authorized to resolve them into clear-text results.

Individual entries are resolved by submitting zero-knowledge tokens to the zero-knowledge token services that generated them, which validate the requestor is authorized (or a nested zero-knowledge token), and if so returns it. The zero-knowledge token services may either embed access control policies, or may invoke Trust Domain services that implement access control policies before passing tokens that authorize access.

The Requesting Service may resolve search results or pass the zero-knowledge tokens to a Trust Server which can resolve and/or forward them to a responding service.

Firms that specialize in search algorithms (i.e. Google, Microsoft, IBM) can offer personalized and/or high-performance zero-knowledge search and analytics services, that provide absolute assurance that the search provider is unable to learn anything from records or how they are accessed. Anonymous metering tokens can support low-friction revenue models that allow anyone to pay for custom search indices without anyone (including the organization paying for the service) being able to learn any fact they didn't already know, other than aggregate statistics which cannot be used to violate privacy.

6 THE ACCESS SERVER

An access server is both a tool for publishing and consuming services, and a component of the protection architecture. It serves a dual purpose. It is a gateway that controls the flow of requests to an external application called a protected resource. It is also an application development platform allowing a user to develop small applications that expose selected portions of the functionality of the protected resource in a form that is adapted for embedding within other applications.

Figure 8:
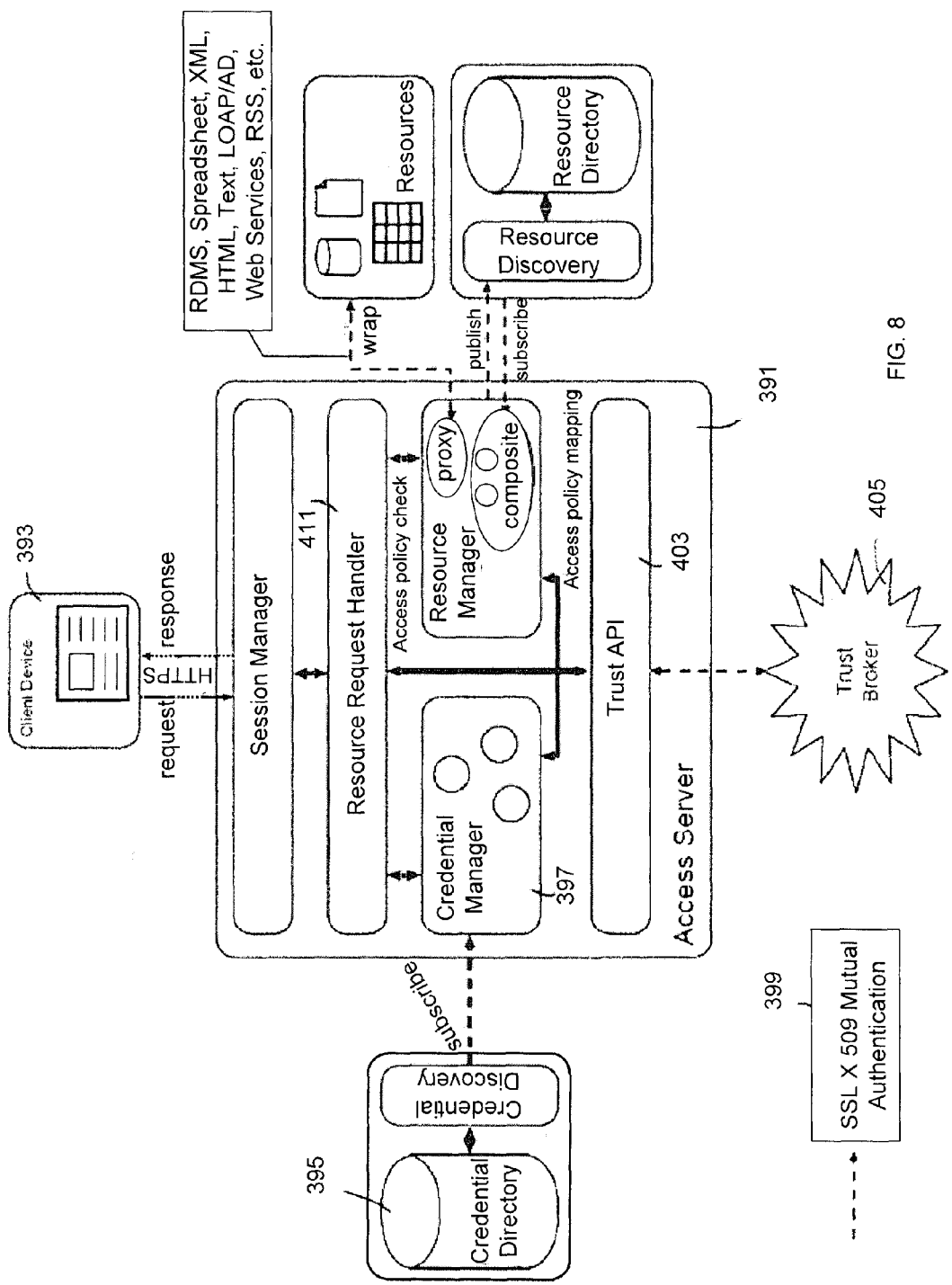
FIG. 8 illustrates an Access Server.
Figure 10A:
FIGS. 10A-10E illustrate examples of different information confirmation notices.
Figure 10B:
Figure 10C:
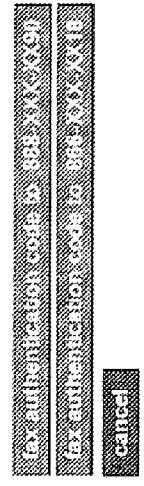
Figures 10D, 10E, 10F:

With reference to FIG. 8, an Access Server 391 is illustrated that can perform some or all of the following functions:

(1) Defines one or more protected resources managed by the Resource Manager subsystem.

(2) Provides one or more public interfaces though which a remote Client 393 can request the protected Resource, including HTTP and HTTPS, enabled by the Session Manager subsystem (3) Publishes each protected resource definition as a service to a service. Directory, which enables the service to be discovered by a remote Client (4) Subscribes to zero or more services (published by other Access Servers) from the service Directory managed by the Resource Manager subsystem (5) Subscribes to one or more Credentials from a shared Credential Directory 395 and managed by the Credential Manager 397 subsystem used to define application security policies for a protected resource.

When accessed by a client 393, the access server 391:
1. Receives an incoming request from a remote Client 393 for access to a protected resource
2. Invokes an external Trust Server 05 to check Credentials in order to decide whether to grant or deny a Resource request (enabled by the Trust API 403 subsystem)
3. (optional) verifies that the client can satisfy its security criteria, which in one embodiment may include authentication via X.509 Certificates 399.
4. Returns a response—either a denial of access or a copy of the requested Resource (enabled by the Resource Request Handler 401 subsystem)

6.1 Structure of a Protected Resource Definition

A Protected Resource Definition (PRD) defines a single named resource to be published by an Access Server. It may be composed of:

A Locator, which defines an IP address or other electronic address or computational resource identifier of the back-end resource (service) to be published. A back end source can be any existing application, database, directory or file system.

An Access Policy, which defines the combination of credentials, certificates and/or other criteria that must be earned by or on behalf a requesting client in order to access a protected resource. An access policy can be either static or dynamic, varying based on the content of the data accessed. An access policy may be invoked on every request to the protected resource.

A Standard which defines a data structure used by the access server to represent data obtained from the protected resource in memory. A protected resource may either define a unique standard or may reuse a preexisting standard.

A Standard Mapping, which defines how the data structure of data provided by the protected Resource maps to the standard used by the Access server.

(Optional) a user interface definition. The definition of a user interface to format the data provided by a protected resource for presentation on a computer screen.

A list of Resource Input Definitions, which define parameters that must be present within a request to access the resource in order to invoke the protected resource A Resource Input Definition (RID) defines a parameters required to fulfill a request for a protected Resource. It is composed of the following items.

a Data Type, which is either Primitive (a String, Date, Number or Flag) or Complex (a data type defined by a Resource Standard)

a Timing Type, which is either Immediate or Deferred. The timing type Immediate defines an input value that is required in order to fulfill a request for a Resource, i.e. the input value must be obtained before the Resource response can be returned, e.g. a set of engine performance metrics in machine-readable format that are used to compute an overall performance score that will be part of the original vehicle information sheet response.

The timing type Deferred defines an input value that is requested separately from the original Resource request, i.e. the input value is obtained as part of the ongoing interaction between the Client and the Access Server in the context of the original Resource request, e.g. a panel view in a human-readable format that shows the underlying performance metrics of a vehicle, which are shown when the end-user presses a button.

A Translation service (optional), used when the referenced resource type does not match the input Data Type and therefore must be transformed before being used A Source Type, which is either Client Attribute or Resource Reference (another protected Resource).

A Client Attribute is an input value that identifies some aspect of the Client (or Client Device) requesting the resource, e.g. a user-id for a person operating the web browser that sent the request. A Resource Attribute identifies some aspect of the resource being requested, e.g. a vehicle license plate number for a resource that returns data about a particular vehicle. A Resource Reference defines another a resource that will form part of the original requested resource, e.g. an engine description resource to complement or add to part of a vehicle information sheet.

A Resource Reference may be either fully or partially qualified. Fully Qualified means all information required to request the resource is defined by the RID. Partially Qualified means some of the information required to request the resource must be obtained at request time, either from the requesting Client or from the Resource Directory. The most common case of a partially qualified resource reference is where the type of Resource is known (from the complex Data Type part of the RID) but the Resource Reference is incomplete or contains wild-cards. In this case the Resource Discovery service in the Resource Directory is invoked to fully qualify the reference for the particular input, which may involve further input from the Client.

6.2 Access Policy Criteria

The Access Policies for a given resource may consistent of a variety of different criteria that may be expressed and enforced in different ways. It may include a set of Credentials subscribed to from one or more Credential Directories. The credential requirements for a given request may be combined into a logical Boolean credential expression and passed to a Trust Server for evaluation. Credential requirements may be used to specify a wide range of security and authorization requirements—user authentication, audit, logging, subscription terms, metering, etc.

An Access Policy may include a specification of security criteria the requesting Client machine must satisfy via validation of X.509 certificates or other methods. Such criteria might relate to the requesting Client's configuration or hosting environment, membership within one or more Trust Domains or administrative white lists, and/or various other certification or reputation criteria.

An Access Policy may also include a requirement that a resource response be transformed prior to releasing it to a given requesting Client, including but not limited to various types of Privacy Firewalls. This may include pseudonymization or de-identification, partial or full encryption or hashing of values according to specified criteria, substitution of zero-knowledge tokens for various attributes, introduction of random errors into numeric attributes, addition of watermarks, aggregation and/or statistical summarization, etc. The policy may specify what transformations are required based on the context of the request; what resources or services are authorized to perform the transformation; and other specifications of how the transformations should be performed and documented. Such transformation services may be published as Translation Resources via Access Servers, and may be managed and certified by Trust Domain Servers or other similar services.

An Access Policy may also include a requirement that communication between resources, Access Servers and Trust Servers be mediated by one or more proxies. An Access Server or Trust Server may function as such a proxy, republishing a resource or credential so as obscure the specific identity of the original source; and also to support various zero-knowledge algorithms and other mechanisms to isolate the publishers and servers from each other, to selectively filter communication, and to protect the original content of resources.

Such proxies can be daisy-chained for additional protection, or to concurrently satisfy policies from multiple sources. An Access Policy may include a specification of how Access Servers and Trust Servers should be separated by proxies, how they should be distributed across security or trust domains, and what transformations or other security services should be performed at various proxies. This can serve to limit the damage from a security breach in one or more server or trust or security domain. It also makes it possible strongly partition the knowledge of various participating organizations and servers, so as to enable strong assurances about the enforcement of privacy policies that do not depend upon the trustworthiness of any single organizations security mechanisms or their administrators.

An Access Policy may also include a specification of Display Policies that constrain which Display Brokers or other display resources are allowed to display information from or on behalf of the resource, where they may be hosted, whether cookies or other means of preserving context may be created, and they may be or should be composited or merged with display content from other sources, etc.

6.3 Request Sequence

This section describes the sequence of events that occur when a client makes a request to access a protected resource.

1. Access Server 391 receives a resource request from a Client 393 for a protected Resource. The request may or may not contain an existing Trust Session Id.
2. Access Server 391 looks up the protected resource definition
3. Access Server 391 retrieves the Access Policy that matches the protected resource
4. Access Server 391 uses the access policy to formulate a credential request
5. The access server 391 invokes a Trust Server passing the credential request and the Trust Session Id. If no trust session ID exists, the access server first invokes the trust server to create a trust session before making a credential request
6. Trust Server checks the Credentials using trust services as needed to verify credentials
7. (optional) The Trust Server 405 may callback to the Access Server 391 to request additional data and/or services as part of the policy checking, including interaction with the Client 393 which may involve multiple request-response cycles between the Client 393 and the Trust Server 405 where the Access Server 391 acts as the mediator.
8. The Trust Server 405 responds with a grant/deny to the credential request
9. If the root credential request is granted, then the access server may grant the Client resource request and a response is created (see Response Creation Sequence). When the resource requested is composite, further Access Policy checking may be required before the response to the client can be formulated and the resource served to the client 393.

FIG. 9 illustrates how two access servers 391, 441 may collaborate to deliver a compound service to a client device 393 using a shared trust broker 405.

6.4 Access Server Functioning as Access Broker

An Access Server may function as an Access Broker in "growing" a graph of dependent resources and orchestrating their interactions between each other and (optionally) the user. After receiving an initial request for a resource and determining that it depends upon access to other resources in order to return a response, the Access Server may either serve as a broker to locate and connect to such resources, or delegate the broker role to another Access Server. Delegation of the broker role might occur if the original Access Server does not satisfy the Access Policy requirements of one of the resources—for example a requirement that the broker be hosted in a certified hosting facility.

When serving as a broker, the Access Server will evaluate the Protected Resource Definition of each resource. If any of the Resource Input Requirements have a Source Type of Resource Reference, it will initiate a request for that resource, acting as either a local or remote Client. A Resource Input Requirement may specify either a specific resource or a Discovery Service resource. A Discovery Service resource specifies what amounts to query criteria for what resources satisfy the Resource Input Requirement. In the later case, the Access Broker will generate a request to the specified Discovery Service resource, evaluate the resulting set of resources that satisfy its criteria, and then initiate requests for one or more of those resources.

This process will iterate until there are no more unresolved or partially qualified Resource References, yielding a Dependent Resource Graph. The Access Server that functions as the Access Broker may optionally maintain a state machine that records the identities and requirements of each resource in the graph, their relationships and any sequential dependencies, and the status of each of their requests for dependent resources, Access Policy credentials and certificates, and requests for user interaction.

The Access Broker may compare the input requirements and output capabilities of each pair of directly dependent resources to determine if they are compatible, and if either translation or human intervention is required so that they can work together properly.

If translation is required the Access Broker may locate appropriate Translation Resources and insert them into the Dependent Resource Graph as necessary. The Access Broker may rely either upon specifications of appropriate Translation Resources maintained by the Access Servers of either or both of the dependent resources, a Discovery Service resource, and/or a Trust Domain Service. The criteria for selecting an appropriate Translation Resource can be specified in the Protected Resource Definition of either the publishing or consuming resource, or both. The Access Server may incorporate a heuristic for evaluating these criteria and handling either contradictions or ambiguity.

If human interaction is required, the Access Broker may generate an appropriate user interface component and may add it to the Dependent Resource Graph. Human interaction might, for example, be triggered if there is a requirement for prior human authorization (either from the user or from a third party) for access to a particular resource. It might also be initiated to allow the user to choose between multiple options of resources, either based upon which resource the user regards as most desirable, or based on the payment or security authorization requirements necessary to gain access.

In one embodiment, a single Access Server may function as a coordinating Access Broker that evaluates the Access Policy certificate and other security requirements of each of the resources in the Dependent Resource Graph, and ensure that each Access Server or other computing resource satisfies those criteria. If an Access Server does not have the necessary certificates or otherwise satisfy the necessary criteria, the Access Broker may communicate with it to request that it acquire them and/or specify how to do so, and confirm when this is done. If these criteria are not or cannot be satisfied by some Access Servers, then the Access Broker may delegate to an Access Servers that does satisfy the requirement, and restructure the graph as necessary by adding proxies and re-routing connections.

In an alternative peer-to-peer embodiment, the Access Server for each resource node in the graph serves as its own broker, communicating with the Access Servers of adjacent dependent resources to ensure that they satisfy the security certificate requirements.

Once all of the dependent resources whose RID timing is "Immediate" have been added to the Dependent Resource Graph, the Access Broker may evaluate the Access Policy credential requirements for these resources, generating a consolidated credential expression request and passing it to a Trust Server. Alternatively, each individual Access Server may send an credential expression to a Trust Server. In either case, the Trust Server will coordinate the evaluation of various trust services as necessary to satisfy the credential expression. As part of this the Trust Server may interact with Access Broker to satisfy requirements for establishing connections between Access Servers publishing specific resources with neutral logging, metering or tagging services. The Access Broker will manage the process of establishing these connections and, if necessary, linking in Translation Services or Proxies to satisfy the Access Policy requirements for each resource.

If the credential expression is ultimately satisfied, the Trust Server notifies the Access Broker, which notifies the Access Server for each service that release of their resource is authorized. The Access Broker may then orchestrate communication between and execution of services, and may coordinate with one or more Access Servers or other software functioning as Display Brokers.

6.5 Access Server Invoking a Display Broker

Any resource published by Access Servers and any Trust Service published by Trust Servers may specify Display Policies that define how it should displayed. These can include cosmetic criteria, but also security criteria that constrain what servers or domains are trusted to have visibility into the display content, whether and how they can be composited, criteria for which servers and domains are authorized to host the Display Broker or other display resources, etc. Display policies can also constrain what dependent resources are allowed to display within the same context, and how. For example, a Display Policy may specify that a dependent resource is forbidden to directly serve up HTML or other browser-based content from its own server or domain, so as to prevent it from depositing cookies or gaining direct visibility to the user's client device. Similarly, a resource or trust service may be limited to requesting display resources by specifying standard display resources that are configurable via parameters. It could also require that all data be de-identified before being routed to the display resource. These standard display resources (e.g. widgets or gadgets) may be screened or certified to ensure that they do not enable phishing attacks or contain malware.

In a preferred embodiment, Display Policies will be expressed as declarative data within an extensible taxonomy that can be dynamically combined and evaluated at execution time to generate a user interaction experience.

Any Access Server may delegate or route server requests to a Display Broker in order to accommodate the Display Policy requirements of any resources it publishes. The Display Broker serves as a reverse proxy that receives display and user interaction content, requests, and events from distributed access and trust services, generating a composite user interface from a single display resource. An Access Server could incorporate a Display Broker itself, or it may delegate to a specialized display service. Multiple Access Servers can redirect display resources to the same Display Brokers for a single user session, and can select a Display Broker at run time that satisfies the disparate Display Policies of the various resources being displayed.

The use of Display Brokers and Display Policies offers a variety of benefits in terms of usability and convenience while improving security. For example, it can be used to route and reverse proxy all display resources to a server and domain that is trusted by the client, avoiding problems with packet-filtering, cross-domain scripting, browser settings, etc. and other challenges. Compositing multiple display resources to a single server via reverse-proxying also offers significant advantages in turns of the responsiveness of the user interaction experience.

6.6 Generating a Credential Expression

If the trust services require parameters, the access server must generate a TagSet. Parameters are derived from attributes of the user, or attributes of the data object being accessed. For example, if the data object being accessed represented a patient's prescription history, a tag set for that object might include tags representing: Patient identifiers such as first and last name, whether the patient is a minor, whether the record includes psychotropic drugs, the state(s) of origin for the records, Whether the record contains indications of sexually transmitted diseases.

If the user identity is known, identity attributes for the user can be added or sourced from a master person index (i.e. PICS—Personal Identity Cross-Reference Service). In generating the TagSet, the access server can classify each element based upon whether it includes data that reflects information such as: the identity of the user requesting access, the identity of the subject of the DataObject, attribute values or metadata describing the DataObject that could be used to infer the identity of the subject, attribute values or metadata describing the DataObject that cannot be used to infer identity of the subject, metadata describing the schema or contents of the records that cannot be used to infer the identity of the subject.

The TagSet required will depend upon the parameters required by the trust services that will participate in the evaluation of the request. Since these are not always known in advance, a Trust Service may invoke a RequestTags( ) method to request additional parameter values. If the Access Server is unable to handle such a request, the TrustBroker may be forced to invoke the RequestCancelled( ) method.

The Access server is responsible for generating the tags necessary to evaluate the credential expressions it generates. It may tag its records directly, or invoke a variety of external Tagging Services to do so. To simplify administration and improve reliability, trust service providers can adopt consistent tagging conventions and other interoperability standards.

6.7 Response-Creation Sequence
1. Access Server gets the list of parameters for the matching protected resource definition
2. For each parameter:
   a. If timing type is Deferred, skip to next parameter
   b. If timing type is Immediate, continue
   c. If source type is Client Attribute, get the value from the caller, e.g., userID
   d. If source type is Resource Attribute, fill in the value for the requested Resource, e.g. vehicle license plate number
   e. If source type is Resource Reference, recursively request the referenced Resource passing the Trust Session Id (see Protected Resource Request Sequence above)
3. Access Server gets the Locator for the matched protected resource definition
4. Access Server marshals the back-end Resource request, using the required parameters
5. Access Server dispatches the request to the protected application/server
6. Access Server receives the response from the protected application/server
7. Access Server forwards the response to the requesting Client (or error sequence if request fails)
8. Access Server logs the request-response outcome 6.8 Integrating Services into Hosts A host application is any application that embeds a service in its user interface or uses a service as a source of data. In the simplest use case, a host application simply wishes to embed the UI of a specific service. In this case, to configure a host application, a user must install an access server.

This access server is capable of the following functions: (1) Displaying a list of available services, (2) Allowing a user to configure the host application to invoke the interface of a service, (3) Allowing the user to configure the location where the output of the service will be presented within the UI of the host application. (4) (optional) defining transformations on the data or UI returned by the service before presentation in the host application.

Consuming a user-facing Information Service involves embedding a URL within a web component of the interface of the calling application and passing parameters to the Information Service. This is achieved by concatenating parameters in the URL.

An Information Service can also be designed to be CCOW (Clinical Context Object Workgroup) compliant. In this case, it will bind to a CCOW server Vault to synchronize its display context with other registered applications based on standardized "subject" coordinates (e.g., user, patient, clinical encounter, charge item, etc.).

A well-designed Information Service component implements multiple mechanisms for personalizing its display, and adapts gracefully to the context in which it is displayed. For example, if it is invoked without parameters, it might display a navigational interface to let the user search for records.

If a trust service requires a user-interface, this will generally be rendered within the same window or frame allocated to the Information Service for display of the requested DataObject, although it can also be targeted to a separate location. The consuming application can specify where such user interaction should occur, to handle situations where it displays multiple Information Services simultaneously, or when the screen real estate allocated is too small to display the trust service controls.

7 TRUST SERVICES

A Trust Service is a type of service used to authenticate that a user should be allowed to access a protected resource or document an interaction between a user and a protected resource. Trust services are similar to other network services in most regards. The only distinction is that Trust services are capable of responding to the trust protocol and can issue trust credentials used by the trust server.

7.1 Identity Providers

Traditional notions of application security are built upon the notion of an Identity Provider, a service, often provided by an organization or commercial entity that authenticates a user on the internet. Conventional identity providers act as a virtual middleman for single sign-on authentication. Identity providers typically have a process of user provisioning through which a public token to represent a user and a private password is created, some data about the human who will be represented by the token is solicited, and some attempt is made to authenticate the user's identity prior to assigning him a token and password. Subsequently, when a user wishes to access a protected system, they enter their public and private tokens as a shortcut means to verify their identity. Such federated providers are limited in the following ways: (1) Conflate authentication and verification making auditing and breach control difficult, (2) Generally rely on one authority to determine identity, (3) Can be role-based which generalizes access to controlled in potentially insecure ways, (4) May reveal information in order to enroll user, (5) Provides large-grained control, i.e. once user is authenticated, most available information is accessible, (6) Subject to theft of passwords In contrast, the Trust Network acts as a virtual Identity Provider that addresses these problems by:

Separating authentication, verification, policy and audit services (see this section following for descriptions) into separate functions providing finer-grained control Uses independent multi-point services for provision of identity so that a web of identity facts is built up that makes breaches or spoofing difficult Can anonymize identity provision so that it is not feasible to determine what services have contributed to the authentication, verification and auditing of identity.

The separation of trust service types and the use of multiple, independent services to provide identity means that this aspect of the system is highly secure; and that security breaches through any type of identity spoofing is highly unlikely. It also means that control can be provided at very fine grain, that is for small amounts of data to a specific user according to the requirements of the information source (the organization holding the data).

7.2 Trust Service Types

A single external application or service can serve as the basis of one or more types of trust services. For example, an HR application might serve as the external service supporting an authentication service, verification service and policy services for a given organization. The general types of Trust Service capabilities that are supported are as follows:

7.2.1 Authentication Services

Authentication services authenticate that a user is the person that they claim to be. Examples are a phone authentication service or a fingerprint scanner. Any application capable of authenticating a user can be configured as an authentication service for the Trust Network. Examples include:

phone authentication—verify the user is able to answer a specified phone number voice authentication—verify the user's voice matches previously recorded reference voiceprints email authentication—verify the user knows the password to a specified email account fax authentication—verify the user can receive a fax sent to a specified fax number photo authentication—verify that a picture of a user matches a previously stored reference picture password authentication—verify that the user knows the password for a specified account hardware token authentication—verify the user has physical possession of a particular hardware device signature authentication—verify the a signature submitted by the user corresponds to a reference signature machine authentication—verify that the user is using a client machine that matches digital fingerprints (i.e. cookies, certificates, MAC addresses, etc.) of a machine used in previous sessions by a specified user FIGS. 10A-10F, illustrate examples of different information confirmation notices. User Interfaces of Representative Authentication Services

7.2.2 Verification Services

Figure 11:
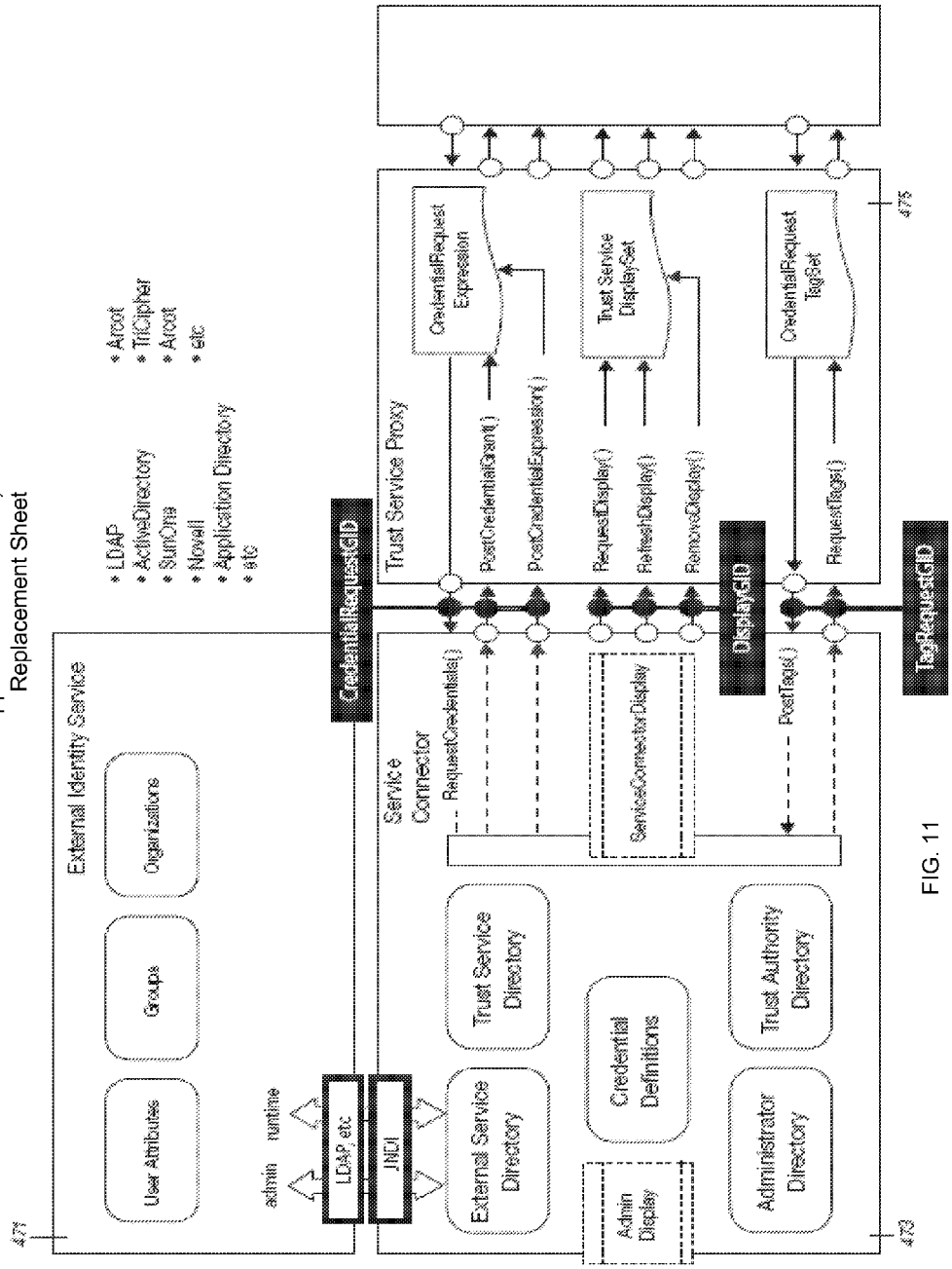
FIG. 11 illustrates a Verification Service.

With reference to FIG. 11, a Verification Service 471 certifies some fact about a user, organization or Data Object. For example, a verification service 471 might issue a credential indicating that a user holds an M.D. or has the privileges to practice medicine at a particular hospital. An Identity provider is a form of verification service 471, since they frequently collect data about users and can be used to verify claims that users make.

A verification service 471 generally contains a database of people or organizations, as well as corresponding credentials they are entitled to or information that can be queried to make factual assertions about them.

A verification service 471 need not be a traditional identity provider. For example, a state database of driver's license holders can act as a verification service even though it was not designed to be an internet identity provider. Similarly, a customer database operated by a business can act as a verification service 471. These are examples of public databases. In the modern world, every individual leaves a trail at different public databases as they go through life. The more public databases that contain a record of a person, the more likely that person is legitimate. Such public databases can be configured to act as verification services even if they were not originally designed to act as identity providers. Public databases often contain information such as email address, phone and address that can be used to authenticate a specific user. In an embodiment, the verification service 471 can be accessed by the trust service proxy 475 through the service connector 473.

7.2.3 Policy Services

Figure 12:
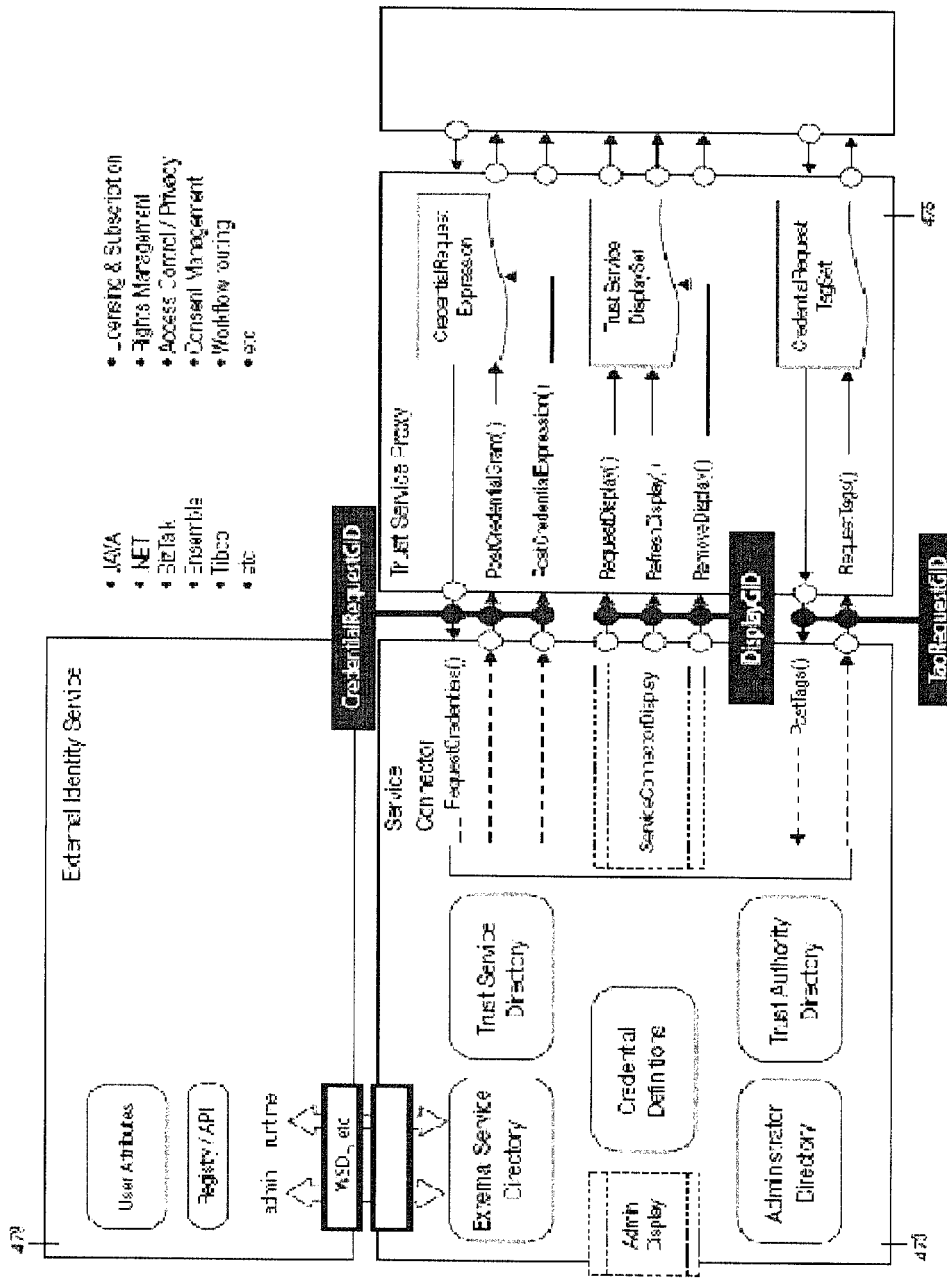
FIG. 12 illustrates a Policy Service.

With reference to FIG. 12, a policy service 479 can be a "meta" trust service. A policy service 479 might define a complex credential request for user authentication and verification. External organizations can then use this credential request instead of defining their own. A policy service 479 is typically operated by a governmental or quasi governmental authority that defines legal requirements in some jurisdiction.

A policy service 479 is particularly useful when the legal requirements vary based on the facts about the resource being accessed. For example, in the medical domain, legal requirements can vary based on whether a patient is an adult or a minor, whether the record contains the patient's psychological history, whether the record contains HIV status information.

A policy service 479 can evaluate attributes of a protected resource and then return an appropriate credential request that meets legal requirements to the caller. In an embodiment, the policy service 479 can be accessed by the trust service proxy 475 through the service connector 473.

7.2.4 Audit Services

Figure 13:
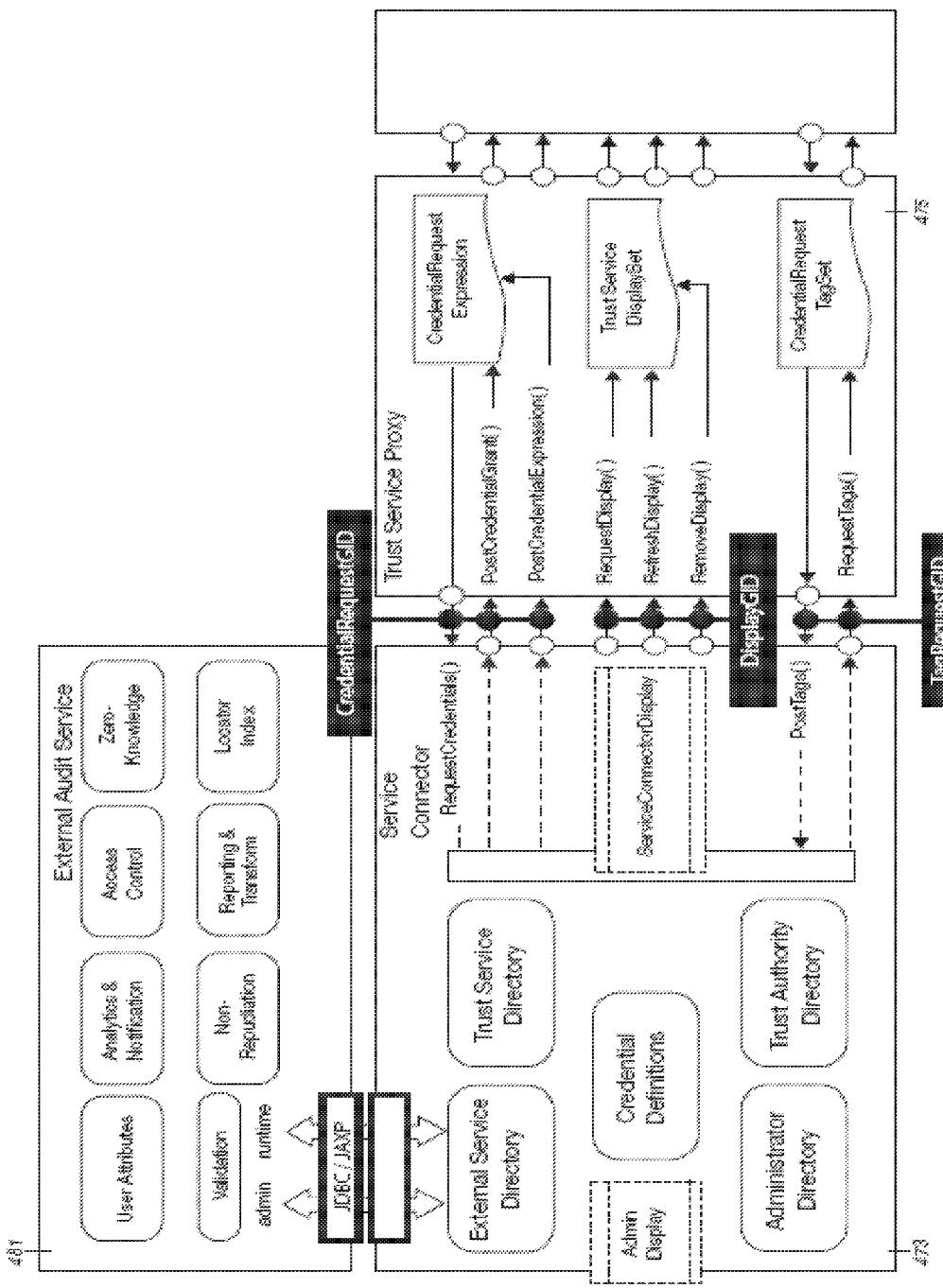
FIG. 13 illustrates an Audit Service.

With reference to FIG. 13, Audit Services 381 record the fact that a given user interacted with a given protected resource at a given time and relevant facts about how that user authenticated himself prior to the interaction. They create a record that can be independently audited to document that an information provider fulfilled their legal obligations prior to releasing information to the user.

When a legal obligation exists to document user interactions with protected data, before the data is released to a user, the information source may need a credential from the audit service which represents a promise to record the interaction when it has been completed. In an embodiment, the Audit Services 381 can be accessed by the trust service proxy 475 through the service connector 473.

7.3 Trust Syndication

Trust syndication is an abstraction of trust requirements that enables the Trust Network to dynamically select trust authorities & resolve these requirements. Trust syndication can be broken down into identity & policy syndication which will be separately described here. Trust syndication is made possible by the availability of a large number of independent trust authorities that can be used by the Trust Network to do (in this case) authentication, verification and policy adherence.

Identity Syndication—Credential expressions may be specified so that the trust requirements embodied in them are abstract, rather than specific. An example of this is when a credential requirement specifies two (2) different identity authentications, two different verifications that a requester is a licensed physician and two different identity proofs. Such a requirement might be relevant if the user is requesting medication history of a patient that includes psychoactive drugs. The requirement does not specify which trust services must be used in order to satisfy it and the Trust Network, specifically the trust server(s) and access server(s) use their discovery service to select appropriate trust services and resolve the trust requirement in the manner already described. The Trust History is updated and the Trust Broker grants the grants the credential (or not).

Policy Syndication—Similarly, an organization may have policy requirements for the release of information that are not embodied in a specific credential expression. In such cases, requests require that the Trust Server (through the Trust Broker) identify what credentials must be satisfied, consistent with the policy. Then the Trust and Access Servers again dynamically identify and select appropriate trust services and the credentials are resolved (or not). The Trust History is updated and the Trust Broker grants the credential request.

In both cases, this selection is dynamic & is dependent on what services are available at any given time on the network. These services (some or all of them) may choose to anonymize themselves through the use of zero-knowledge tokens so that not only is the selection of services dynamic, the services used and the manner in which the trust requirement is met cannot be determined from outside the Trust Network. Even from within the Trust Network, all that is evident is that the trust requirement was met in a secure manner. This makes compromising the syndicate extremely difficult.

Trust syndication provides numerous advantages. Verification by multiple independent trust services makes security breaches due to negligence and insider fraud more difficult. Using a broad range of both publically available and private information (through agreement) for identity authentication and verification allows deeper trust to created and maintained. Using Trust History allows the Trust Network to learn as it is used and to adjust its creation of syndicates as it obtains more history. Lastly, the potential liability of any single trust service is greatly reduced by the use of dynamically created trust syndicates and their anonymization through zero-knowledge algorithms.

The resolution of trust requirements uniquely for each information and/or policy source obviates the need for negotiated agreements on data sharing or policy consensus The resolution of trust requirements uniquely for each request allows policies to be developed and enforced for all user types including consumers (patients).

Using syndication to resolve trust requirements is a unique and productive feature of the Trust Network.

7.4 Trust Service Implementation

Figure 14:
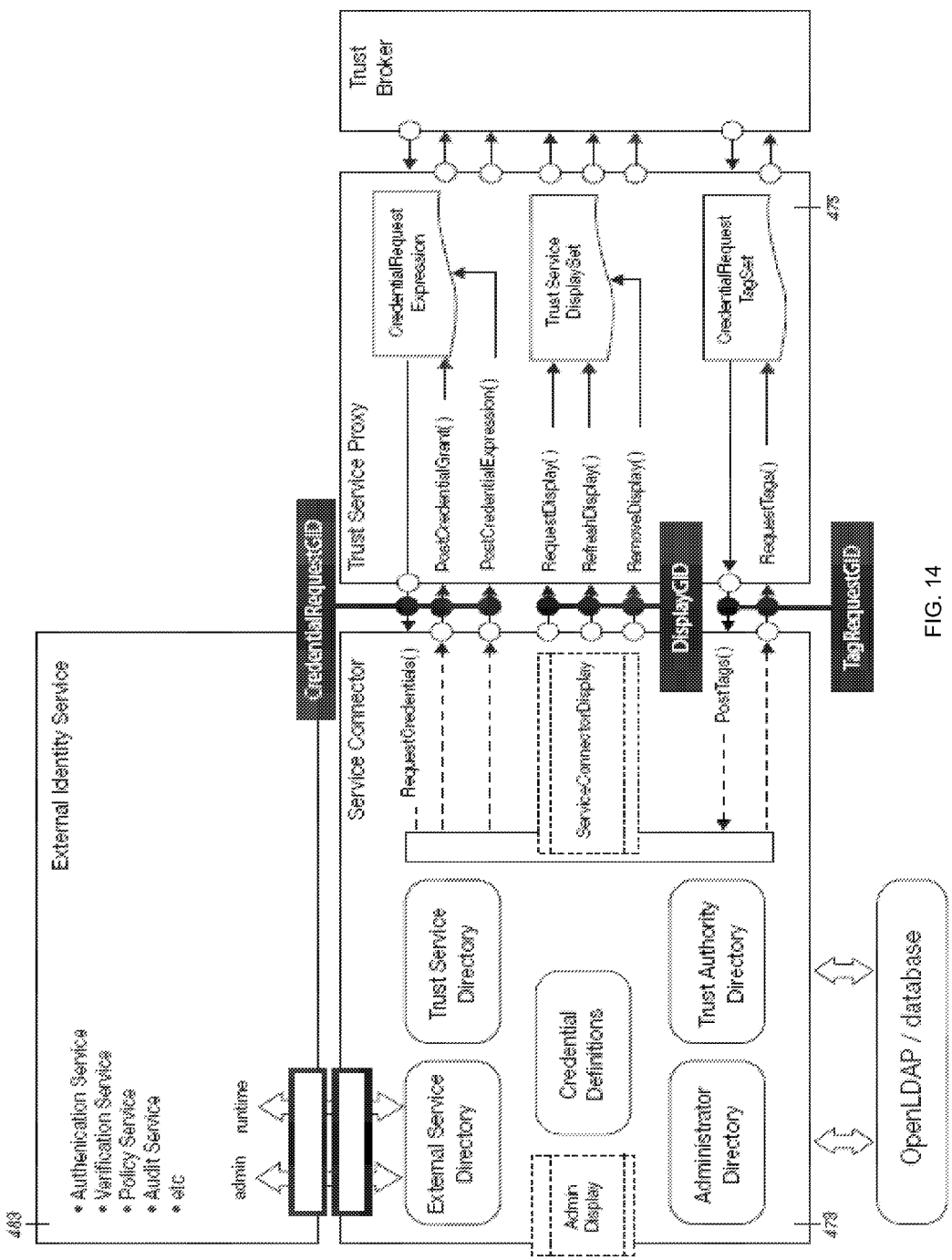
FIG. 14 illustrates a Trust Service.

With reference to FIG. 14, the implementation of a Trust Service involves a Service Connectors 473, and one or more External Services 483 or applications. If the Trust Service requires direct user interaction, it may include one or more user-facing ServiceConnectorDisplays. The various components of a Trust Service may be hosted on the same server or domain, or may be distributed.

The Trust Service Proxy 475 is an optional intermediary for interactions between a Trust Service 483 and the Trust Network. A single instance of a Trust Service Proxy 475 can support an arbitrary number of Trust Services 483. It implements the following capabilities:

Asynchronous resource-based communication protocols with the Trust Broker and local caches to enhance scalability and availability.

An administrative capability to allow the administrators to map specified credential names to specific service connectors and service connector paths, allowing the trust service proxy to route a credential request to the appropriate resources. It also supports defining a set of predicate trust credentials that must be earned before the requested credential will be granted—i.e. audit services, rights management or subscription services, etc.

Locator indexing services so as to provide consistent global discovery, search, and eligibility verification across all Trust Services, reducing latency in evaluating to complex conditional credential expressions.

Zero-knowledge token services for address resolution, message validation, and data exchange. These isolate individual Trust Services from any knowledge of other Trust Services involved in satisfying the Credential Request, and to make it possible for the Trust Broker to coordinate Trust Services without visibility into the specific credentials or tags involved by substituting semantically equivalent opaque tokens for the actual values and schema definitions.

The functionality and implementation of a trust service proxy is identical for any trust service, so its code can be digitally signed to verify that it has not been tampered with. By contrast, the implementation of service connectors and external services will vary for different trust services, so there cannot be any standardized way to remotely verify their functionality or that they have not been tampered with. Thus, the trust service proxy provides a uniform and trusted point of administration at the edge of the trust network.

The Service Connector is a small program that serves as an adapter between an external application that will function as a trust service and the Trust Service API. It wraps the External Service with a credential-based interface, and translates the flow of tags and credentials from the Trust Service into the native interface of the External Service. It implements the logic and/or user interface components necessary to drive the interaction with the Trust Broker and the user to acquire the tags necessary to satisfy the credential request or determine that the user is ineligible. The Service Connector will also generate Locator service index entries, and implement an interface capable of determining whether a user with specified userIDs, attributes or relationships is eligible for a particular credential. A service connector may be implemented using an access server or any other web-based technology that can invoke the Trust Service API.

In the course of evaluating a credential request, a Service Connector can request additional tags via the TrustServiceProxy.RequestTags( ) method. The Service Connector can also interact directly with the user by requesting that a specified web component be displayed via the TrustServiceProxy.Request Display( ) method.

To implement a Trust Service, a developer must implement a Service Connector that implements a RequestCredential( ) method, interacts with any required External Services, and calls the appropriate methods of the TrustServiceProxy—minimally either PostCredentialGrant( ) or PostCredentialExpression( ).

Conceptual Schema with Representative Data Elements

Figure 15:
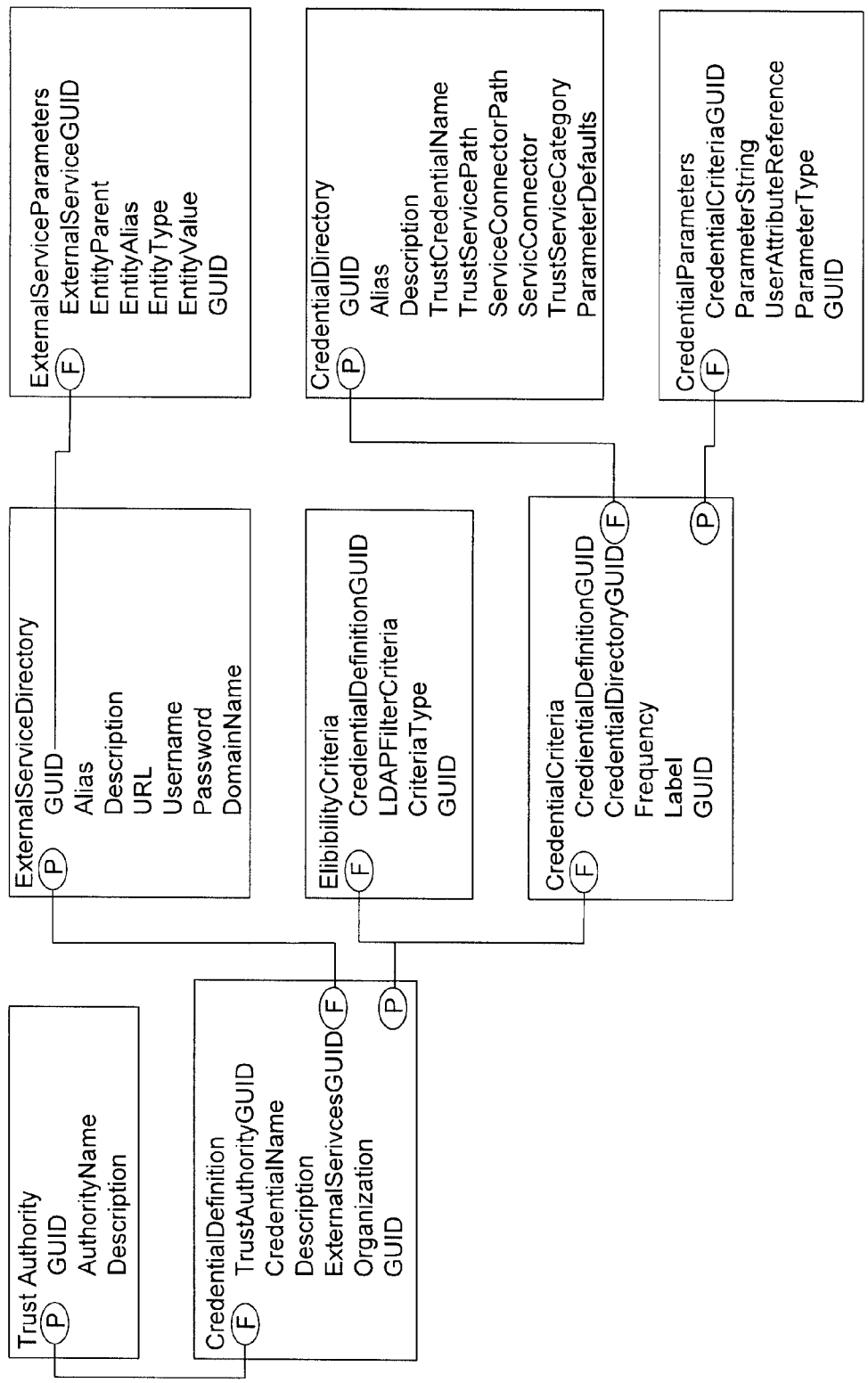
FIG. 15 illustrates a Service Connector.

With reference to FIG. 15, a Conceptual Schema with representative data elements is illustrated. A Service Connector can be purpose built for the requirements of a specific Trust Service, including hard-coded mappings between a specific set of credentials (i.e. Authentify.PhoneConfirmation) and a specific external service at a fixed domain. More commonly Service Connectors will be general purpose services that can be configured for different deployments, authorities, credential definitions, and external services.

Administrator Directory: Manages and authenticates the set of people that have administrative privileges for the Service Connector, and the right to create, view or edit specific entries in the various directories maintained by the Service Connector.

Trust Authority Directory: Allows administrators to define the set of trust authorities (i.e. "Kaiser") that the trust service manages, along with the set of credentials defined for each authority (i.e. "doctor"). A TrustCredential corresponds to a trust authority concatenated with a credential name (i.e. "Kaiser.doctor"). Each credential entry points to a set of entries in the Credential Definition Directory.

Trust Service Directory: Allows administrators to define the set of trust network services and trust credentials "recognized" by the Trust Service. Once defined in the Trust Service Directory, these trust credentials become available to administrators in the administrative console of the Credential Definition Directory, allowing them to be selected as requirements for earning the trust credentials managed by the Service Connector. These entries are used in generating the credential expression passed as a parameter of the PostCredentialExpression.

Each trust service directory entry includes a label and description fields, the attributes of its credential expression entry (TrustCredential, ServiceConnector, ServiceConnectorPath, Parameters), the type of trust service it represents (i.e. Authentication, Audit, etc.). It may also support tracking meta-data to classify (i.e. "2-factor Authentication Service", "In-Person Proofing") and organize trust services, both to facilitate policy management and to support conditional credential expressions.

External Service Directory: Allows administrators to define and configure the set of external services available as resources to administrators in the administrative console of the Credential Definition Directory. Each external service directory entry will include metadata to identify, describe, and bind to a particular external resource, such as an LDAP server.

The specific metadata may be different depending upon the type of external resource, and also the services being supported. For example, for a service connector that relies upon JNDI (Java Naming and Directory Interface) to connect to source directories, the attributes might include a name and description field, a URL or path to the server, and login credentials. The administrative console might also include a facility to map and filter the metadata of the external source directory into metadata entries in the External Service Directory. For example, the administrator for a particular external source directory (i.e. an ActiveDirectory for GE) might only "publish" certain organizations, groups and identity attributes to the Service Connector's External Service Directory.

Credential Definition Directory: Defines as metadata the specific configuration for each Trust Credential, including which external services and external trust services must be invoked in order to earn the credential, and the logic of the mapping between a requested trust credential and the various external service resources and the "predicate" trust credentials that are required to authorize a credential grant. The Service Connector will include logic to translate this metadata into a series of interactions with external services, users, or directories that ultimately result in either a PostCredentialGrant or a PostCredentialExpression.

The functionality of the Administrator, Trust Authority and Trust Service directories are the same for any Service Connector, regardless of the type of services it implements and the external services it binds to. Thus, Resilient delivers standard components as part of a developer framework that can be used to facilitate Service Connector develop, and help enable consistent functionality.

The External Service and Credential Definition directories will vary based upon the type of services supported (i.e. authentication, identity verification, policy, audit, etc.), and the types of external services supported. Resilient is building components for standards-based or widely deployed external services interfaces (i.e. JNDI), and will release reference implementations and a framework that can be used to facilitate the development of customized Service Connectors.

If a Service Connector interacts directly with the user, the developer must specify or build a web component (aka a ServiceConnectorDisplay), and write their ServiceConnector so that it invokes the Trust Service Proxy's Request Display( ), RefreshDisplay( ) and RemoveDisplay( ) as necessary to manage its interaction with the user.

In calling RequestDisplay( ), a ServiceConnector passes as a parameter a "DisplayGID" that creates a unique reference for the UI request shared between the ServiceConnector, TrustServiceProxy, and the ServiceConnector Display. It will also pass as a parameter "DisplayControl" the fully specified URL of the ServiceConnectorDisplay which it would like displayed, concatenated with the DisplayGID and ServiceConnectorPath.

Upon processing the RequestDisplay, the TrustServiceProxy will log the DisplayGID and DisplayControl URL in its DisplaySet, which is a virtual state machine which tracks the set of display requests it has agreed to handle.

If the TrustServiceProxy has previously requested its own user-facing display (TrustServiceDisplay) within which it can embed the ServiceConnectorDisplay, it will trigger a refresh. Otherwise, it will invoke RequestDisplay( ) on the TrustBroker to acquire a TrustServiceDisplay.

Either way, when the Trust Service Proxy's display is rendered or refreshed, it will invoke the GetDisplayState( ) method of the TrustServiceProxy to retrieve the set of DisplayControl URLs it has agreed to display, and then renders each within a frame in the TrustServiceDisplay.

The ServiceConnectorDisplay URL passed by the ServiceConnector via the DisplayControl parameter of the TrustServiceProxy's RequestDisplay( ) method will be rendered as an embedded frame. The ServiceConnectorDisplay will parse this URL to extract the DisplayGID and the ServiceConnectorPath, and will call the GetDisplayState( ) method of the ServiceConnector, passing the DisplayGID as a parameter. The ServiceConnector will be able to use the DisplayGID to map the GetDisplayState( ) request to the original RequestDisplay( ) that it invoked earlier, so that it can return the values that the ServiceConnectorDisplay needs to personalize its interaction with the user.

7.4.1 Sequence of Interactions in Invoking a Trust Service

When a Trust Service is invoked by the Trust Broker at runtime, the sequence of events is as follows:

The Trust Broker calls the RequestCredential( ) method of a TrustServiceProxy at a particular TrustServicePath, passing a credential expression element that minimally includes the TrustCredential to be evaluated (i.e. Kaiser.doctor). The credential expression element may also explicitly specify the ServiceConnector and ServiceConnectorPath, in which case the TrustServiceProxy will route the request by invoking the RequestCredential( ) method of the specified ServiceConnector.

When the ServiceConnector processes a RequestCredential( ) invocation, it will parse the CredentialExpression and the other parameters, creating linked data structures so that the various attributes can be retrieved based on the CredentialRequesetGID associated with the request.

The ServiceConnector will search for a matching entry to the TrustCredential in the Trust Authority Directory, and if found, retrieve the corresponding Credential Definition Directory entries. If no entries for the TrustCredential are found, then the ServiceConnector will invoke the RequestCancelled( ) method of the TrustServiceProxy, updating the Credential Graph node with Satisfied=FALSE, and returning a status code to indicate that the requested credential as not available from the specified Trust Service.

The ServiceConnector will "execute" the Credential Definition Directory entries, translating them into a series of interactions with external services, the user, and the TrustServiceProxy.

This will ultimately result in invoking one of the following methods on TrustServiceProxy—PostCredentialGrant, PostCredentialExpression, RequestCancelled, or UpdateEligibility.

If a user is not eligible for the requested credential based upon the user identity attributes (typically an email address, but more generally any attributes that can be resolved into an identity that by the Trust Service either directly or via a electronic master person index) sent with the credential request, the Trust Service will respond in three ways.

First, it may invoke the RequestTags( ) method on the Trust Broker specifying a TagSet that corresponds to user identity attributes which it can use to identify users who are eligible for the requested credential. This will query the TrustBroker's local TagSet cache and the Trust History to identify alternative userIDs that can be cross-indexed to the same user.

Second, it may request a display and interact directly with the user to ask them for alternative user identity attributes (i.e. a different email address, medical license number, etc.) that can be used to verify that the user is eligible for the credential.

Third, it may respond by invoking the InEligibleUser( ) method on the Trust Broker, which will update the corresponding Credential Graph node with Satisified=FALSE and Eligible=FALSE. This means it is giving up on trying to satisfy the credential request.

8 THE SERVICE DIRECTORY

The Services directory is a repository of information about the services published on the Trust Network. It can be used at design time to locate a service that meets requirements. When a search index is used, the directory can also be used at run time to locate a service that contains a particular unit of data.

The Directory consists of a set of entries—Each entry describing one service.

A directory entry consists of the following pieces of data: (1) Service name, (2) Service description—an informal plain text description of a service and its function, (3) Service type, (4) Service Location such as an IP address (5) Service API—a description of how to invoke the service including the variables that must be passed when the service is invoked, (6) Standard used—a description of the data structure returned when the service is invoked. (7) Service Content Index—a search index of the data that the service contains. Supports the ability to locate a service at runtime that contains a particular piece of data and to defer binding until after finding the data a user requires. (8) Service Statistics—metrics on how much usage the service has received. (9) Service Status—online, offline, etc.

9 SEARCH

Because the Trust Network has a distributed architecture containing numerous and diverse services and hosts, search is a key function that allows hosts to locate data regardless of its location. Search is implemented by locator services. This section describes different types of search services such as identity locator, record locator, policy locator and audit locator services.

Locator services are invoked by passing search criteria and return trust credential expressions, metadata that characterizes trust credentials, and possibly information describing the precedent credentials necessary to earn those credentials.

For example, a search submitted to an identity locator service might include the user's email address and a filter expression CredentialType="doctor" as the search criteria, and could return opaque tokens for a set of identity verification credentials a user is eligible for, meta-data describing the type of identity verification (i.e. employer, insurer, medical association, claims history, etc.) and a trust rank weighting for each, and a collection of cryptographic hashes for each combination of authentication coordinates which would allow the user to earn the credential.

A trust-ranking service might search the locator service for a user who needs to achieve a specific trust rank, analyze the meta-data and hashed authentication coordinates of the returned entries to identify a set of trust credentials which would be most convenient for the user to reach the trust-rank threshold. The trust-ranking service could then return an opaque token that resolves to a credential expression that satisfies the trust-rank requirement without ever knowing the actual identity of the user or which trust credentials it returned.

Every trust or information service that feeds into a locator service must be able to generate index source records that conform to a consistent schema and vocabulary. Index source records can be transformed and mapped into multiple index entries with different search criteria or Trust Rank metadata to improve performance, increase the "hit rate", or support various analytical algorithms. For example, an identity locator service might run identity attributes (i.e. medical license number) from the source through an master person index to generate an alternative set of equivalent and unique index keys (i.e. social security number; name, date of birth, phone number; etc.), that will resolve to a hit for the same trust credential.

9.1 Record Locator Services

A record locator service makes it possible for authorized services to search across a range of information services for records that include particular types of information and/or reference specific people, organizations or activities.

Locator Services can publish metadata that describe how Information Services must format and tag their records to be properly indexed. This includes a specification of terminology/vocabularies are used, what classification metadata may be included, what trust domain profiles are required to search the resulting indices, the security criteria for seeing a summary of the results, etc.

Information Service administrators may also set configuration options that control whether they publish index entries that point to individual records that satisfy the search criteria, or publish index entries that point to the query interface for Information Services that hold records that satisfy the search criteria.

In the latter case, searches to the Locator Service will be transparently redirected to the query interfaces of the various Information Services that have relevant records, and then results of these secondary searches will be aggregated by a Search Proxy. Information Services must implement or link to data transformation and/to schema translation services that normalize their source records into a consistent format that the requesting service can handle, or implement self-contained secure record viewers that allow users to view individual records via a browser.

To submit a search, a requesting service passes the search criteria to a Zero-Knowledge Search Proxy, which invokes the trust domain services to secure the necessary cryptographic salts to hash the search criteria, and then submits the search to the Locator Service. This increases privacy protection and allows the Search Proxy to implement access control rules so that only authorized services can submit searches.

If a Record Locator Service supports searches based upon the identity of the subject, it may incorporate an Electronic Master Person Index (EMPI) to cross-index identifiers. The EMPI can probabilistically map when records that incorporate different combinations of identity attributes (i.e. social security number; name, address, date of birth; insurance member number) uniquely map to the same person.

Other similar types of master cross-indices might be included as well, such as specialized or proprietary master person indices (i.e. Master Physician Index, Master Employee Index, Master Customer Index). Other examples are Master Organization indices, and terminology cross-reference services that translate between different vocabularies (i.e. SNOMED, ICD-9, ICD-10).

These master cross-indexing services may be incorporated preemptively at the point of generating index entries (creating multiple index records for each information service record), or in composing the search query (mapping the initial search criteria into multiple queries with semantically equivalent but different search criteria). The former will be faster at execution time in some cases, and the latter will enable better filtering and evaluation of search results. If cross-indexing is done preemptively, it can be implemented directly by the Information Services in composing the original index source records, or by a zero-knowledge indexing proxy.

Search criteria must include identifying attributes (i.e. social security number) and may include classifying metadata (i.e. i.e. tags indicating the records include prescription histories, include records less than a year old, etc.) which are used to filter results. Search criteria for classifying metadata may either be hashed or submitted in the clear, depending on how the Locator Service is configured. Using hashed search criteria is more secure, and therefore supports using more privacy sensitive information. More care must be used with classifying metadata to ensure that it is not identifying and does not facilitate brute force attacks (i.e. dictionary attacks) that could associate sensitive information to identity.

After processing the search query, the Record Locator Service will return a set of index records to the Search Proxy, each of which may include the following information: (1) clear-text classification meta-data (2) duplicate detection hash code (3) zero-knowledge tokens that resolve either to: a URI for a specific record or a URI for the query interface for an Information Service with records that satisfy the search criteria. (4) credential expression (or a zero-knowledge token that resolves into a credential expression) with the security criteria for revealing to the requesting service the fact that records exist that satisfy the search criteria, and their classification meta-data. (5) zero-knowledge token that resolves to a clear-text record summary (6) anonymous metering tokens (7) message authentication codes and (8) zero-knowledge token that resolves to the index record GUID.

A zero-knowledge Record Locator Service may incorporate several layers of security to protect the privacy and security: Only Zero-knowledge Search Proxies are able to directly submit a search query to a Record Locator Service. In general, these will be hosted on Trust Computing Platforms (or by a mutually trusted organization) that can be independent of both the Locator Service and the requesting service. Requesting Services and/or user must be authorized by policies in Trust Domain Profiles specified by the Locator Service before a Zero-knowledge Search Proxy will apply the cryptographic salts necessary to properly hash the search criteria. Upon receiving the search result set, the Zero-Knowledge Search Proxy will screen the search results and authenticate the requesting service and/or user to verify whether they are authorized to see each matching search result summary based upon criteria defined by the source Information Service. Once a requesting service or user has been authorized to access search result classification metadata and/or summary records, they can screen them to determine whether they want to access the underlying Information Service records.

To access records, the requesting service will need to pass through one or more zero-knowledge token services to resolve the URIs that point to the source record or Information Service, and then satisfy the credential expression that controls access to each record. Each zero-knowledge token service may independently enforce access control criteria, offering additional layers of protection against security breaches.

A Zero-Knowledge Search Proxy may accept search queries directly with users via a browser, instead of from a requesting service or application. In this case, Information Services must incorporate secure record viewers that can display the records directly to a user, generally via a browser. Each Information Service will control which credential expressions are linked to each source record, provided fine-grained access control over who can view their records.

In addition to Zero-knowledge Record Locator Services, the Trust Network supports private locator services. These may use either hashed or clear-text search criteria, but have as payload URI's pointing directly to the Information Services instead of zero-knowledge tokens. This involves significantly less overhead, but requires that the Locator Service host can be trusted with knowing where records are hosted, and the host could attempt brute-force attacks to determine the meaning of the hashed search criteria.

If the underlying data source of an Information Service does not assign persistent globally unique identifiers to its records, the Information Service may assign a globally unique address to a cache copy of each record published to an index, and annotate this cache record with whatever information is known about the original source of the information and how to retrieve a current copy. Examples of this might include email servers, wikis, or application databases that do not have persistent globally unique identifiers.

9.2 Identity Locator Services

An identity locator service takes as inputs personally identifying and demographic attributes (i.e. name, email address, phone numbers, social security number, data of birth, address, etc.) and returns a set of verification services that have entries which can be used to authenticate and verify the identity of a given person, including assertions about their relationships, attributes, activities or privileges. Essentially an identity locator service is a record locator service that specializes in finding records in resilient verification services.

An identity locator service may link to one or more trust-ranking services to facilitate syndicated identity verification. Trust ranking services assign a set of trust weighting attributes to identity verification services, and define a meta-data tagging taxonomy that allows identity verification services to characterize what proofing (i.e. what evidence they collected via what processes) they have done to support each trust credential they issue, and/or the strength of any authentication mechanisms they provide.

A trust ranking service has algorithms to translate the trust weights and attributes for a set of trust credentials for a given user into a trust-rank associated with an assertion about them—i.e. that they are a specific person, are employed by a given company, are over 18 years old, are a doctor licensed to practice in a particular state, etc. The trust rank metrics characterize the level of confidence with which the Trust Ranking service is willing to assert that a person identified by some set of identity attributes is eligible for the trust credential, and (separately) that the user requesting the credential is actually that person.

The trust rank service can query a locator service to identify all of the verification services which it trusts for which a specified user is eligible. The trust-rank service would then use this result set to generate a trust credential expression that specifies the various ways a user could satisfy the criteria for earning the required trust-rank credential.

Trust Ranking services may be used to enable anonymous identity verification, wherein a user is able to offer a trust rank for a given assertion (i.e. they are a person who is a citizen of the United States over the age of 21 with no felony convictions), without revealing any identifiers (i.e. name, social security number, drivers license) to the organization they are making the assertion to, and without having to interact directly with the trust authorities relied upon (i.e. their employer, insurance company, DMV, voter registries, social security administration, etc.) This allows users to make verifiable statements about their identity without revealing specifically who they are, and without directly contacting any verification authorities in order to earn the trust rank.

Anonymous identity can be combined with anonymous profiles to enable anonymous personalization. This essentially involved aggregating personal information from various sources using a trust ranking service in order to verify authorization, anonymizing the resulting profile, and then linking it to an anonymous online identity via the trust network. This would allow fined grained personalization of various services relying upon highly sensitive private information from many applications and databases, without anyone knowing who the specific person is that is associated with the profile.

9.3 Policy Locator Service

A policy locator service identifies the specific security and privacy policies that apply to a particular record based upon its contents. It accepts as input search criteria specifying or classifying the contents of a record, and returns pointers either to Policy Services that have relevant policies that may be applicable to the record, or to specific policy entries that are applicable and need to be specifically linked to the record and evaluated. It may also return classifying metadata that characterizes each policy record, hash codes to enable the detection of duplicate entries, etc.

An Information or Policy Service might call policy locator services to determine which policy services have rules that are relevant to a particular record. It is designed to enable very fast policy resolution, where policies defined by many different authorities are detected and linked to each record based on its contents.

For example, a healthcare privacy policy service could accept a as part of a credential request tag set from an information service (1) identity tags specifying the identity or the demographic profile of the subject (i.e. state of residence, whether patient is a minor, their insurance carrier), (2) content tags specifying the type of record (i.e. discharge summaries, prescription history), its specific elements (i.e. HIV status, age, social security number) or other descriptive classifications that influence which policies that are relevant (i.e. whether it contains diagnoses of sexually transmitted diseases, mental illness, etc.), and it's source (i.e. the provider organization that originally created it), (3) policy classification tags indicating the types of policies that are relevant.

The privacy policy service or clearinghouse might then search a number of policy locator services to determine which policies services it would need to invoke, either directly or by posting a new credential expression to the trust broker. There may be indexes for a variety of distinct policies services:

Regulatory: Indexes policy authorities that maintain records that define laws or regulations regulating security or privacy policies in different jurisdictions and for different types of data.

Consent: Indexes consent directives from a particular patient, or attestations of consent that refer to that patient. It accepts as input identity attributes that can be used to resolve the identity of the patient, and possibly metadata describing the types of health information that the consent directives refer to. It returns pointers to where consents are on file, and possibly metadata or one-way hashes describing the content of the consents.

Security: Indexes policy services that define security policies for different stakeholders—i.e. the source Information Service or the original source of the data (i.e. the hospital EHR), the patient, etc.

Licensing: Indexes policy services that define the licensing terms of various stakeholders for a given record. A licensing service might require various audit services, anonymous metering services, or enforcement of specific payments.

9.4 Audit Locator Service

An audit locator service makes it possible to efficiently search for audit records that relate to a particular user, subject and/or topic. It accepts as input search criteria specifying a person (i.e. a user or the subject of a record) or a source of content (i.e. an Information Service or identifiers for an organization) and non-identifying classifying metadata (i.e. the type of audit record, a date range, etc.); and returns pointers to the audit records themselves and/or pointers to records that define the context of those records.

A zero-knowledge audit locator service has index entries consisting entirely of one-way hashes, zero-knowledge tokens, and non-identifying analytic metadata. These can be used to analyze end-to-end behavior patterns across the Trust Network, allowing defined patterns of suspicious behavior to be flagged without the host having access to any private information.

For example, a zero-knowledge audit locator service designed to facilitate privacy enforcement might include one-way hashes of patient identifiers as the search criteria, and a combination of non-identifying metadata and zero-knowledge tokens that resolve to the clinician who accessed their data, how the clinician was authenticated were authenticated at the time, what content accessed, the source of the content, what access control policies and consents were invoked to authorize release, and metadata describing evidence of the relationship between the patient and the doctor. A person could configure a privacy monitoring service that would monitor access to their health records across the Trust Network, notify them of suspicious accesses based on criteria they specify, and allow them to view who is accessing their records, and what the justification for each access is.

An access request might be flagged as "suspicious" if there is no claims history between the clinician and the patient, no one electronically referred the patient to the doctor, the patient didn't book an appointment online from a verified identity, and the patient hadn't previously verified consent to release the information to that doctor. The analytical criteria (including the schema of evaluation criteria) can be based entirely on cryptographic hashes or non-identifying metadata, so the audit service wouldn't not need to understand anything about the actual meaning of the patterns it is detecting. Further, when a pattern is detected, the response can be triggered via zero-knowledge tokens, so the audit service would not know anything about the identity of the parties involved, including the individuals and services handing the resolution.

10 APPLICATIONS OF THE TECHNOLOGY

10.1 Mutual Confirmation ("Linked-in for Trust"):

Allows users to send a request to another user or a verification service to verify their identity, authentication coordinates, or some assertion about them or their rights or relationships. For example, an administrative staffer in a doctor's office might request that the doctor verify that they work in the office, can be authenticated a specified phone number and email address, and have an employment relationship that entitles them to see confidential patient information for purposes of claims processing and billing. The staffer could be required to digitally sign (generally using the standard phone, email and fax services of Resilient) a contract acknowledging their responsibilities with respect to handling such private information.

The parties to this trust relationship could be allowed to enter information characterizing how well they know the other party and what they have done to validate the request. For example, if the doctor receives such a request via email, they could be asked to state whether the requestor verified the request in person or over the phone, and whether they personally recognize a picture of the person or their voice. The "weight" such trust relationships will depend upon how strongly authenticated the parties were when they established it (i.e. did they submit three-factor authentication including email, phone and voice print), how strongly their respective identities were identified by independent sources, and how well they indicated they knew each other and verified the request.

10.2 Anonymity Services

The resilient address scheme makes it possible to add anonymity services that can assign anonymous aliases to any address and then support real-time address translation between aliases. This allows services to communicate without sharing a common address space. Since resources and services may be linked by GUID rather than unique keys (i.e. social security number or email address), the anonymity service (a type of zero-knowledge token service) makes it possible to partition address spaces so as to make it impossible to "connect the dots" as to what different services know about a single person without the cooperation of the anonymity service. The anonymity service can support security and privacy policies that are independent of the services being connected. This allows services to collaborate via "zero knowledge algorithms" while making them unable to learn anything about the users or subjects of those interactions they didn't already know. For example, an information service (i.e. a clinical data repository) need not know who is accessing their data or why. Verification and authorization services need not know what data users are accessing via their credentials or what they are doing with it. Policy services need not know the identity of the users, or whose data they are accessing. For example, an individual patient could allow de-identified health information to be aggregated from many sources into a unified patient-centric virtual database, and the resulting analytics could only be "re-identified" or reconnected with the original sources via the anonymity service. information services that were sources of data (i.e. claims-based records) need not even know that the data had been aggregated, let alone what the results were or who received them. All they would know was that their data had been accessed in a way that was consistent with the policies they had subscribed to. This anonymous aggregated data could be used to support clinical research, personalized disease management, personalized advertising, etc. In each case, the analytic services (i.e. an advertising network or prescription compliance service) would be completely ignorant of the true identity of the subjects of the records, and the anonymous records or resulting analytics or messages could be re-identified only via the anonymity service, subject to any security or privacy policies selected by the subject for re-identification.

For example, a patient might allow data about them from any source to be submitted to a national post-market surveillance service that screens prescriptions and medical treatments, allowing identified warnings of risk factors or other alerts to be accessible only by the patient or individual caregivers or provider staff they had specifically authorized.

Similarly, a person could consent to having de-identified data about them being aggregated and profiled to enable personalized advertising, commerce or analytic services, on the condition that their activities remain anonymous. For example, the advertiser or service provider would be able to target offerings based upon a verified identity profile and receive payment for services or products, but would be ignorant of the customer's identity. The bank or credit card providing payment would not know what services or products were purchased; only the fact that their customer had authorized the payment had been properly verified according to procedures they had consent to.

This means that customers and service providers could elect to establish anonymous relationships, wherein the service provider could have access to extensive and highly sensitive profile information about their customer and interact with them via the web, email or phone, yet be completely ignorant of their actual identity. Payment could be made anonymously as well, either by the customer or by a third-party payer such as an insurer or employer. Third party payments could be anonymous as well, with the payer only knowing the payment was authorized pursuant to policies they subscribed to. For example—a mental health counseling service could be made available anonymously to the company's employees, on the condition that the patient be authenticated by the companies verification service, and that a qualified mental health professional refers the patient to the service. By providing the strongest possible assurance that their privacy will be maintained, the customers would be more willing to share highly sensitive information—crucial for things like disease management or health advisor.

10.3 Auditable Attestation:

This allows a user who has a verified identity to make a unilateral assertion that they have some sort of credential, relationship or privilege with respect to another person or organization. Their assertion will be tagged linked to a record of with how they were authenticated at the time they made the assertion, and which credentials they relied upon to give them the authority to make an assertion.

For example, a doctor (or, a staffer on behalf of a doctor) might attest that they have a treatment relationship with a patient, and have their consent to access their health records. Since HIPAA provides that patients who accept treatment implicitly consent to allow providers to receive and share their health information for treatment purposes, and allows providers to attest to their treatment relationship when requesting this information, this verifiable attestation could be treated as sufficient by a policy service. While such attestations could be made unilaterally by authorized individuals, they would be auditable by others, including the patient themselves. In addition, policies could allow attestations to be refuted by authorized individuals. The combination of selective auditability and individual accountability deters inappropriate behavior, and makes it possible to detect bad actors and to revoke their privileges. y services that require accurate information.

10.4 on-Demand "in-Person Proofing":

In-person proofing requires that a user physically and personally present proof of their identity when enrolling into a verification service—appearing in person, presenting government-issued photo-id, leaving a signature, having their picture or finger-print taken, etc.

There are many existing identity verification processes which include in-person proofing—employment directories (via the hiring process), bank accounts or wire transfers (via bank branches), the DMV, etc. To the extent that these practices yield databases that include authentication coordinates (phone numbers, email addresses, fax numbers, addresses, password-protected identities, etc.), they can be harnessed to provide evidence of prior in-person proofing for large numbers of people.

Since strong identity verification requires in-person proofing it is important to have mechanisms for users to enroll in in-person proofing verification services. Banks, hospitals, state department of motor vehicles and other organizations that already have facilities and mechanisms in place for in-person proofing can be re-purposed to support such an on demand in-person proofing service.

For example, if a person wanted to increase the strength of their identity (either to protect themselves from identity theft, increase their control over privacy, or to make it possible to access information which requires identity-proofing), they could sign up with a bank providing an "identity protection"

service. They would enter their profile information into a self-enrollment form, authenticate to one or more email addresses, phone numbers, faxes, etc. Then, they would go to a bank branch, present a drivers license or other ID, sign a signature card, possibly have their picture or other biometric signatures taken, and sign a form indicating that the contact information they entered in their on-line profile is accurate. The teller would then physically give them a unique secret code, and/or have them password authenticate to bind their password to their biometric identifiers and other evidence of in-person proofing. The user could then re-authenticate via email, phone and voice print, and enter the secret code. This would bind the in-person proofing records (picture, signature, finger-print, etc) to their electronic authentication coordinates.

Once in-person proofing with biometric authentication is established at one verification service, it would immediately reinforce the user' entire network of other identification services that have common or cross-indexed authentication coordinates. If the user ever needed to update their authentication coordinates (for example if their email, phone numbers or addresses changed) without disrupting their links to verification services based on historical links, they could simply update the identity protection service profile, and confirm the updates by going to a bank branch to re-verify their identity with in-person biometric proofing. Similarly, if a user's electronic authentication coordinates were ever misappropriated, the user could revoke previously established credentials and re-establish their identity with a visit to the bank. Finally, if a user wanted to confirm a very high-value or high-risk electronic transaction, they could do so with a visit to a bank branch or any trusted location or service that could capture a biometric factor (a picture, a voiceprint, a signature, a finger-print) that could be compared with the reference stored at a root verification service. The devices necessary to transmitting such biometric factors are ubiquitous—faxes for physical signatures, digital cameras embedded in phones or computers for pictures, phones or microphones for voice prints, finger-print scanners in computers, PDAs or in-store point of sale devices, etc.

10.5 Tagging Services

A tagging service is a web service or software application that accesses and parses records from a source application, and maps the data onto a set of tags in a known tag taxonomy. There are three types of tagging services, as follows:

10.6 Content Tagging Service:

Generates tags that describe or classify the content included in a record. Content tags can be by a policy tagging service in determining which policies are relevant, by policy services as predicates for rules, by a record locator service to create indexes that support structured searches, by user-facing applications or portals to support user navigation and interaction, and services that aggregate, normalize, analyze, cleanse and transform records from disparate sources. A consuming application can use the content tags as metadata to understand a source record, or can use the tags as a normalized or transformed replacement for the raw data elements in the source record itself.

Content tags might classify the types of records—i.e. indicating that it includes protected medical information, prescription history, hospital discharge summary, laboratory records, doctor's notes, etc. They might also indicate which specific attributes are included in the record (i.e. HIV status), or whether particular values are present (i.e. entries for psychiatric drugs or particular diagnostic codes).

A single information service might use several content tagging services, and a content tagging services might invoke other tagging services. Standard application adapter libraries can serve as a tagging service that translates and normalized data from various application sources into standard terminologies such as HL7 or SNOMED. Other tagging services might use these normalized detailed descriptive tags to generate high-level summary tags within a policy taxonomy so as to support high-level security and privacy rules that don't understand the detailed structure or content of records. For example, a record might be tagged as including Sexually Transmitted Disease information if it includes any diagnostic codes, prescriptions, treatments or words associated with a list of sexually transmitted diseases. This would support a simple rule that states that only physicians with written patient consent are allowed to see records that include information about sexually transmitted diseases. There will be many different specialized tagging services available on the resilient trust network.

Specifically, there will be different tagging services based on the underlying source of the information service—i.e. the type of records (claims-based records, labs, clinical notes, etc.), how they are stored (schema, medical terminology standards, software vendor, etc.) and by the type of policies they generate (i.e. HIPAA, various state laws, provider or payer policies, patient-selected privacy policies, etc.)

10.7 Identity Tagging Service:

Generates tags used to identify and disambiguate the subject of a record, including their name, date of birth, address, gender, phone number, email address, social security number, insurance plan ID, etc. An identity tagging service might interact with a master person index to disambiguate identities and to derive additional identity attributes that can be inferred from the known attributes. (For example, if a record includes an insurance plan ID or social security number, the tagging service could refer to the master person index to determine the current demographic information for that record based on other sources.) It might also generate tags to identity the source of the record (i.e. the provider organization or physician), and the identity of the person who entered the information. A basic identity tagging service could be easily implemented based upon an existing master person index/record locator service.

10.8 Policy Tagging Service:

Appends policy tags that specify which policies sets must be enforced for a given record, and how such policies should be specialized for each individual record. Generally it will take as inputs content and identity tags, policy tags from other policy tagging services, and possibly the source content itself. It might also allow administrators of the underlying information service and/or the subject of the record (i.e. the patient themselves) to specify overall policy preferences and to maintain a list of trusted or preferred policy services.

A policy locator service might be used to discover the set of policy tagging services that are necessary based upon the content of each record. For example, the policy locator service might evaluate the identity tags to determine the subject of the record, and search its index and discover that that person had joined the You Take Control consent management service and opted into a number of policies. Similarly, a policy locator service might note that the patient that is the subject of the requested records currently resides in California, and return a link to CalRHIO as a policy service.

Generally speaking, policy tagging services are responsible for interpreting and translating content from information services and other tagging services into a normalized set of policy tags. Policy locator services are responsible for determining which policy tagging services should be applied to a given record. Multiple policy tagging and policy locator services could be applied to a given record.

An information service can incorporate its own built-in policy tagging service, which requires that it understand how to map the semantics of its own records to the needs of whatever policy services it subscribes to. Policy tags can be extremely high-level and simple, and they do not necessarily require any detailed understanding of the content they are appended to. For example, a record might be tagged as containing protected health information, and require that only individuals authenticated as doctors with explicit consent from the patient documented by a consent management service (i.e. You Take Control) may view the records.

10.9 Personal Tagging Service:

Allows a user to manually add their own tags and define their own policies to records which they publish or have the right to control. A variety of personal services are possible. One category would be "folksonomy" services like flickr or del.i.cious which allow users to create and publish their own tagging taxonomies, which are particularly useful for creating reputation systems. Another would allow to individuals to annotate any content with a simple set of predefined or custom tags that would be used to control access or as display filters. These are particularly useful for unstructured content which require human judgment to systematically classify. Such tags could be "Only my doctors", "Only Me", or "Only My Friends". Or, they could be used to allow humans to tag unstructured content according to the taxonomies used by tagging services for structured content, so that policy services could be linked to unstructured content as well.

10.10 Privacy Firewall

A privacy filter parses information content in order to screen out content that doesn't pass specific criteria, or to transform it so that it can't be used to violate personal privacy. Privacy filters can be used to enable population-scale clinical research, disease management, audit analytics, personalized advertising, or other personalized services without jeopardizing individual privacy or security policies. There are five kinds of Privacy Firewall, which can be used in different combinations and sequences to enforce a Privacy Algorithm:

10.10.1 Structured Screen Firewall:

Allows only structured information with known schema that meets specified criteria to pass through the filter. It only passes values for a specific set of fields whose semantics are positively understood—i.e. encoded within a known terminology such as HL7 or SNOMED. It can be used to screen out fields that might include personally identifying information or sensitive healthcare information (i.e. HIV status).

10.10.2 Semantic Transform Firewall:

Transforms specific field values or substitutes alternative fields to partially obscure semantics so that they are still useful for analytical purposes, but can't be used by pattern-matching algorithms to determine the true subject of the records. For example, address records could be mapped to geographical codes indicating either regions that are big enough to prevent inferring the identity of the individual, or some other metric useful for analytic purposes—i.e. whether it is urban, suburban, rural; climate; average socio-economic status, etc. Dates and ages could be "fuzzed" to prevent identity pattern matching—either transformed to time ranges rather than specific dates, or shifted by random periods within an acceptable range when constructing longitudinal time series data (i.e. lab results). Similarly, quantitative information (i.e. weight, lab values, etc.) can be shifted by random amounts within an acceptable error range to prevent someone with access to some of the original source records from inferring the identity of the subject. Longitudinal records can be statistically summarized to reduce the number of semantic "features" available for pattern matching.

10.10.3 Keyword Firewall:

Flags records that include sensitive keyword patterns that are commonly correlated with privacy sensitive health conditions (i.e. communicable diseases, mental health conditions, etc.) or include information that could be personally identifying. The keyword firewall can be used with any data source, including unstructured data like doctors—notes or text entry fields. It can be used to either filter out records, or to quarantine them so that they can be evaluated and manually tagged by a qualified and authorized human. A variety of standard pattern matching, search algorithms and machine learning technologies can be used in keyword firewalls.

10.10.4 Zero-Knowledge Firewall:

Transforms a source record into a semantically equivalent but opaque record made up of zero-knowledge tokens (or other forms of opaque tokens) corresponding to the individual field values and metadata (i.e. schema definition). This involves creating individual zero-knowledge tokens that serve as opaque tokens for each individual field and its data type definition. Since there is a one-to-one correspondence between each zero-knowledge token and its original value, they are semantically identical and can be used interchangeably for analytic purposes. Records from different sources can be passed through zero-knowledge firewalls and aggregated into a single zero-knowledge database for analytic purposes. Anonymity services can be used to merge records from different sources, so it is impossible for one of the original sources to learn anything from the aggregated database, even if they could compare it with their original records. This could in turn be analyzed via zero-knowledge queries (where search predicates are also opaque GUIDs) or various machine learning methods, where the administrator of the aggregated zero-knowledge database would be unable to learn what data it holds, or even what queries are submitted. Any results could then be restored to their original non-opaque form via the anonymity services, which could be individually controlled by whoever has the rights to the original information. This enables detailed analytics of highly sensitive data between collaborating organizations that do not trust each other with the source data. An anonymity service can be combined with a privacy filter used to allow information that was filtered or transformed for privacy purposes to be recombined with original source information on-demand. For example, a patient might allow highly filtered and de-identified information to be used widely for post-market surveillance or clinical research, yet allow the analytical results to be reconnected with source data so alerts can be sent to the patient or their doctors or caregivers if specific risks are identified that require some response.

10.10.5 Cryptographic Firewall:

This uses a variety of cryptographic techniques to allow data from different sources to be aggregated and/or analyzed without revealing sensitive information to the software or organization performing the aggregation or analytics, or to the various parties contributing information. It can also be used in order to selectively control who can see what views of the resulting analytics, statistic summaries, or annotations of original source data based on analysis of data from multiple sources.

One variant of a Cryptographic Firewall transforms attribute values (including data or schema values) from disparate sources into cryptographic hashes using common crypto-salts and hash algorithms. The crypto-salts can be held by one or more neutral secure authorities not directly accessible to the various parties contributing data or to the party hosting the aggregated data—for example by Trust Domain Services. The hashing function can be performed by a neutral trusted hashing service, or "daisy-chained" into a sequence of independent neutral hashing services, each with one or more crypto-salts and hashing algorithms. Each hashing process could be "streamed" without any persistence, so that a subsequent compromise of the hashing service could not compromise the protected information. The resulting hash values would be unique and consistent for input values from different sources, and so can be used for query, search, relational joins or other forms of pattern-matching or analytics against an aggregated opaque database. To ensure consistency, the schemas and terminology of various input sources could be normalized or transformed so as to ensure that the resulting hash values are the same for input values that are semantically consistent.

A party wishing to perform analytics against the resulting opaque database must pass the specification of their desired analysis (e.g. SQL query criteria) through the same or equivalent sequence of hashing services. This requires that they have authorization to access the same set of crypto-salts and the specification of the hashing algorithms, and that they have access to the same or equivalent hashing services. Without satisfying these requirements, the analytic results would be gibberish.

Each necessary element in the hashing sequence (e.g. the Trust Domain Services holding crypto salts and specification of hashing algorithms, the hashing services themselves, the ability to access the resulting opaque database, any zero-knowledge proxies used to link them together, etc.) could have their own access control policies that might be controlled by different authorities. These access control policies might be enforced via access and trust services relying upon diverse authorities, providing arbitrarily robust protection against security breach or insider fraud. The Privacy Algorithm used could be defined by a neutral trust authority, so that compliance could be enforced and documented without revealing the details of how it was specifically implemented, so as to not reveal information that could be used to guide an attempt to breach the protections of the system.

Another Cryptographic Firewall technique uses various types of homomorphic encryption to support quantitative analysis of numeric data, while limiting exposure to privacy breaches via brute-force attacks by parties that hold large quantities information that can be used for pattern matching. Homomorphic encryption is a form of encryption where one can perform a specific algebraic operation on the plain text by performing a (possibly different) algebraic operation on the cipher text. This technique can be used in combination with cryptographic hashing, zero-knowledge tokens, and other privacy firewalls in order to create a Privacy Algorithm that supports some range of analytic capabilities while providing a known set of privacy and security protections.

A Cryptographic Firewall may create zero-knowledge tokens or encrypted values for some or all of the attribute values transformed, so as to support selective transformation of the analytic results created from an opaque database back into clear-text. Zero-knowledge tokens are not vulnerable to off-line or brute force attacks, and can be passed along with each step of cryptographic transformations. The zero-knowledge token services used could incorporate policies that control for whom and in what context they can be resolved back into clear-text. This allows fine-grained and shared control by the contributors of source data over who is able to know what about the analytic results generated by the aggregate database. For example, clinical researchers might be able to see population statistics and de-identified patient data, whereas the patient and their personal doctors might be able to see their own data, but no one else's.

The net result of this is that a Privacy Algorithm can be devised with arbitrarily strong assurance that an aggregate opaque database can be assembled to support rich analytics, but cannot be used to violate security or privacy policies of those that contributed information or the privacy of the individuals included in the database. The opaque database can remain fully identified and combined with other data in the future, but still be completely opaque even to the party actually holding the data and performing the analytics.

10.11 Anonymous Payment

An Anonymous Payment Service allows secure and auditable payment transactions to be completed such that:

1) the seller doesn't know the specific identity of the customer, but may be able to associate an anonymous payment via their financial institution with the item that was purchased.
2) the customer's financial institution doesn't necessarily know what their customer has purchased or the identity of the seller, and may not know the identity of the seller's financial institution.
3) the seller's financial institution doesn't know the identity of the buyer, and need not know what was purchased,
4) anonymous metering, audit and logging services may maintain a complete audit history of the transaction, enabling detailed reporting to the various parties of what they are allowed to know, and the ability to support neutral dispute resolution according to mutually agreed policies.

In one embodiment, a financial service provider arranging for payment will know that their customer had authorized payment after having satisfied a policy and risk driven set of authentication and anonymous metering, logging and audit requirements. They may receive one or more zero-knowledge or opaque tokens that can be resolved by neutral services into the transaction details necessary to complete the payment transaction and related reporting. Using multiple zero-knowledge tokens will allow different transactional details or metrics to different parties, including to taxing authorities, regulators, auditors, financial intermediaries, and the principals to the transaction. They will also receive non-repudiable verification that the trust requirements (authentication, etc.) had been satisfied according to policies mutually agreed to by the customer and the financial institution.

The customer's financial institution will not know what the customer agreed to purchase, or who the vendor is. The customer's financial institution may make a payment on the customer's behalf to a neutral payment clearinghouse or intermediary, annotating it with the zero-knowledge tokens relating to the transaction. It may also make a separate payment to taxing authorities, which may be calculated by a neutral tax calculation authority that knows only what is necessary to calculate the tax due, but not other detail that might compromise the privacy of the parties to the transaction.

The neutral clearinghouse will be able to resolve one or more of the zero-knowledge tokens received from the customer's financial institution into the identity of the financial institution of the seller, and possibly the account information of the seller so that they can directly make payment directly to that account. Alternatively, they will make payment to the seller's financial institution, and pass along a zero-knowledge or other opaque token that can be resolved by seller' financial institution into the seller's account and possibly transactional detail about the item purchased. Next, the seller's financial institution will credit the seller's account, and either provide them with reporting as to what transaction they received payment for, or send them a zero-knowledge or opaque token that they can resolve into the transactional detail to support reporting that is not visible to their financial institution.

The various parties to the transaction and their financial intermediaries can agree to policies that determine how much information is recorded in anonymous audit trails, the circumstances and process by which they can be revealed, and to whom. Different Privacy Algorithms support fully anonymous transactions where it is impossible for anyone to "connect the dots" to determine who purchased what, up to policies that provide dispute resolution on demand or real-time reporting so that the various parties and financial intermediaries can see significant transaction detail without being required to dispute the transaction.

11.12 Payment and Accounting Syndication

Payment and Accounting Syndication provides a neutral mechanism for enabling precision payment schemes for syndicated offerings connecting ad hoc groups of users and service providers. In one embodiment, the operations of Payment and Accounting Syndication can be orchestrated and executed by Access Servers, Trust Servers, and various Application and Trust Services specified by various participants in a syndicated offering. Such services may rely upon neutral metering, logging, compliance and accounting services that can be selectively accessible to various services in a given syndication. These might include but are not limited to Subscription or Licensing Management, Reporting and Billing, Fraud Prevention, Dispute Resolution, Tax Calculation, Reputation, Payment, Reconciliation, and Payment Clearing Services. The syndication capabilities of Access and Trust Servers make it possible for various participants to concurrently specify different services to perform the same function—such as metering or Fraud Prevention.

Payment schemes can be driven by anything that can be detected, metered and logged and correlated. This includes subscription or licensing agreements tied to the identities or profiles of individuals, groups or organizations, It can also include transaction-based, metered usage, contingent agreements tied to prior or subsequent events or transactions, etc. It can also include revenue or cost sharing, syndicate allocation agreements, performance bonuses and other criteria.

1) Each resource includes its subscription policies in credential expressions created to authorize access.
2) The Trust Broker and Trust Servers then "wires" the necessary resources and trust services into an ad hoc trust network. A Subscription Management Service may translate subscription plan into detailed map of metering, reporting, billing, payment and fraud prevention services.
3) Access to resources may be anonymously metered, preserving full context of user, access point, payer, etc. Anonymous Metering services log resources accessed, user identity, access point, activity context and subscription plans of various service providers.
4) Reporting and billing services translate metering & logging records into personalized utilization and billing reports for the principals to the transactions and their financial intermediaries. Neutral metering and transaction logs drive personalized utilization and billing reports for all parties, so that different parties have different views of the same transaction in order to support legitimate business needs, while protecting privacy of the other parties.
5) One or more Payment Services calculate and pay amounts due based on the terms agreed to by various parties.

In some embodiments, Payment and Accounting Syndication may leverage zero-knowledge algorithms, Privacy Firewalls and other such mechanisms to in implementing or connecting the various participating services. Zero-knowledge algorithms allow people and organizations that don't trust each other to coordinate, pool knowledge and transact with each other without risking security or privacy. It does so by allowing robust security, auditing, payment and policy enforcement mechanism without requiring that various participants are aware of who else is involved in any particular transaction. Policy Syndication enabled by Access and Trust Servers allows the disparate policies of various participants to be simultaneously enforced without the various parties achieving consensus or knowing who else is involved. Zero-knowledge algorithms enable syndicated security services that tap into the collective intelligence of the entire network to deliver vastly more robust security that is more convenient for users.

10.12 Anonymous Personalization

Anonymous personalization supports highly targeted and personalized on-line advertising, e-commerce, or e-services based on profiles or information aggregated and synthesized from disparate sources, while providing robust privacy assurances to the consumer.

Specifically, anonymous personalization allows a vendor or service provider to precisely target offerings to consumers that meet specific and verifiable criteria based on a combination of sources assembled into an anonymous profile. In one embodiment, such criteria might include facts about a person's financial status or history, demographic profile, relationships, purchasing or employment history, online search or viewing history, or express preferences or description self-entered into an online profile, etc.

Figure 16:
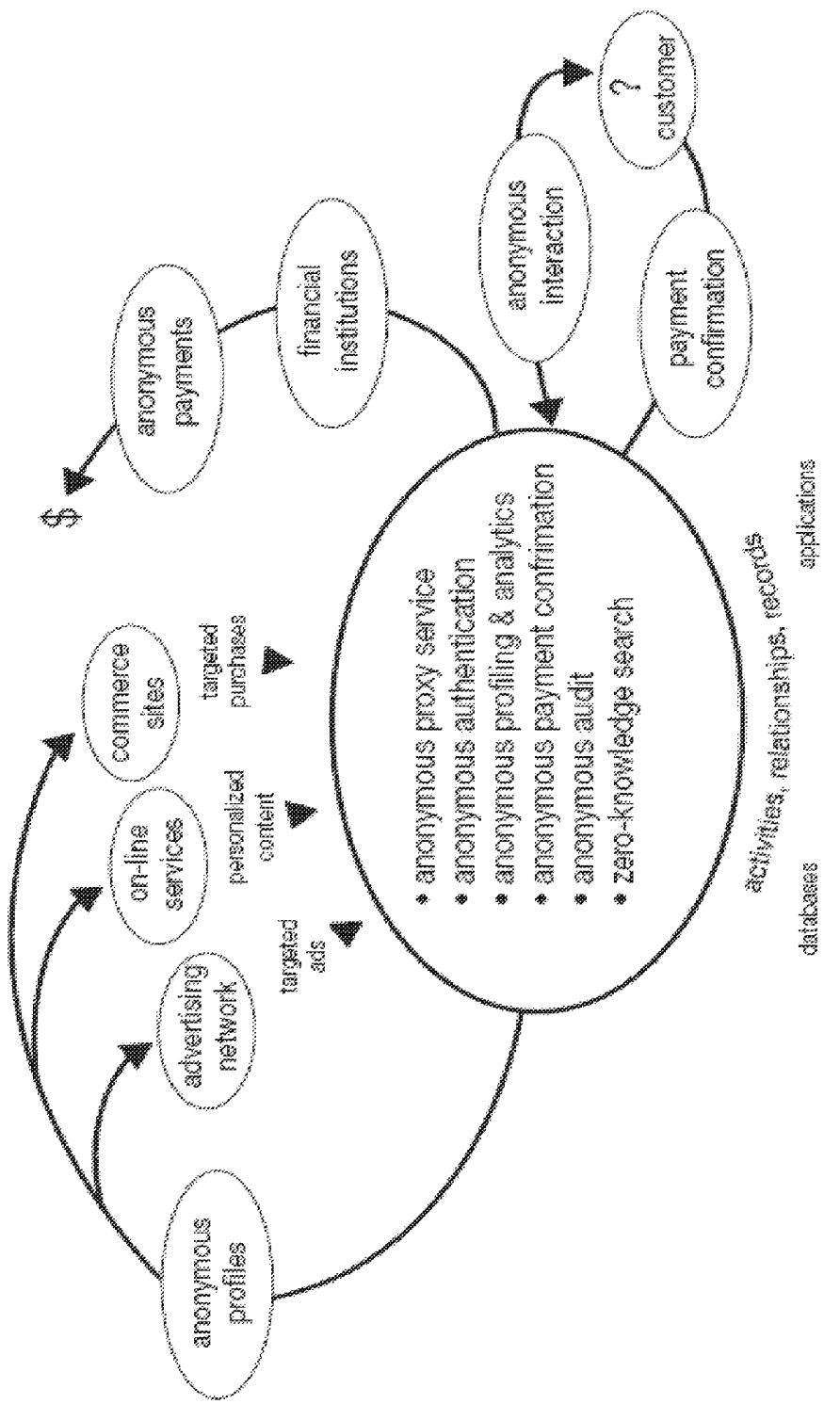
FIG. 16 illustrates anonymity services.

In one embodiment with reference to FIG. 16, the original data sources could be published via access servers as resources, passed through various combinations of Transformation Services, Privacy Firewalls or other mechanisms to create an aggregated anonymous profile. The anonymous profile would include zero-knowledge tokens or other opaque tokens as an anonymous identifier, which could be selectively be resolved into a non-opaque identifier using a pseudonomyzation service or zero-knowledge token service.

The anonymous profile may be de-identified, or made opaque using various combinations of Privacy Firewalls or other such services. It may be hosted by a neutral party, and need not be directly accessible to either vendors, advertisers or service providers; by the trust service(s) that authenticate the user and verify their identity, or by the financial institutions that handle payment for purchases or subscriptions.

The anonymous profile may include metadata that rates the reliability of the information in the profile. In one embodiment this rating can be derived by a published or private algorithm—which sources were included, what confidence ratings are assigned to various sources, and the algorithm used to generate the rating of a profile that includes multiple sources. The rating can be constructed so that it does not reveal information about the identity of the person who is anonymously profiled or the specific sources relied upon, but is useful to the vendor or service provider in assessing the reliability of the information in the profile. In some embodiments, this can be implemented via a neutral Rating Service.

The anonymous profile could be used to target offerings or personalized content to a user while they browsed the web or used other interactive devices such as a cell phone. It could also be used to push targeted offerings or personalized content to them asynchronously, such as via email or by including it in a queue. This targeting may be achieved by the combination of four elements:

1) A market-making, auction or subscription management service that allows vendors, advertisers or service providers to specify the criteria by which they want to target users via their anonymous profiles.
2) A user authentication service or network that can detect the identity of a user and map it into equivalent anonymous identifiers known by the market-making service.
3) An access or content syndication system matches anonymous users to personalized content, services or advertising, and displays or routes it to the user. To improve robustness of security, anonymous identifiers could be "daisy-chained" so that the anonymous profiles, market-making services and user authentication network do not hold common identifiers, with mapping between such identifiers being handled by neutral zero-knowledge token services or some similar apparatus. User interaction could be handled via a neutral display service, such as a Display Broker, using Display Policies that prevent the vendor, advertiser or service provider from interacting directly with the client device, preventing them from depositing cookies or capturing digital device finterprints that would allow them to correlate the user's identity with their anonymous profile criteria.
4) An Anonymous Payment Service meters the activities and arranges for payments according to the terms agreed to.

The syndicated market-making, auction, or subscription management services allow vendors, advertiser or service providers to specify the criteria of what type of users or organizations they would like to present offers or personalized content to. A syndicated auction service allows different parties to bid for the right to have their personalized content displayed. A syndicated subscription service allows them to make standing offers for certain profile criteria, and specifies payment, metering and audit systems. Such market-making services could enforce policies as to what types of services can be offered to anonymous individuals, either based on their profile criteria, or based upon policies defined by the original sources of information aggregated into the anonymous profile.

These offers or personalized content could take several forms—targeted advertising, targeted sales, and personalized on-line services. There are different variants of targeted advertising. Among these are Transactional Advertising, where the user clicks on the personalized content to go to another site. Another is Display-Only or Brand Advertising, where the advertiser presents content to a user with a specified psychographic or demographic profile in order to establish brand awareness, intent to purchase or behavioral change, but without requiring that the user take any immediate measurable action. A third variant, Metered Performance Advertising, is an offer that combines Brand Advertising with anonymously metering of subsequent behavior, such as purchasing, so that the advertiser can measure the effectiveness of their advertising campaign. A similar range of targeted sales or personalized on-line services could be supported—Transactional, Display-Only, Metered Performance, These include just about any syndicated or personalized service, including wellness education, medication adherence, homeland security alerts, etc. In one embodiment, these services and content could be served up and personalized via Access and Trust Servers, as outlined elsewhere in the present invention.

Various Privacy Algorithms can be established to provide different levels of privacy protection that are resilient against security breaches or insider fraud by the the service providers supporting the anonymous personalization marketplace. In other words, the system can be designed so that these service providers are incapable of connecting the dots so as to violate a consumers privacy, even if they want to or if their security is breached.

In one embodiment with reference to FIG. 16 an anonymous proxy service is illustrated. The ability to strongly verify the identity of users can be based upon the syndicated security model that includes reliance upon public authentication coordinates that are also found in the source records for the anonymous profile makes it possible to provide strong assurances that an anonymously authenticated person is accurately described by the anonymous profile, even though is impossible for the vendor/advertiser/service provider to narrow down their specific identity beyond some defined limit—i.e. it could be any one of 50,000 people who fit the profile.

10.13 Dynamic Fraud Detection and Escalation

In one embodiment, Dynamic Fraud Detection and Escalation leverages the syndication capabilities enabled by Access Servers and Trust Servers, Zero-Knowledge Algorithms, Transformation and Tagging Services, Privacy Firewalls, Locator and Discovery Services, Trust Domain Services among others to improve protection against fraud.

Specifically, these services can be leveraged to make it feasible for Fraud Detection analytics to access a much broader array of information about the various participants in a transaction, and also to detect unusual patterns compared to their other activities. This is possible because the disparate policies of various contributors of information can be simultaneously enforced, and each contributor can be assured that their data will only be used in an agreed upon way. Opaque or Zero-Knowledge databases make it possible to assure contributors that their security and privacy policies won't be breached, even if the security of the party holding the data and performing the analytics is breached. Similarly, if contributors do not require that their data be protected to that extent, they can be assured that their data will only be accessed and operated on by secure services that meet their requirements, They can also control which users can see what data if potential fraud is detected and human intervention is called for.

Dynamic Escalation leverages Access and Trust Servers and other apparatus and methods described in this application to evaluate the context and risk factors in a given situation to allow on-demand (possibly real time) escalation of trust requirements for authentication, identity verification, creating audit records, notification to human administrators or related parties, etc. It could also require dynamic escalation of fraud detection or security requirements based on the risk levels of the specific resources being accessed and the context and history relating to that content, the organizations and individuals involved. This might include accessing more data from more sources, escalating to more sophisticated or specialized fraud analytics, requiring more robust (and possibly more expensive) authentication, logging or dispute resolution services, etc.

11 GLOSSARY

| Term | Definition |
| --- | --- |
| Access Broker | In an embodiment, an instance of an access server that dynamically connects access-controlled display, data, and analytic resources from across the network into personalized virtual applications |
| Access Point | A synonym for a host application |
| Access Server | A software component that enables the publishing of software resources as a service onto the resilient trust network and acts a policy enforcement point, controlling the flow of data to and from a service. |
| Access syndication | The joining together diverse services under a single host application to deliver a combined experience to a user population |
| Accounting syndication | In an embodiment, a system that enables payments made to syndicates to be allocated among syndicate members proportional to contribution. |
| Anonymization | The act of removing identifying information from electronic data so that it can no longer be tied to the party it describes. |
| Application services | In an embodiment, services published via an access server that allow user to enter data. |
| ASCX | ASP.NET Web User Control (Microsoft filename extension) |
| ASMX | Active Server Methods (Microsoft filename extension for a web service) |
| ASPX | Active Server Page for ASP.NET (Microsoft filename extension) |
| Authentication service | A type of trust service capable of authenticating the identity of a user |
| Authority | An authority is a fully specified or resolvable path to a service that issues a uniquely identified entity in the Trust Network, including email addresses, trust services, information services, trust histories, etc. |
| Coordinate | Data associated with a user such as a telephone number, fax number, email address or snail mail address that can be used while authenticating the user |
| CoordinateCategory | A taxonomy of standard labels that classify different types of authentication coordinates For example Personal, Business and Mobile. CoordinateCategory is passed as a parameter in TrustHistory.GetCoordinates( ), and is element of CoordinateSet returned by TrustHistory( ).GetCoordinate. |
| CoordinateSet | Collection of authentication coordinates and associated credential grants that occurred during user sessions that meet a specified combination of criteria - i.e. occurred during on a specified machine (MachineID), for a user who had authenticated to a particular email address, etc. |
| CoordinateType | A category of authentication coordinate, for example, phone number, email address, or username/password. |
| Credential | A verifiable attestation made by a Trust Service or Trust Broker on behalf of an authority. There are different types of credentials.<br>Authentication Credentials record the authentication of user identity using a particular trust service and a particular attribute (i.e. Authentify; PhoneConfirmation; 415.265.3250).<br>Verification Credentials record assertions a user's attributes, roles, relationships or privileges associated with a specified person or system.<br>Policy Credentials record assertions that the requirements for a named policy have been satisfied. The requirements logic can be either encapsulated in the policy service itself, or by satisfying a boolean expression of external credentials. |
| CredentialExpression | A Boolean expression of authority.credentials that must be satisfied in order for a Credential Request to be granted. |
| CredentialGrant | A fully specified authority.credential that has been granted, posted to the Trust Broker and logged to the Trust History. |
| CredentialRequestGID | A globally unique identifier (GUID) for the CredentialRequest, which is a shared secret of two services, i.e. EscrowContainer and the TrustBroker. Each pair of services that interact with each other will establish a different CredentialRequestGID, so that it remains a shared secret. |
| CredentialRequestGID | A one time "secret key" resource reference known only to a single pair of components (i.e. a TrustBroker and TrustServiceProxy; or a TrustServiceProxy and |

| Term | Definition |
| --- | --- |
| | ServiceConnector) that specifies and authenticates which CredentialRuest a given CredentialGrant, CredentialExpression, TagSetRequestGID or DisplayGID is associated with. |
| CredentialRequestTagSet | A collection of structured tags with that is passed with a CredentialRequest to a Trust Service or a TrustBroker to be available for forwarding to other Trust Services in satisfying the request. |
| CredentialSet | Collection of credential grants that meet the specified combination of criteria in a TrustHistory.GetCredentials( ) invocation. |
| CredentialTagSet | A set of tags passed from a ServiceConnector to a TrustServiceProxy or from a TrustServiceProxy to a TrustBroker via a PostCredentialExpression( ) to be made available to other TrustServices to resolve the CredentialExpression. |
| DataObject | A unit of data for which access-control can be controlled individually for example, a file, a database record or an HTML page. |
| DataObjectGID | A globally unique identifier created for the DataObject, which is a shared secret between the information service and the access server. |
| DataObjectTagSet | A collection of structured tags that describe the requested DataObject that is available for evaluation by trust services via the trust broker in responding to the credential request. |
| DerivedAuthority | A fully specified or resolvable path of the authority that has posted a derived credential grant. |
| Discovery services | A synonym for locator services. Services that perform search functions. |
| Display Broker | In an embodiment, an access server that serves user interface on behalf of remote services when firewalls or other impediments limit the ability of the remote service to serve user interface to a host application. |
| DisplayControl | Fully specified path and UI control to be displayed with DisplayGID as argument. |
| DisplayGID | Opaque token reference to a request for a display resource, serving as a "secret key" known only to the services (i.e. TrustServiceProxy and the TrustBroker). |
| DisplayHints | A collection of parameters describing the characteristics of the DisplayControl to be displayed and hints that the enclosing control may use to configure the layout. |
| DisplayRefresh | Triggers refresh of the enclosing control. |
| DisplayStateContent | a calling convention for DisplayControls to interact with their underlying ServiceConnectors to determine what to display and to coordinate user interface with non-user-facing components. The ServiceConnector may pass content that can be rendered directly by the browser (i.e. HMTL or XML), or parameters that the DisplayControl can use to configure its user interface display and behaviors |
| DisplayStateRequest | Argument in GetDisplayState( ) methods, specifies what DisplayStateContent elements are requested. |
| FullResponse | TRUE/FALSE, TRUE indicates the complete TagSetRequest has been fulfilled |
| GrantType | Describes whether the credential reflects an Original Grant, a Renewal Grant, or a Derived Grant.<br>An Original Grant is an initial grant logged by the specified authority according to its specific requirements - either directly by the authority, or by a Trust Broker based upon a credential expression issued by the authority.<br>A Renewed Grant is logged when a pre-existing grant is re-verified against the specified credential expression requirements of its authority.<br>A Derived Grant is based upon inferences from the trust history and the user preferences that establish equivalence relationships, and is granted by a specified DerivedAuthority. |
| Host application | An application that embeds one or more services |
| Information service | In an embodiment, an information service is an application published by an access server that stores data and in response to queries will return a data object. |
| Locator Service | Any service which supports supports search. Also called a discovery service |
| MachineGID | A globally unique identifier for the machine, issued by a TrustBroker, and recorded in a cookie or certificate, and included in TrustHistory log entries. Trust History log entries may be translated into opaque tokens. |

-continued

| Term | Definition |
| --- | --- |
| PostBackPath | a URI to a calling service, passed as an argument to support asynchronous responses across distributed services. |
| Protected resource | In an embodiment, any application or unit of data where access to that item is controlled by an access server. |
| Relying party | An software service that invokes trust services via the trust server |
| ResponseCode | Describes the status of the response. The response may be: "Complete" - all requested elements have been returned "Partial" - a subset of the request is returned and the service handling the request is still attempting to satisfy the remaining elements, so they may be delivered via a subsequent post "Incomplete" - a partial response has been posted and the service handling the request is not attempting to find the remaining elements |
| ResponseStyle | an argument to specify whether a method should respond synchronously or asynchronously: Synchronous - maintains session connection with calling service until a complete response is returned. Asynchronous - instead of responding to request in a single session connection, it responds via a asynchronous invocation of a corresponding "Post" methods on calling service, using a shared secret GID to bind the initial request to its asynchronous response. (Default) |
| ResultOptions | Specifies which attributes are included in the CoordinateSet returned. |
| SessionGID | A unique identifier created for the user that tracks the user's activities (i.e., authentication activities performed by the user etc). |
| StatusCodes | acknowledgement or error codes. |
| TagRequestGID | One time "secret key" resource reference known only to a pa of services (either a TrustBroker and TrustServiceProxy, or a ServiceConnector and TrustServiceProxy) used to bind and authenticate the TagSetResponse to a specific TagRequest. |
| TagSetRequest | A collection of Schema.Tags specifying what Tags are requested. |
| TagSetResponse | A collection of Schema.Tags/Tag.Value in response to the TagSetRequest |
| TimeOutPeriod | Session timeout period is an optional parameter for determining the SessionGID. timeout interval after the most recent TrustHistory log entry with a given SessionGID and a given MachineGID. If the TrustBroker's SessionCookie has been deleted, the TrustBroker will retrieve the SessionGID from the most recent TrustHistory log entry for the MachineGID, and check whether the elapsed time exceeds the TimeOutPeriod specified for the CredentialRequest. |
| Trust Authority | An organization that operates a trust service and in whose name a credential is granted. |
| Trust Broker | A component of a trust server responsible for managing the distributed execution of a set of trust services |
| Trust History | A shared database of trust credentials used by a trust broker to record credentials on behalf of users and subsequently to lookup credentials previously earned by a user during future credential requests. |
| Trust Proxy | A component of a trust server capable of preprocessing a credential request (typically to encode its data using a zero-knowledge service) prior to forwarding it to a trust broker to be processed |
| Trust Server | A software entity consisting of a messaging infrastructure, a trust broker, an optional trust history and trust proxy that serves as a virtual policy decision point by controlling the actions of remote trust services on behalf of relying parties |
| Trust Service | In an embodiment, a trust service is an application published by an access server that delivers functionality to either authenticate or validate users/systems or makes records of their interaction with protected resources. |
| Trust Service Proxy | In an embodiment, a component of a trust server responsible for directly managing interaction with trust services on behalf of the trust server. |
| Trust syndication | The combination of diverse trust services to deliver an integrated trust service that delivers higher security. |
| UserID | An identifier for the requesting user, typically an email address. |
| Verification service | A type of trust service capable of verifying some fact concerning a user or system |

-continued

| Term | Definition |
|---|---|
| Virtual Application | An application assembled at runtime from different services in response to user input and context. A virtual application is constructed dynamically by interfacing multiple applications - it was not designed in advance to act as a system. |
| Zero knowledge algorithms | Algorithms that encode information converting into meaningless 'opaque tokens' that preserve context and support analytics without revealing anything to unauthorized parties |

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. A system relating to trust network services comprising:
a plurality of client computers coupled to a network;
an access server coupled to the network for providing a host application that provides a plurality of application services to the client computers;
a trust server coupled to a trust history database and the network, the trust server providing trust services to the access server;
a display broker coupled to the network providing a user interface for trust services; and
a set of application services including the following services: trust services, service connectors which are adaptors for the trust services, and trust service proxies coupled to the network;
wherein the access server, the trust server, the display broker and the set of application services are system components that comprise a pipeline that provides function according to the interaction of the system components with the policies held by a relying party;
wherein the access server, the trust server, the display broker and the set of application services communicate with each other in a peer-to-peer manner in a non-hierarchical secure network through a trust protocol;
wherein the trust server is further configured to start a trust session by passing a user identification (ID), close a trust session by passing a session ID, create a new credential expression by passing a session ID, cancel a credential request by passing a credential ID, check a credential request status by passing the credential ID, where the credential request is a request to authorize an interaction with a protected resource that specifies the trust services needed to be validated and documents the interaction and has a status;
wherein the trust protocol does not include starting the trust session and does not include stopping the trust session; and
wherein the trust network services communicate with the trust protocol that includes transmitting a credential request to selectively authorize or restrict communications or provision services among any of the plurality of client computers and the trust network services.

2. The system of claim 1 further comprising:
signature code to digitally sign the executable code of trust network services or the plurality of the client computers or credential expressions or message traffic transmitted; and
evaluation code to evaluate digital signatures by the trust network services in order: to detect tampering or to verify that a correct code and/or data is executed so as to determine whether the digital signatures should be trusted pursuant to policies specified by one or more participants on the plurality of client computers coupled to the network or specified by the trust network services.

3. The system of claim 1 further comprising:
a credential syndicate trust service that implements an identity or trust syndication, wherein the identity or trust syndication consists an aggregation of identity or trust information not accessed from centralized or federated information sources but from independent network based sources;
the credential syndicate trust service consisting of:
an access server and a trust service connector which accepts a syndicated trust credential request;
a trust credential syndication code to determine which of the trust credentials are relevant to earning the requested syndicated credential based on a context that includes at least one of the following factors: attributes associated with the users, attributes associated with resources being protected by the trust credentials, the various combinations of the trust credentials that could satisfy the credential syndicate requirements, which of the trust credentials the users or relying parties are eligible for, trust domain constraints, which trust credentials are available based on licensing or other rights; and trust credential expression generation code to generate a new trust credential expression that satisfies a criteria for earning the trust credentials given the context;
a parameter evaluation and discovery code coupled with the trust credential syndication code that determines whether the trust credentials include required parameters; if the required parameters are not included, the parameter evaluation and discovery code invokes parameter request code that use trust protocols to obtain additional parameters by one or more of: requesting attributes from the relying party or intermediary trust network services, requesting a display to solicit input from the user, and calling a locator service or other similar service to discover or derive other attributes from trusted sources.

4. The system of claim 1 further comprising:
distributed directory services which offer the plurality of client computers or the trust network services functional code that support the ability to perform at least one of the following functions: accessing, displaying, querying, entering, updating, resolving, storing, organizing, managing, replicating, visualizing, or synchronizing; and
information stored in a memory coupled to the trust network services that relates to various types of entities that include at least one of the following: resources, trust credentials, trust authorities, trust services, certificates, external services, devices, trust domains, application services, users, administrators, or organizations, the information including data and metadata about one or more of the following: identifiers, aliases, addresses, tokens, names, trust criteria, login credentials, access control policies, interface descriptions, schema definitions, configuration metadata, systems management information, provenance metadata, location or geo-tagging data, descriptive metadata, reputation metadata, activity logs, access logs, and administrator privileges.

5. The system of claim 1 further compromising:
a tagging service coupled to the network, the tagging service is configured to provide one or more of: a content tagging service, an identity tagging service, a policy tagging service, or a personal tagging service, or a specialized form tagging service, and
wherein the tagging service relies upon some combination of one or more of: reference data sources, tagging services, taxonomy or terminology mapping services, master person indices, application integration frameworks, matching algorithms, classification algorithms, trust-ranking algorithms, interactive forms supporting user annotation or user tagging, opaque token services, and locator services.

6. The system of claim 5 wherein the tagging service implements one or more transformation algorithms that take as an input source records made up of a set of attributes, and the tagging service transforms the input source records into output records consisting of either annotated records or a derived and transformed set of attributes and wherein the output records include one or more of the following: attributes of the input source records, additional derived or transformed attributes, provenance metadata describing the source of the input source records, the transformation algorithms used, the tagging services involved, and schema or standards of the output records or attributes, metadata summarizing a confidence or a trust ranking associated with the output records as a whole, and of individual attributes thereof.

7. The system of claim 1 further comprising:
a locator service coupled to the network, wherein the locator service is configured to function as one or more of the following: a record locator, an identity locator, a policy locator, an audit locator, or a specialized type of locator service, wherein the locator service incorporates tagging services to support methods for: enabling discovery and search among client computers and trust network services and resources that do not use consistent schemas, identity attributes or terminologies, filtering or organizing search query results based on provenance, trust-ranking, reputation, pricing, or other criteria and performance optimization.

8. The system of claim 1 further comprising:
a trust domain service coupled to the network;
wherein the trust domain service provides trust code and the trust domain service includes a container for at least one of the following: security policies, credential expressions, administrative mapping tables, credential routing maps, white-lists, black lists, trust rankings, performance metrics, reputation metrics, encryption keys, crypto-salts, links, aliases, and zero-knowledge tokens.

9. The system of claim 1 further comprising:
trust validation code that enable the trust network services to implement or invoke the trust validation code that selectively determine whether or not to trust resources or services in specific contexts;
wherein the trust validation code require a verification that the trust network services or users of the plurality of client computers are authorized to utilize the service or resource that have been requested via at least one of the following: 1) validating digital signatures, X.509 certificates, Security Association Markup Language certificates or tokens, 2) verifying possession of correct message validation codes, verifying presence on white-lists or absence from black-lists, 3) verifying that the trust network services or the users have attributes or relationships, or meets specified reputation metrics requirements, 4) verifying that the codes of the services relied upon by the users is executing on trusted computing platforms, 5) requiring use of one or more of the following: zero-knowledge algorithms to obfuscate credential expressions, addresses, parameter values or message flows, and verification of the identity, credentials, attributes, relationships or reputation of the administrator of the service or resource.

10. The system of claim 1 further comprising:
trust routing and resolution code that enable trust network services to support at least one of the following capabilities: 1) expand or resolve partially-specified trust credential requests into one or more fully-specified trust credential requests that satisfy policy requirements; and 2) expand or resolve partially-qualified resource references into one or more fully-qualified resource references that satisfy the policy requirements; and 3) validate that fully-specified trust credential requests satisfy the policy requirements; and 4) validate that fully-qualified resource references satisfy the policy requirements;
wherein the policy requirements to be satisfied are specified in at least one of the following: 1) trust domain or other clauses which stipulate policy requirements in the credential expression requests or resource references themselves; and 2) defaults specified in administrative mapping tables or other such code in the Trust Network services handling each credential request or resolving each resource reference; and 3) clauses within other credential expression elements or resource references which within the same trust resource graph or credential expression tree.

11. A system relating to trust network services comprising:
a plurality of client computers coupled to a network; and
a plurality of trust network services including the following: access servers, trust brokers, trust services and trust service proxies;
wherein the plurality of trust network services communicate in a peer-to-peer manner via a trust protocol and a trust network service implements or invokes zero-knowledge token aliasing and encryption and crypto-hashing;

wherein opaque token services selectively obfuscate or reveal data messages; or opaque token services selectively obfuscate or reveal credential expressions among a plurality of participating client computers; or opaque token services selectively obfuscate users of the plurality of client computers; and wherein the decision as to what code to use selected from the group: token aliasing code, encryption code, cryptohashing semantic transform firewall code or algorithmic transformation code, is made by an interaction of the trust broker and the trust service proxy is based on the policy of a relying party.

12. The system of claim 11 further comprising:
an opaque token service that relies on a trust network service to provide access to inputs necessary for the function of the opaque token service comprising provision of encryption keys, and where the decision to provide encryption keys is made by the interaction of the trust broker and trust service proxy based on the policy of the relying party.

13. The System of claim 11 further comprising:
an opaque token service that relies on a trust network service to provide access to inputs necessary for the function of the opaque token service comprising provision of crypto-salts and where the decision to provide crypto-salts is made by the interaction of the trust broker and trust service proxy based on the policy of the relying party.

14. The system of claim 11 further comprising:
an opaque token service that relies on a trust network service to provide access to inputs necessary for the function of the opaque token service comprising provision of numeric values and where the decision to provide numeric values is made by the interaction of the trust broker and trust service proxy based on the policy of the relying party.

15. The system of claim 11 further comprising:
an opaque token service that relies on a trust network service to provide access to inputs necessary for the function of the opaque token service comprising provision of random number generators and where the decision to provide random number generators is made by the interaction of the trust broker and trust service proxy based on the policy of the relying party.

16. The system of claim 11 further comprising:
an opaque token service that relies on a trust network service to provide access to inputs necessary for the function of the opaque token service comprising provision of look-up tables and where the decision to provide look-up tables is made by the interaction of the trust broker and trust service proxy based on the policy of the relying party.

17. The system of claim 11 wherein the decision as to what target selected from the group: data message, credential expression, users, to operate on is made by the interaction of the trust broker and trust service proxy based on the policy of the relying party.

18. The system of claim 11 further comprising:
opaque token services that selectively obfuscate or reveal trust network services, where the decision as to whether to obfuscate or reveal trust network services is made by the interaction of the trust broker, trust service proxy based on the policy of the relying party.

19. The system of claim 11 further comprising:
a zero-knowledge token service coupled to the network that transforms trust network request/response message flow elements into opaque tokens, including: zero-knowledge token aliases, cryptographic hashes, encrypted values or opaque metadata;

zero-knowledge orchestration code that distribute flows to partition the execution of these transformations across the trust network to ensure that sources of clear text values do not have access to either the corresponding output opaque token values or the parameters used by opaque token services to generate the opaque token values, used for algorithmic transformations necessary to generate the parameters; and zero-knowledge resolution code that restrict the resolution of the opaque token values back into clear text values to authorized parties.

20. The system of claim 11 further comprising:
trust network nodes coupled to the network; and
a zero-knowledge messaging, routing and service orchestration service coupled to the network that acts as an intermediary among the trust network nodes, the zero-knowledge messaging, routing and service orchestration service uses opaque tokens to route, validate or transmit request and response interactions to transmit messages across the trust network, opaque tokens create a dynamically generated opaque address and name space, which is partitioned such that each of the trust network nodes has selectively limited visibility into the actual addresses or identities of the trust network nodes directly or indirectly communicated with, the composition and structure of the overall network of the trust network nodes, or to the routes or contents of messages or requests transmitted.

21. The system of claim 11 further comprising:
a zero-knowledge credential expression service coupled to the network or incorporated in the trust network services, the zero-knowledge credential expression service evaluates, generates or transforms credential expressions that consist partially or completely of opaque tokens so that the trust network services are able to correctly evaluate and execute credential expressions without knowing some or all of the credential elements and parameter values involved, and so that credential expression elements may be successively transformed into different opaque tokens as the credential expression elements are transmitted to nodes of the trust network, and selectively resolved back into clear text by authorized nodes, the authorized nodes partitioning knowledge across the trust network so that the nodes can correctly perform their individual tasks and route requests and messages without understanding context or information that is not necessary to complete their individual tasks.

22. The system of claim 11 further comprising:
zero-knowledge indexing code that transform clear text index source records into opaque or semi-opaque zero-knowledge index records composed of one or more instances of each of some combination of the following attributes: index record tokens, search criteria hash codes, search criteria attributes, trust-rank metrics, provenance metadata, authentication criteria hash codes, duplicate detection hash-codes, credential result tokens, credential result authentication predicate tokens, anonymous metering tokens; message authentication codes; and a index storage code that posts copies of each zero-knowledge index record and associated tokens to one or more storage services, comprising: locator, discovery or directory services, databases or filing systems.

23. The system of claim 11 further comprising:

a zero-knowledge search proxy that accepts search query criteria from a requestor, including some combination of: search criteria attributes; result filter criteria such as provenance metadata, trust-rank metrics, and authentication criteria; and a specification of one or more target storage services to be searched;

wherein the zero-knowledge search proxy transforms the search query criteria using one or more opaque token services into some combination of search criteria hash codes and search criteria attributes, where such transformation include pre-processing to ensure consistent formats or semantics appropriate to the search targets; and the zero-knowledge search proxy queries one or more target storage services coupled to the network, and wherein some or all of the attributes of an output record are transformed into one or more opaque tokens via zero-knowledge algorithms and some of the attributes of the output record are selectively transformed back into clear text by authorized parties.

24. A system relating to trust network services comprising:

a plurality of client computers coupled to a network;

an access server coupled to the network for providing a host application that provides a plurality of application services to the client computers;

a trust broker coupled to a trust history database and the network, the trust broker providing trust services to the access server;

a display broker coupled to the network providing a user interface for trust services; and a set of application services including the following services: trust services, service connectors which are adaptors for the trust services, and trust service proxies coupled to the network;

wherein the access server, the trust broker, the display broker and the set of application services are system components that comprise a pipeline that provides function according to the interaction of the system components with the policies held by a relying party;

wherein the access server, the trust broker, the display broker and the set of application services communicate with each other in a peer-to-peer manner in a non-hierarchical secure network through a trust protocol;

wherein the trust server is further configured to start a trust session by passing a user identification (ID), close a trust session by passing a session ID, create a new credential expression by passing a session ID, cancel a credential request by passing a credential ID, check a credential request Status by passing the credential ID, where the credential request is a request to authorize an interaction with a protected resource that specifies the trust services needed to be validated and documents the interaction and has a status;

wherein the trust protocol does not include starting the trust session and does not include stopping the trust session; and wherein the trust network services communicate with the trust protocol that includes transmitting a credential request to selectively authorize or restrict communications or provision services among any of the plurality of client computers and the trust network services.

* * * * *